(12) United States Patent
Long et al.

(10) Patent No.: US 12,735,256 B2
(45) **Date of Patent: *Sep. 15, 2026**

(54) SYSTEMS AND METHODS FOR PROVIDING VERTICAL MOBILE CARRIER SYSTEMS

(71) Applicant: Berkshire Grey Operating Company, Inc., Bedford, MA (US)

(72) Inventors: Guoming Alex Long, Wexford, PA (US); Chad Karl Tobler, Cranberry Township, PA (US); Paul Joseph Guzzetti, Jr., Pittsburgh, PA (US); Matthew Irwin Jones, Pittsburgh, PA (US); William Woodrow Magness, III, Sewickley, PA (US); Joseph Corey Michal, Beverly, MA (US); William Farmer, Bolton, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 83 days.

This patent is subject to a terminal disclaimer.

(21) Appl. No.: 18/647,224

(22) Filed: Apr. 26, 2024

(65) Prior Publication Data

US 2024/0270494 A1 Aug. 15, 2024

Related U.S. Application Data

(63) Continuation-in-part of application No. 18/220,399, filed on Jul. 11, 2023, and a continuation-in-part of application No. 18/220,398, filed on Jul. 11, 2023.

(Continued)

(51) Int. Cl.

| | |
|---|---|
| ***B65G 47/82*** | (2006.01) |
| ***B65G 1/04*** | (2006.01) |

(Continued)

(52) U.S. Cl.

CPC ........... *B65G 1/0492* (2013.01); *B65G 1/065* (2013.01); *B65G 1/1378* (2013.01); *B65G 47/82* (2013.01); *B65G 2814/0352* (2013.01)

(58) Field of Classification Search

CPC ........ B65G 1/04; B65G 1/065; B65G 1/1378; B65G 1/0492; B65G 47/82; B65G 2814/0352

See application file for complete search history.

(56) References Cited

U.S. PATENT DOCUMENTS

| | | | |
|---|---|---|---|
| 1,030,320 | A | 6/1912 | Morgan |
| 4,508,484 | A | 4/1985 | Heiz |

(Continued)

FOREIGN PATENT DOCUMENTS

| | | | |
|---|---|---|---|
| CN | 102725213 | B | 8/2016 |
| CN | 105246802 | B | 5/2018 |

(Continued)

OTHER PUBLICATIONS

Choi et al., Trends and opportunities for robotic automation of trim & final assembly in the automotive industry, 2010, IEEE, p. 124-129 (Year: 2010).*

(Continued)

*Primary Examiner* — McDieunel Marc
(74) *Attorney, Agent, or Firm* — Gesmer Updegrove LLP

(57) ABSTRACT

An object processing system includes a vertical structure extending in a vertical direction and at least one automated mobile carrier adapted for movement with respect to the vertical structure. The at least one automated mobile carrier includes a carrier base portion including at least two wheels for moving the automated mobile carrier in at least one direction that is generally orthogonal with respect to the vertical direction, a carrier upper portion for receiving at least one object thereon to be moved by the automated (Continued)

mobile carrier, and an elevation system for lifting the carrier upper portion of the automated mobile carrier with respect to the carrier base portion of the automated mobile carrier such that an engagement system of the carrier upper portion engages the vertical structure.

42 Claims, 67 Drawing Sheets

Related U.S. Application Data

(60) Provisional application No. 63/627,554, filed on Jan. 31, 2024, provisional application No. 63/463,131, filed on May 1, 2023, provisional application No. 63/462,434, filed on Apr. 27, 2023, provisional application No. 63/388,169, filed on Jul. 11, 2022.

(51) Int. Cl.
*B65G 1/06* (2006.01)
*B65G 1/137* (2006.01)

(56) References Cited

U.S. PATENT DOCUMENTS 5,352,081 A 10/1994 Tanaka
5,525,884 A 6/1996 Sugiura et al.
7,967,667 B2 * 6/2011 Hsieh .................... A22C 25/02 452/99
8,276,740 B2 10/2012 Hayduchok et al.
8,446,811 B2 5/2013 Yue et al.
8,943,500 B1 1/2015 Havemose
9,111,251 B1 8/2015 Brazeau
9,450,086 B2 * 9/2016 Shimomura ....... H10D 30/0297
9,602,195 B2 3/2017 Hashiguchi et al.
9,669,913 B1 * 6/2017 Maresh .................... B63H 1/32
10,048,697 B1 8/2018 Theobald
10,259,649 B2 4/2019 Raizer
10,294,026 B1 5/2019 Lee et al.
10,518,974 B2 12/2019 Lee et al.
10,576,621 B2 3/2020 Wagner et al.
10,577,180 B1 3/2020 Mehta et al.
10,611,021 B2 4/2020 Wagner et al.
10,850,922 B1 12/2020 Alspaugh et al.
10,913,612 B2 2/2021 Wagner et al.
11,084,660 B2 8/2021 Wagner et al.
11,117,760 B2 9/2021 Wagner et al.
11,325,781 B2 5/2022 Zhu et al.
11,338,996 B2 5/2022 Zhu et al.
11,358,175 B2 6/2022 Hayduchok et al.
11,402,831 B2 8/2022 Wagner et al.
11,407,587 B1 8/2022 Dwivedi et al.
11,460,845 B2 * 10/2022 Levasseur ............. G06Q 10/08
11,618,364 B1 4/2023 Mohammed et al.
11,661,275 B2 5/2023 Wagner et al.
11,780,676 B2 10/2023 Stevens et al.
11,787,633 B2 10/2023 Blotnik et al.
11,820,601 B2 11/2023 Valinsky et al.
11,827,452 B2 11/2023 Stevens et al.
12,017,855 B2 6/2024 Stevens et al.
2006/0045672 A1 3/2006 Maynard et al.
2011/0014021 A1 1/2011 Reid et al.
2011/0061995 A1 3/2011 Huff et al.
2011/0308918 A1 12/2011 Schwardt et al.
2012/0185082 A1 7/2012 Toebes et al.
2012/0189416 A1 7/2012 Toebes et al.
2012/0195724 A1 8/2012 Toebes et al.
2014/0031972 A1 1/2014 DeWitt et al.
2014/0100999 A1 4/2014 Mountz et al.
2014/0308098 A1 10/2014 Lert et al.
2016/0137417 A1 5/2016 Winkler
2016/0221757 A1 8/2016 DeWitt et al.
2016/0355337 A1 12/2016 Lert et al.
2017/0267452 A1 9/2017 Goren et al.
2017/0305668 A1 10/2017 Bestic et al.
2018/0037410 A1 2/2018 DeWitt
2018/0148259 A1 5/2018 Gravelle et al.
2018/0251302 A1 9/2018 Valinsky et al.
2018/0265291 A1 9/2018 Wagner et al.
2018/0290830 A1 10/2018 Valinsky et al.
2018/0305122 A1 10/2018 Moulin et al.
2019/0009985 A1 1/2019 Lert, Jr. et al.
2019/0062051 A1 2/2019 Warhurst
2019/0129371 A1 5/2019 Wagner et al.
2019/0210803 A1 7/2019 Sullivan et al.
2019/0256298 A1 8/2019 Jarr et al.
2019/0337723 A1 11/2019 Wagner et al.
2020/0087067 A1 3/2020 Fosnight et al.
2020/0122923 A1 4/2020 Moulin et al.
2020/0180863 A1 6/2020 Moulin et al.
2020/0216298 A1 7/2020 Gravelle et al.
2020/0399061 A1 12/2020 Warhurst
2021/0039881 A1 2/2021 Zhu et al.
2021/0039887 A1 2/2021 Zhu et al.
2021/0047112 A1 2/2021 Stevens et al.
2021/0090001 A1 3/2021 Glass et al.
2021/0229271 A1 7/2021 Fosnight et al.
2022/0055843 A1 2/2022 Bair et al.
2022/0258975 A1 * 8/2022 Wagner .................. B25J 9/0093
2022/0297937 A1 * 9/2022 Velagapudi .......... B65G 1/1373
2022/0324648 A1 10/2022 Valinsky et al.
2023/0050980 A1 2/2023 Zahdeh et al.
2024/0010428 A1 1/2024 Michal et al.
2024/0010429 A1 1/2024 Michal et al.
2024/0270495 A1 * 8/2024 Long ................... B65G 1/0492

FOREIGN PATENT DOCUMENTS

CN 210162598 U 3/2020
CN 115158950 A 10/2022
CN 217866247 U 11/2022
CN 119486950 A 2/2025
CN 119562926 A 3/2025
DE 102008039764 A1 5/2010
DE 102011083095 A1 3/2013
DE 102020111008 A1 10/2021
EP 0737630 A1 10/1996
EP 3693297 B1 9/2021
JP S49110481 U 9/1974
JP S53124872 A 10/1978
JP H07117815 A 5/1995
JP S924520 B2 6/2007
JP 7117815 B2 8/2022
TW I627113 B 6/2018
WO 2016026910 A1 2/2016
WO 2019201764 A2 10/2019
WO 2022091111 A1 5/2022
WO 2024015343 A1 1/2024
WO 2024015347 A1 1/2024
WO 2024226936 A1 10/2024
WO 2024226964 A2 10/2024

OTHER PUBLICATIONS

Durrant-Whyte et al., An autonomous straddle carrier for movement of shipping containers—From Research to Operational Autonomous Systems, 2007, IEEE, p. 14-23 (Year: 2007).*

Görner et al., SwarmRail: A Novel Overhead Robot System for Indoor Transport and Mobile Manipulation, 2020, IEEE, p. 5905-5910 (Year: 2020).*

Seelinger et al., Automatic Pallet Engagment by a Vision Guided Forklift, 2005, IEEE, p. 4068-4073 (Year: 2005).*

International Preliminary Report on Patentability issued by the International Bureau of WIPO in related International application No. PCT/US2023/027348 on Dec. 18, 2024, 11 pages.

International Preliminary Report on Patentability issued by the International Bureau of WIPO in related International application No. PCT/US2023/027354 on Dec. 18, 2024, 12 pages.

Notification of Transmittal of the International Search Report and the Written Opinion of the International Searching Authority and the

(56) References Cited

OTHER PUBLICATIONS

International Search Report and the Written Opinion of the International Searching Authority (the European Patent Office) issued in related International Application No. PCT/US2024/026496 on Feb. 4, 2025, 22 pages.
Annex to Form Form PCT/ISA/206, Communication Relating to the Results of the Partial International Search issued by the European Patent Office, as the International Searching Authority, in related International Application No. PCT/US2023/027348 on Oct. 19, 2023, 2 pages.
Annex to Form Form PCT/ISA/206, Communication Relating to the Results of the Partial International Search issued by the European Patent Office, as the International Searching Authority, in related International Application No. PCT/US2023/027354 on Oct. 19, 2023, 2 pages.
Annex to Form PCT/ISA/206, Communication Relating to the Results of the Partial International Search issued by the International Searching Authority, the European Patente Office, in related International Application No. PCT/US2024/026496 on Jul. 25, 2024, 3 pages.
Notification of Transmittal of the International Search Report and the Written Opinion of the International Searching Authority and the International Search Report and the Written Opinion of the International Searching Authority (the European Patent Office) issued in related International Application No. PCT/US2023/027348 on Dec. 12, 2023, 19 pages.
Notification of Transmittal of the International Search Report and the Written Opinion of the International Searching Authority and the International Search Report and the Written Opinion of the International Searching Authority (the European Patent Office) issued in related International Application No. PCT/US2023/027354 on Dec. 11, 2023, 21 pages.
Notification of Transmittal of the International Search Report and the Written Opinion of the International Searching Authority and the International Search Report and the Written Opinion of the International Searching Authority (the European Patent Office) issued in related International Application No. PCT/US2024/026458 on Jul. 26, 2024, 14 pages.
Barrett et al., Autonomous Battery Exchange of UAVs with a Mobile Ground Base, 2018, IEEE, p. 699-705.
International Preliminary Report on Patentability issued by the International Bureau of WIPO in related international application No. PCT/US2024/026458 on Oct. 16, 2025, 8 pages.
Madni et al., Solid-state six degree of freedom, motion sensor for field robotic applications, 1998, IEEE, p. 1389-1398.
Stieber et al., Robotic systems for the International Space Station, 1997, IEEE, p. 3068-3073.
Wilde et al., ORION: A simulation environment for spacecraft formation flight, capture, and orbital robotics, 2016, IEEE, p. 1-14.

* cited by examiner 339
338
364
378
362
378
364
336
312
334
330
332
332

320
382
350
340
336
338
318
340
340
320
340
312

412
416
436
418
414
478
476
474
472
482
470
480
472
482
474
476
478
416

600
606
100
610
100
604
312
608
602

SYSTEMS AND METHODS FOR PROVIDING VERTICAL MOBILE CARRIER SYSTEMS

PRIORITY

The present application claims priority to U.S. Provisional Patent Application No. 63/462,434 filed Apr. 27, 2023, U.S. Provisional Patent Application No. 63/463,131 filed May 1, 2023 and U.S. Provisional Patent Application No. 63/627,554 filed Jan. 31, 2024. The present application is also a continuation application of U.S. patent application Ser. No. 18/220,398 filed Jul. 11, 2023, which claims priority to U.S. Provisional Patent Application No. 63/388,169 filed Jul. 11, 2022, U.S. Provisional Patent Application No. 63/462,434 filed Apr. 27, 2023, and U.S. Provisional Patent Application No. 63/463,131 filed May 1, 2023. The present application is also a continuation application of U.S. patent application Ser. No. 18/220,399 filed Jul. 11, 2023, which claims priority to U.S. Provisional Patent Application No. 63/388,169 filed Jul. 11, 2022, U.S. Provisional Patent Application No. 63/462,434 filed Apr. 27, 2023, and U.S. Provisional Patent Application No. 63/463,131 filed May 1, 2023. The disclosures of all of the above referenced applications are hereby incorporated by reference in their entireties.

BACKGROUND

The present invention relates to automated storage/retrieval systems (ASRS) for objects and other object processing systems and relates in particular to ASRS systems that require both long-term and medium-term storage (low throughput to storage ratios) as well as short term storage (high throughput to storage ratios), e.g., where the storage is turned over daily. Long-term and medium-term storage systems require access to a large number of storage locations, while short term storage systems require fast access to the storage locations.

Certain existing ASRS and other processing systems are limited by the payloads they can reliably store and pick. Reliability is a core requirement as it is commonly the case that a failure requires human intervention within the system. Human intervention has conflicting priorities of speed, safety, cost, and complexity. Failure to achieve extremely low overall system downtime numbers and very short MTTR (Mean Time To Repair) greatly affects local throughput and causes ripple effects in the rest of the system efficiency. The storage and retrieval system is often the primary source of buffering and other system buffers are kept short.

Shuttle-and-lift systems, stacker systems, and tower-bot systems, for example, are becoming common and have many benefits over more traditional crane-based systems in system-level throughput and their tolerance for a single point of failure not limiting large percentages of the system. Certain of these systems also work well with regular bin (or tray)-based storage that allow the payload interfaces to be consistently designed features in the payload acquisition and storage bins. Payload handling in these systems for example, range from controlled-lift with paired-bottom locating features style to engaged-drag style that can pull from larger distances with side engagement pockets to (arguably the most common) which is drag using reach behind pull fingers.

Certain of these systems involve reaching behind objects and suggest compatibility with regular rectangular-base cardboard boxes. Applicants have discovered however, that for a variety of reasons such compatibility is not always reliable, sometimes requiring (for reliability reasons) that boxes be presented in bins or totes. Additionally, these existing systems struggle with unboxed loose items that might otherwise be conveyed, such as for example, shrink bundled beverage cases, bags of dog food, cat litter etc., all of which exhibit widely varying size, shape, material characteristics.

There remains a need therefore, for more capable, efficient and economical ASRS and other object processing systems that require accessing a wide range of geometries of objects in both long to medium storage as well as short term storage requiring high turn-over.

SUMMARY

In accordance with an aspect, the invention provides an object processing system that includes a vertical structure extending in a vertical direction and at least one automated mobile carrier adapted for movement with respect to the vertical structure. The at least one automated mobile carrier includes a carrier base portion including at least two wheels for moving the automated mobile carrier in at least one direction that is generally orthogonal with respect to the vertical direction, a carrier upper portion for receiving at least one object thereon to be moved by the automated mobile carrier, and an elevation system for lifting the carrier upper portion of the automated mobile carrier with respect to the carrier base portion of the automated mobile carrier such that an engagement system of the carrier upper portion engages the vertical structure.

In accordance with another aspect, the invention provides an object processing system including at least one automated mobile carrier. The object processing system includes a carrier base portion including at least two wheels for moving the automated mobile carrier in at least one horizontal direction, a carrier upper portion that includes a payload receiving surface for receiving at least one object thereon to be moved by the automated mobile carrier, and an engagement system for engaging a vertical structure, and an elevation system being adapted for lifting the carrier upper portion including the payload receiving surface with respect to the carrier base portion such that the engagement system may engage the vertical structure.

In accordance with a further aspect, the invention provides a method of processing objects using an automated mobile carrier. The method includes moving the automated mobile carrier in a horizontal direction, said automated mobile carrier including a carrier base portion including at least two wheels for moving the automated mobile carrier in the horizontal direction, and a carrier upper portion including a payload receiving portion for receiving at least one object thereon to be moved by the automated mobile carrier, receiving the automated mobile carrier under at least two vertically extending lift structures such that the automated mobile carrier may move freely in the horizontal direction unobstructed by the vertically extending lift structures, elevating the carrier upper portion relative the carrier base portion such that an engagement system of the carrier upper portion engages the vertically extending lift structures, and lifting the automated mobile carrier along the vertically extending lift structures to any of a plurality of levels, each of which includes a plurality of destination locations.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
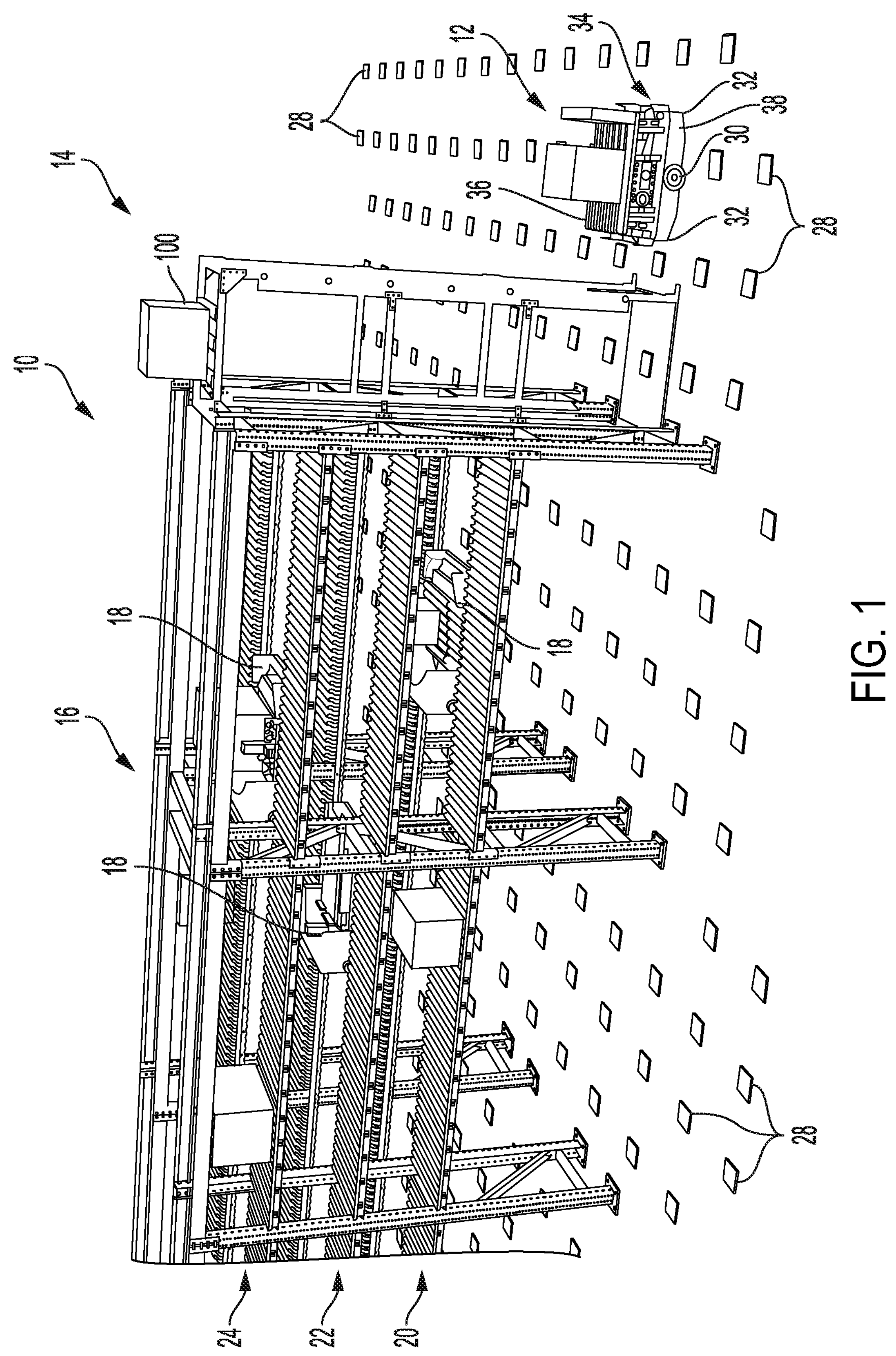
FIG. 1 shows an illustrative diagrammatic view of an object processing system in accordance with an aspect of the present invention.

The invention provides an object processing system 10 that includes a plurality of automated mobile carriers 12 that may be moved toward and up vertical lift structures 14 for providing objects to or removing objects from multiple levels of shelving 16 via shuttle carriers 18 as shown in FIG. 1. The shuttle carriers 18 are each provided on a shelf level (e.g., 20, 22, 24) between a pair of opposing shelves on each level. Navigation of each automated mobile carrier 12 about the environment may be facilitated by unique markers 28 that each carrier 12 uses (via detection units on the underside thereof) to either confirm the appropriate position and orientation of the carrier or to be used to instruct the carrier how to adjust its movement to further travel to bring the carrier into alignment with the markers 28. In accordance with further aspects, navigation of the automated mobile carriers may be provided by any of a variety of techniques, such as wheel-rotation counting, camera detection and analysis, 3D scanning detection and analysis, echo location, and global or local position systems.

Each automated mobile carrier 12 includes two independently operable drive wheels 30 that may move the carrier in forward or backward directions, as well as turn the carrier by powering one drive wheel more than the other, or by rotating each drive wheel in mutually opposing directions to cause the carrier to rotate in place. Casters 32 may be used to facilitate maintaining a level payload receiving portion 36 on which an object or bin of objects may be placed for movement. The payload receiving portion 36 may be formed of a plurality of spaced-apart ribs (as shown at 37 in FIG. 6) and is supported by a support structure 34. The support structure 34 is elevationally-adjustably mounted on a carrier base 38 (as discussed in more detail below).

The object processing system may be used, for example, in an ASRS system or other object processing systems that require both long-term and medium-term storage (low throughput to storage ratios) as well as short-term storage (high throughput to storage ratios), e.g., where the storage is turned over daily. Long-term and medium-term storage systems require access to a large number of storage locations, while short-term storage systems require fast access to the storage locations.

Figure 2:
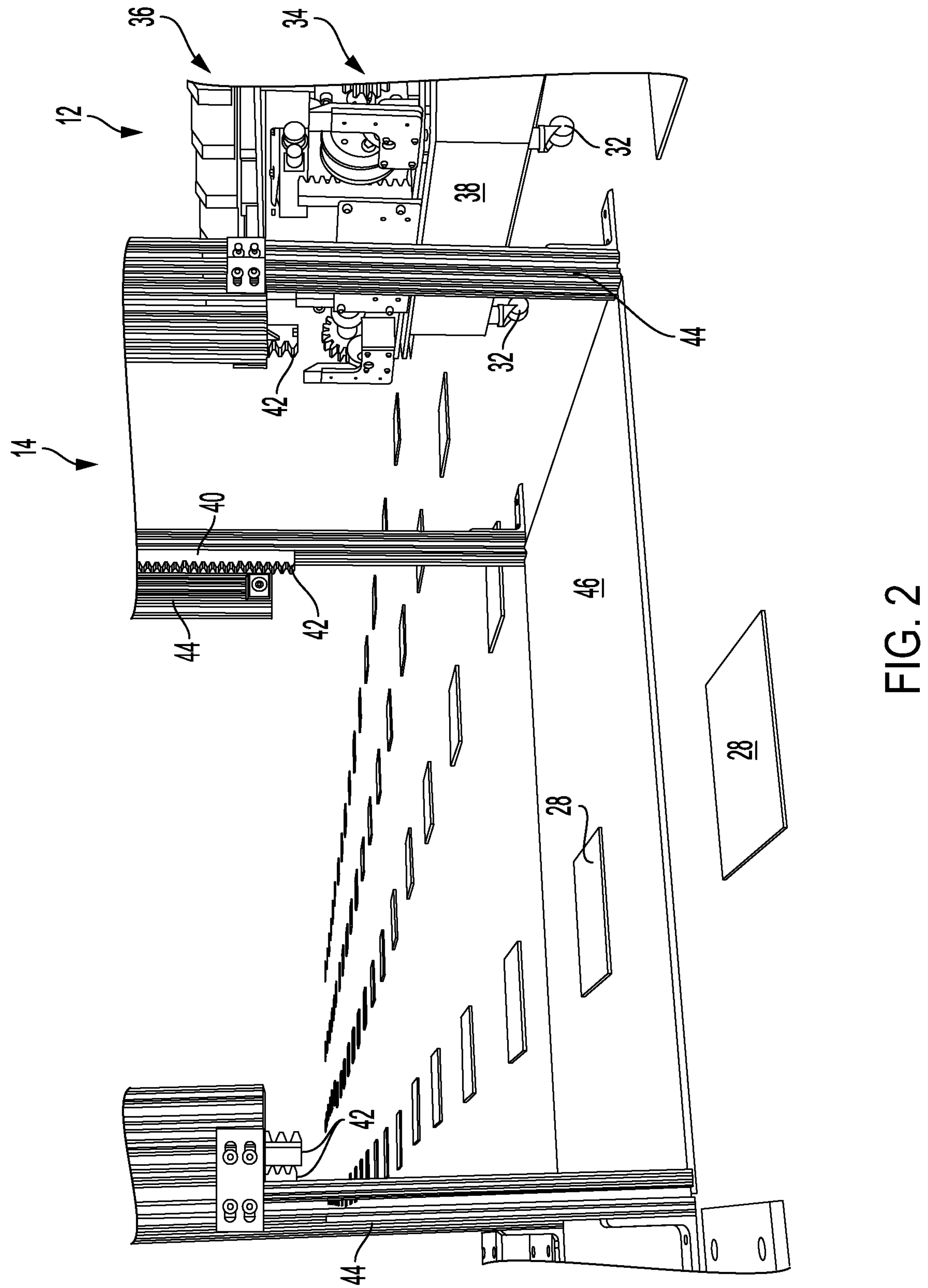
FIG. 2 shows an illustrative diagrammatic enlarged view of a base of a vertical lift structure of the object processing system of FIG. 1.
Figure 3:
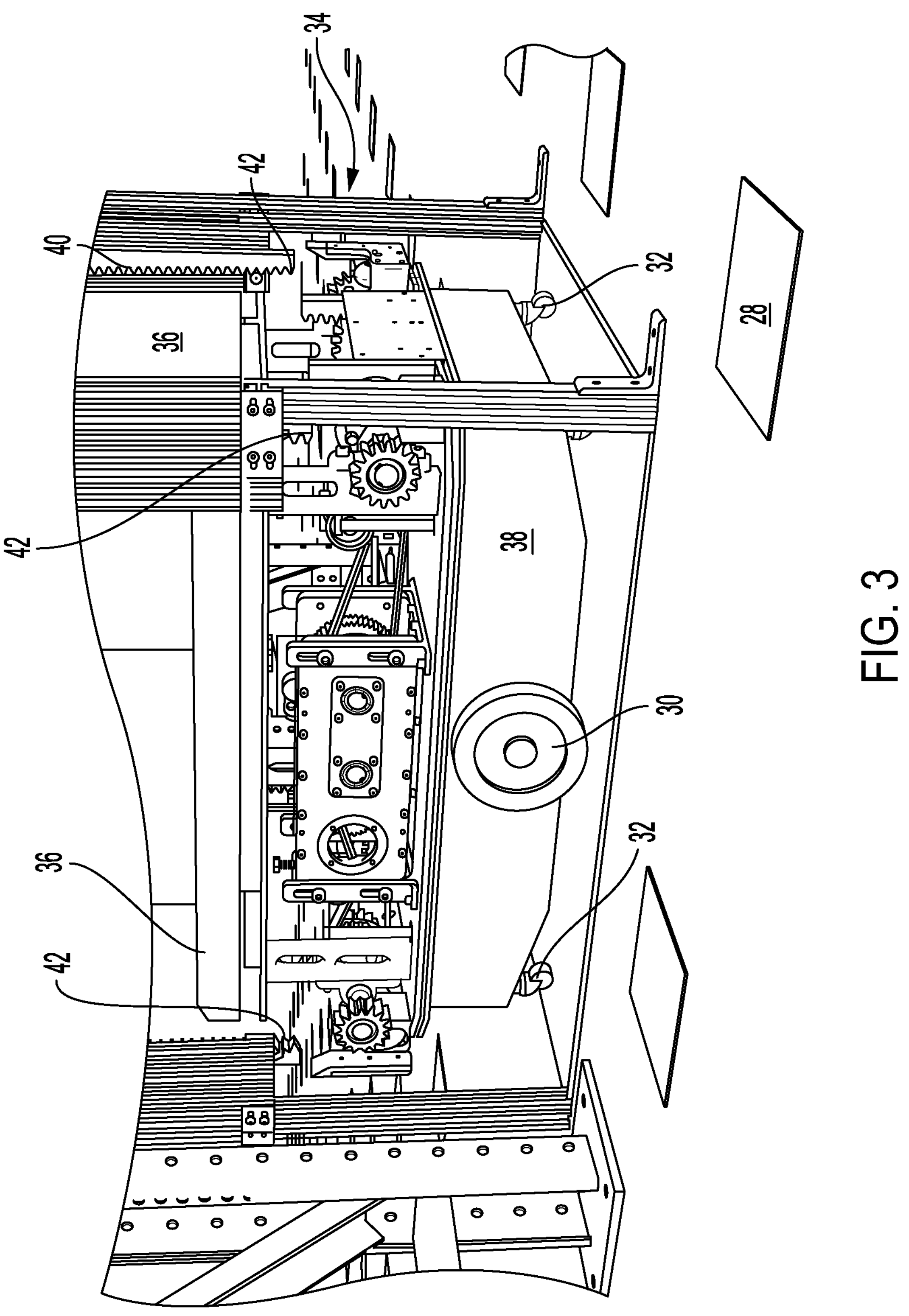
FIG. 3 shows an illustrative diagrammatic view of the base of the vertical lift structure of FIG. 2 with an automated mobile carrier positioned at the base of the vertical lift structure.

With further reference to FIG. 2, the vertical lift structure includes a plurality of vertically extending lift gear racks 40, for example, providing one in each of the four corners of the vertical lift structure 14 and each gear rack 40 includes a lowermost end 42 that terminates well above the floor. The vertical lift structure 14 may (or may not) include support legs 44 and a vertical structure base plate 46. The automated mobile carrier 12 may be driven into the base of the vertical lift structure 14, and the lowermost ends 42 of the vertically extending lift gear racks clear at least an outer portion of the automated mobile carrier 12. FIG. 3 shows the automated mobile carrier 12 of FIG. 1 having entered the base of the vertical lift structure. As may be seen in FIG. 34, the outermost portions of the automated mobile carrier 12 (in the corners thereof) clear the lowermost ends 42 of the lift gear racks 40.

Figure 4:
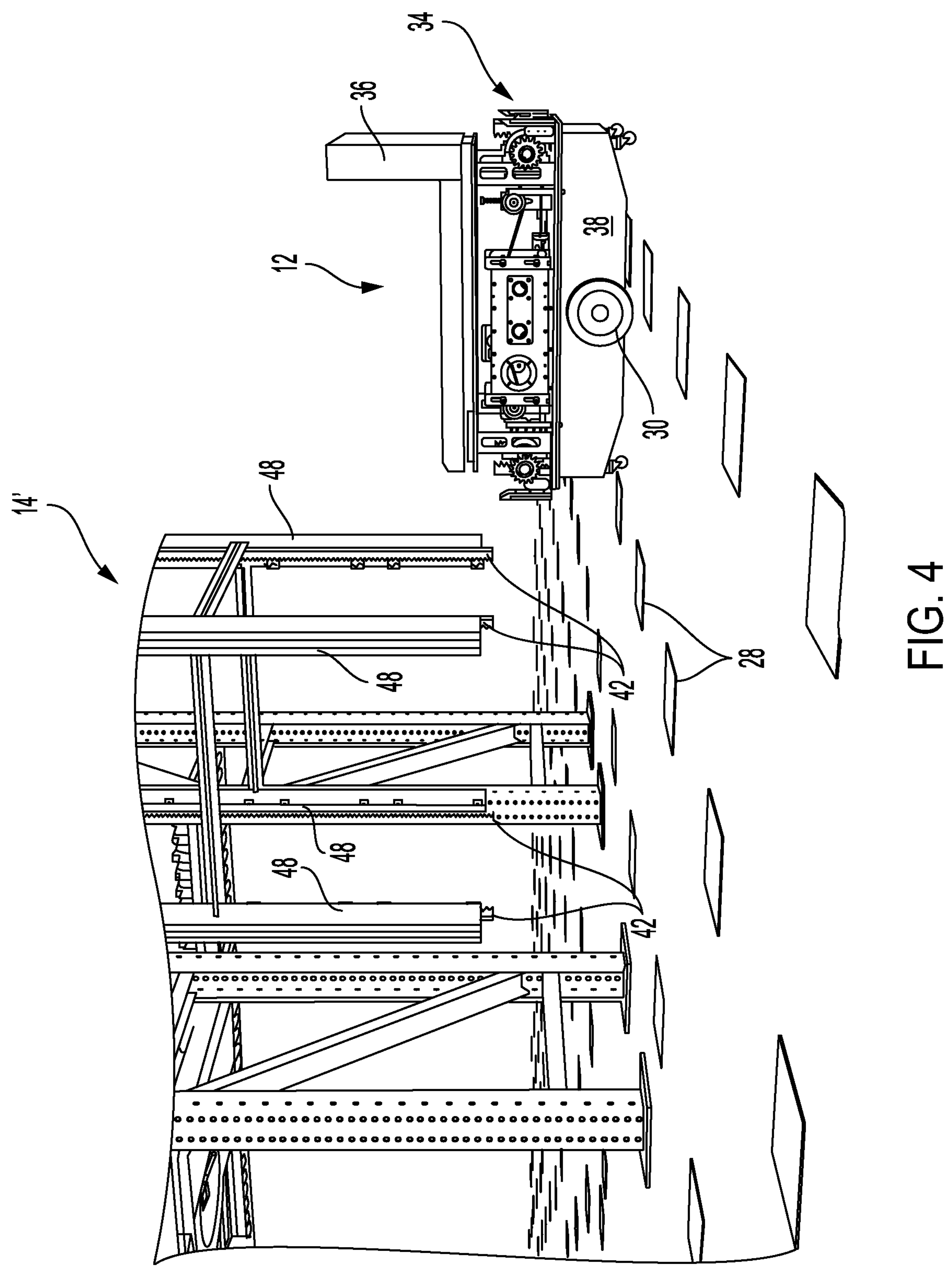
FIG. 4 shows an illustrative diagrammatic view of the base of a vertical lift structure of FIG. 2 wherein the support legs are omitted.
Figure 5:
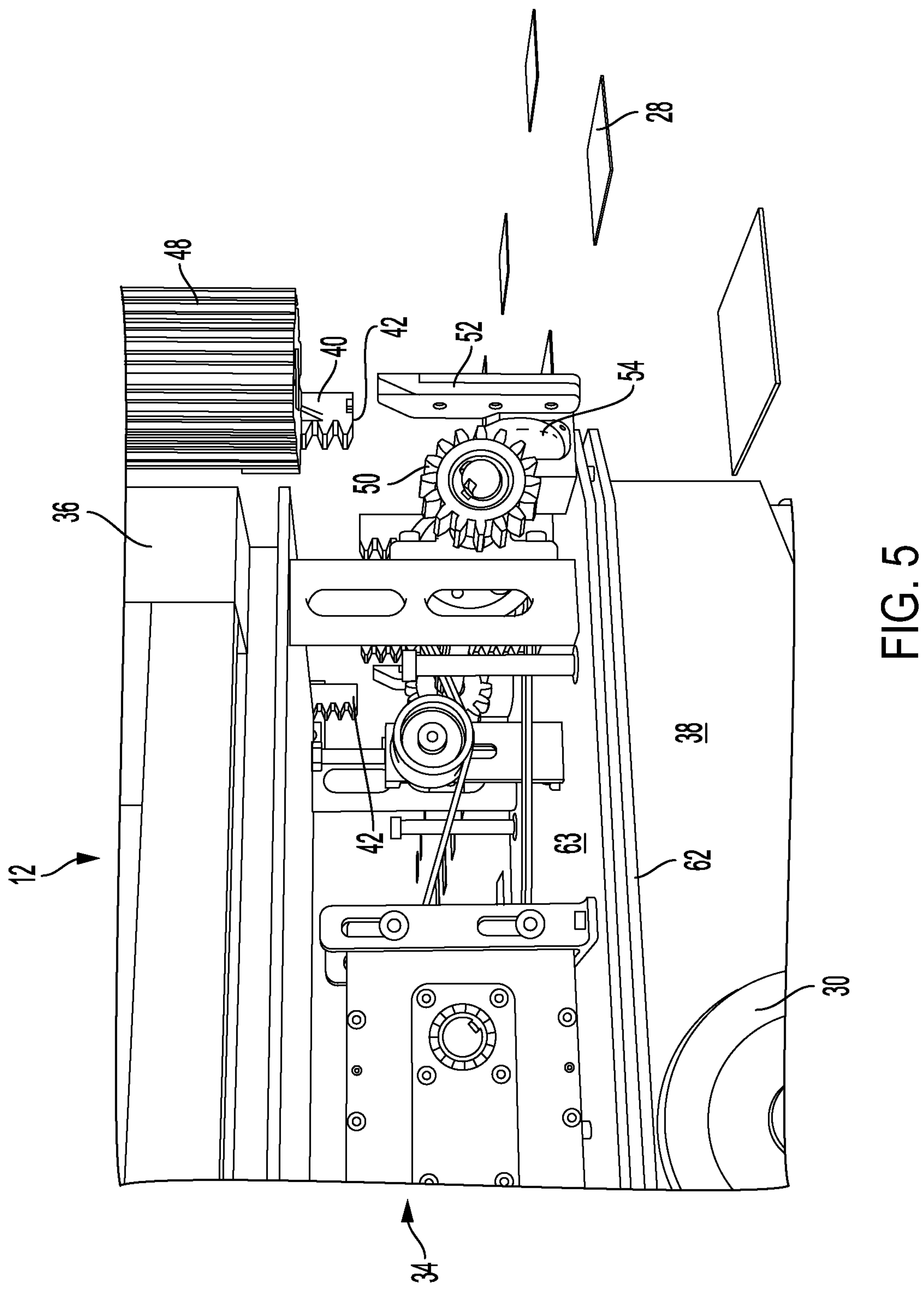
FIG. 5 shows an illustrative diagrammatic enlarged view of the vertical lift structure of FIG. 4 with the automated mobile carrier positioned below the vertical lift structure.

As noted above, the vertical lift structure may omit the support legs that extend up from the floor as well as the base plate. FIG. 4 shows the automated mobile carrier 12 approaching a vertical lift structure 14' wherein the vertical lift structure 14' includes support members 48 that also terminate well above the floor. FIG. 5 shows an enlarged view of the system with the automated mobile carrier 12 having entered the base of the vertical lift structure 14'. As may be seen in FIG. 5, the automated mobile carrier 12 includes the carrier base 38, the support structure 34, and the payload receiving portion 36. The support structure 34 includes a lifting system that includes lift pinion gears 50, slide guides 52 and roller guides 54. In the system of FIG. 5, four of each are provided (one in each respective corner). The uppermost portions of the lifting system (e.g., slide guides 52) are below the lowermost ends 42 of the lift gear racks 40 as shown.

Figure 6:
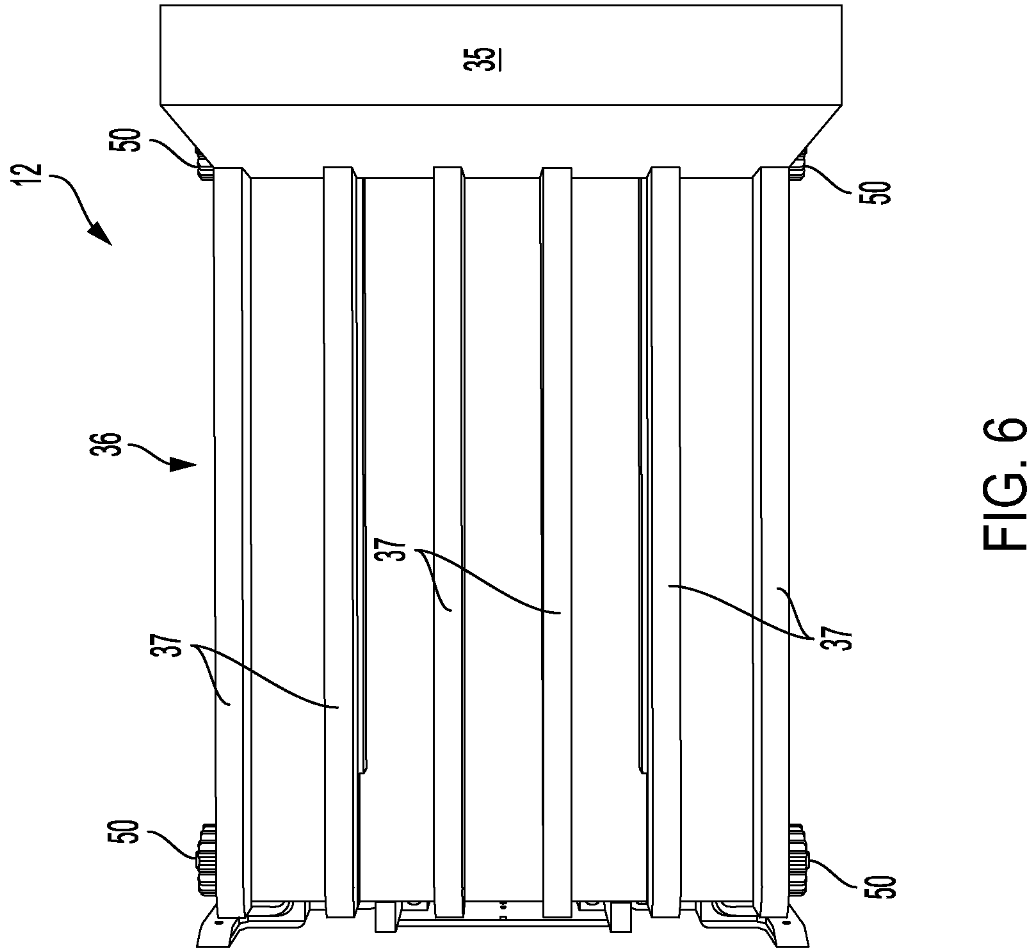
FIG. 6 shows an illustrative diagrammatic top view of the automated mobile carrier of FIG. 3.
Figure 7:
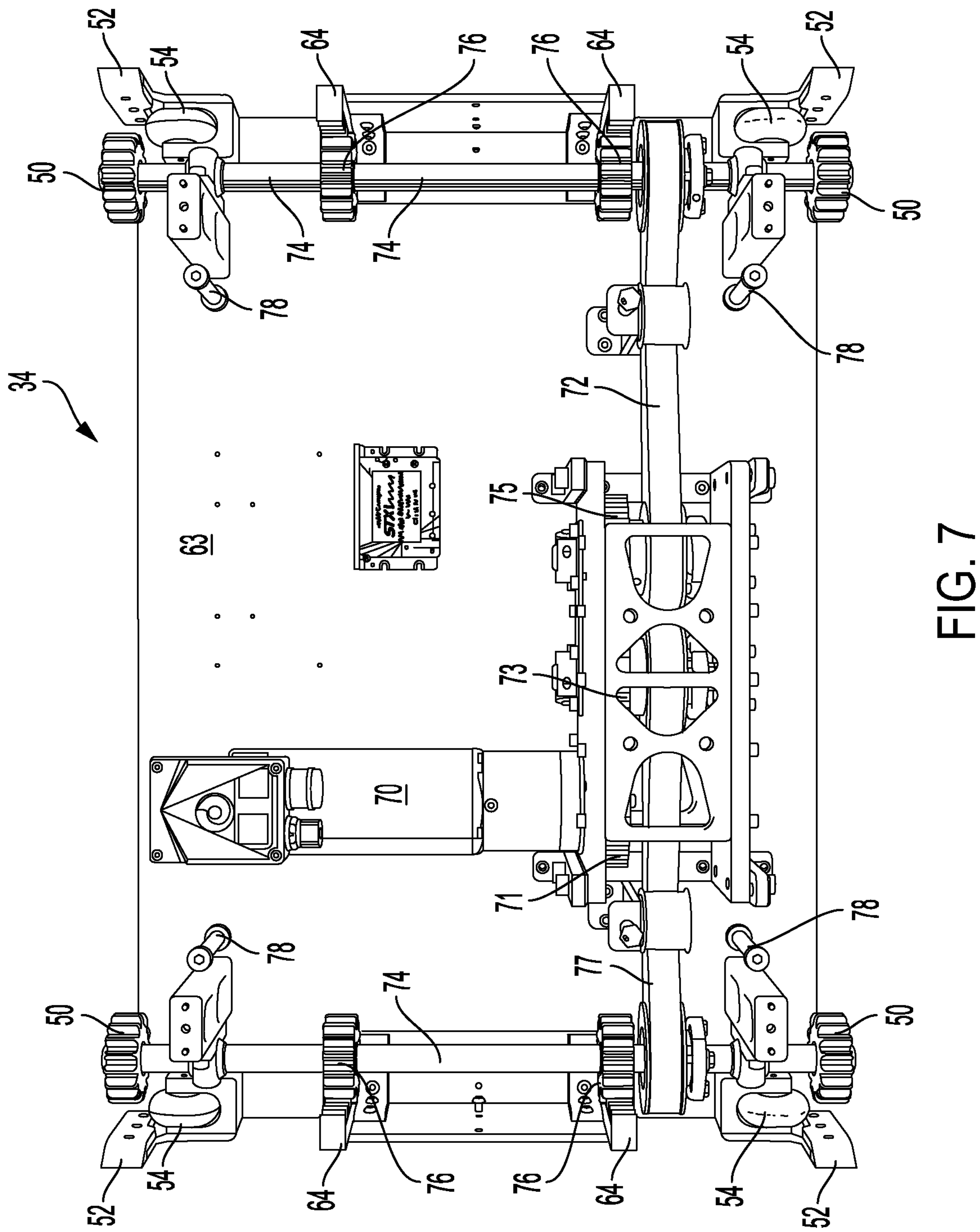
FIG. 7 shows an illustrative diagrammatic top view of the automated mobile carrier of FIG. 6 without the payload receiving portion.
Figure 13:
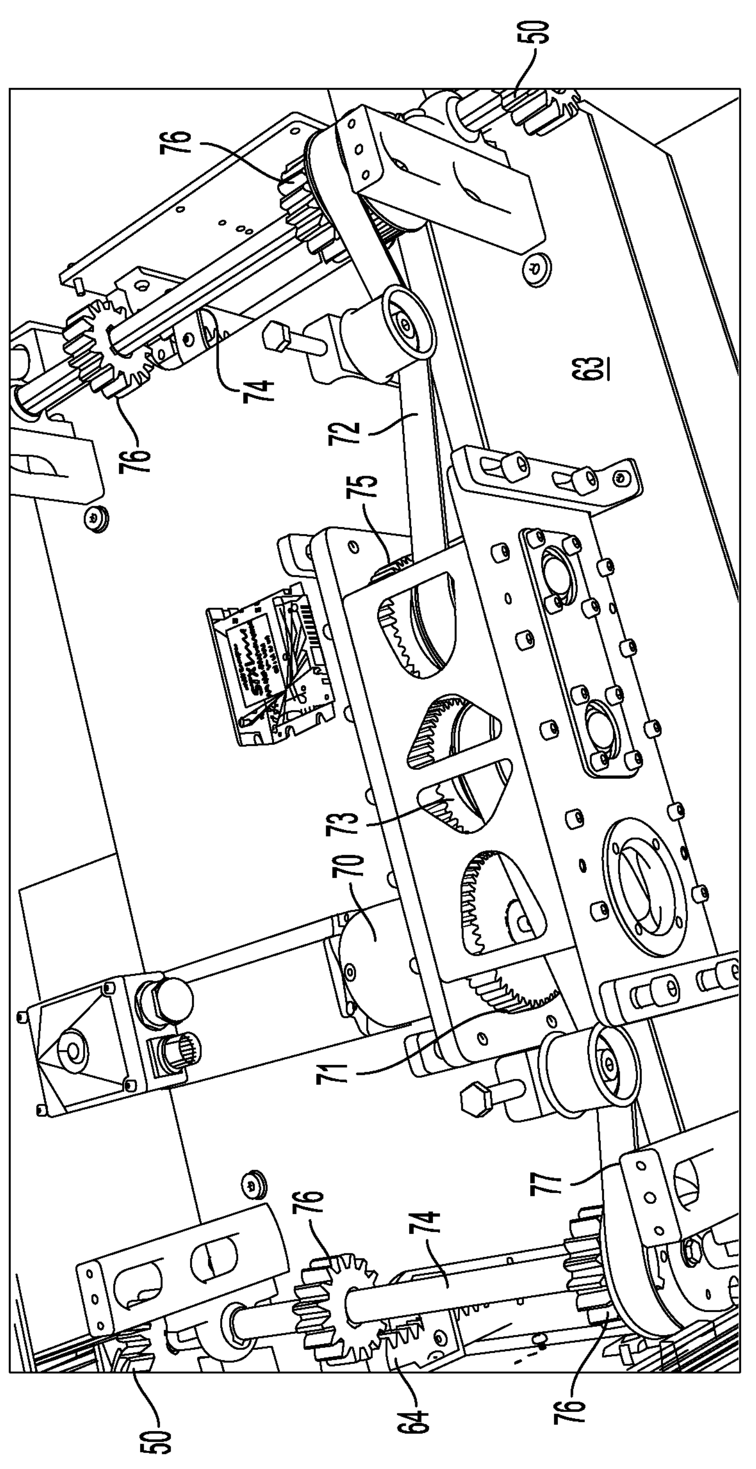
FIG. 13 shows an illustrative diagrammatic elevational view of the automated mobile carrier of FIG. 3 with the payload receiving portion omitted.

FIG. 6 shows a top view of the automated mobile carrier 12, showing the payload receiving portion 36 that includes the support ribs 37 and a back wall 35. Support ribs 37 provide a surface to support carried objects and, as will be described in more detail below, interleave between storage shelf supports to permit a transfer of the carried object to the storage shelf. The lift pinion gears 50 extend outside the outer periphery of the payload receiving portion 36. FIG. 7 shows a top view of the automated mobile carrier 12 without the payload receiving portion 36, showing a top view of the underlying support structure 34. The support structure 34 includes a motor 70 with a drive gear 71 on its shaft. The drive gear 71 drives a first side gear 73, which in turn drives a second side gear (all of which are also shown in FIG. 13). The first side gear 73 drives a first belt 77 and the second side gear 75 drives a second belt 72, and the first belt 77 and the second belt 72 respectively each drive a multi-purpose drive shaft 74. Each of the multi-purpose drive shafts is coupled to two lift pinion gears 50 (one at each end thereof), and is coupled to a pair of base pinion gears 76 as shown. As will be described in further detail below, the arrangement of drive gears and belts permit the motor 70 to drive pinion gears 50 simultaneously at the same rate but in opposite directions from each side of the mobile carrier 12.

Figure 8:
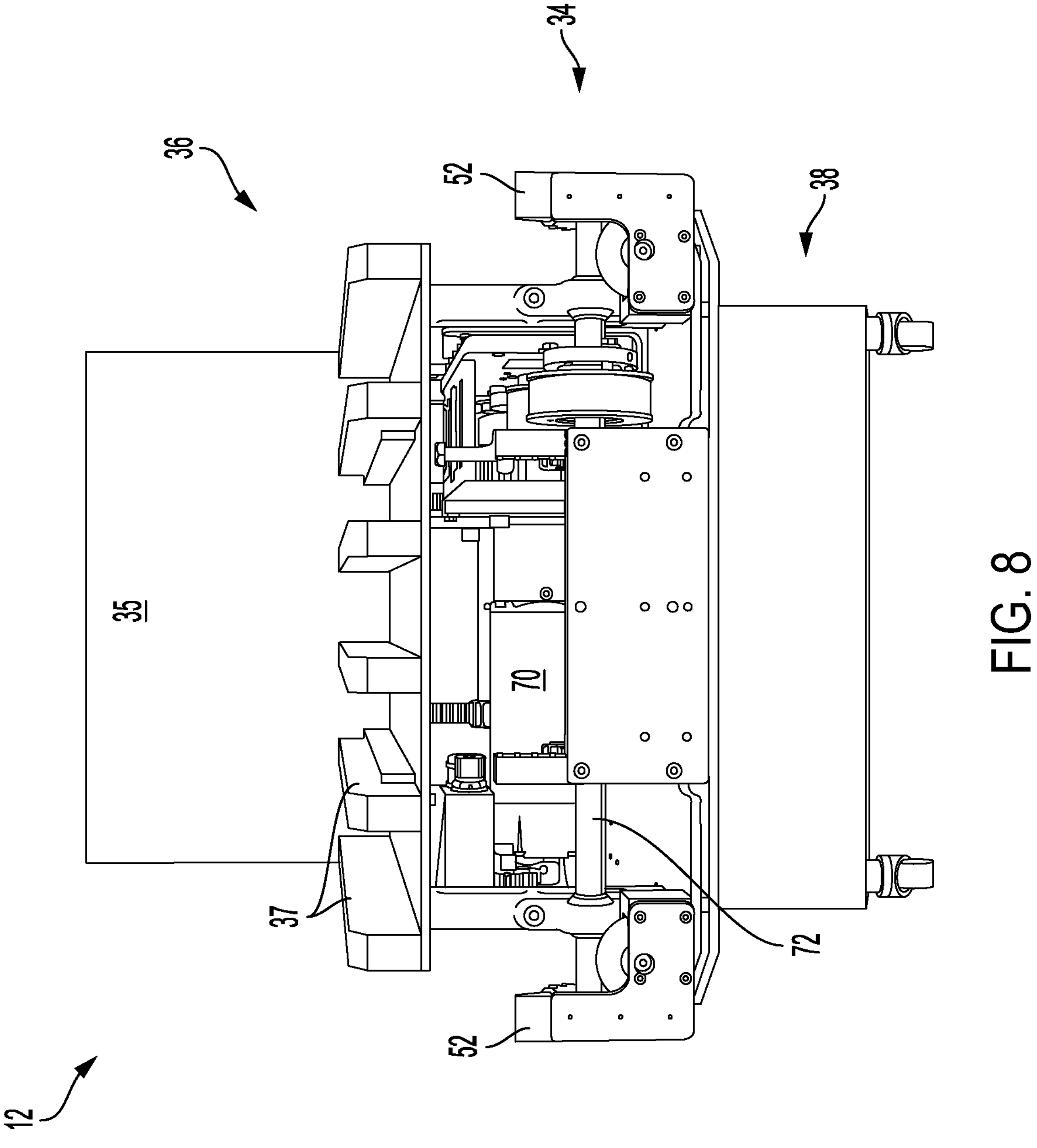
FIG. 8 shows an illustrative diagrammatic view of an end view of the automated mobile carrier of FIG. 6.
Figure 9:
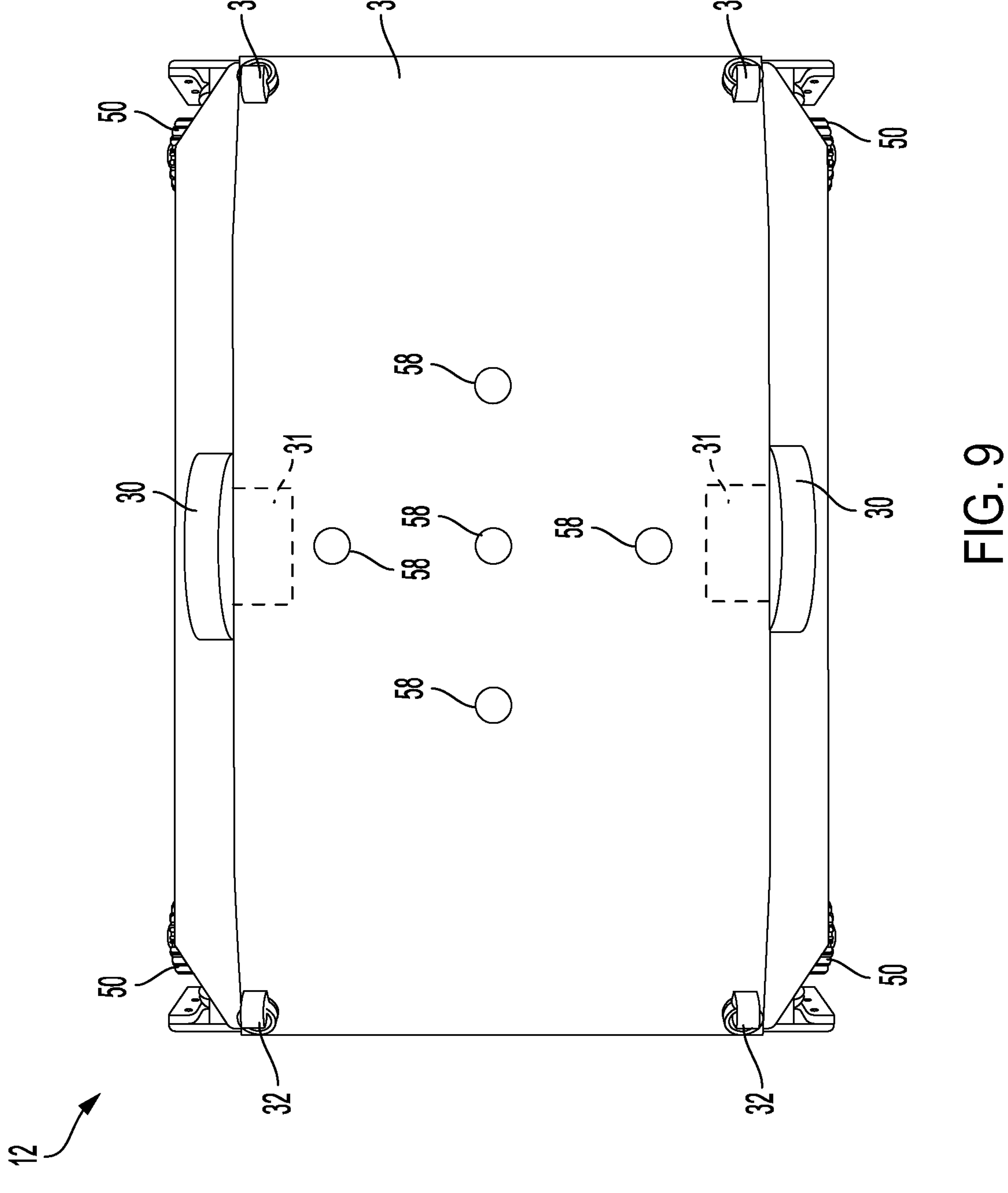
FIG. 9 shows an illustrative diagrammatic bottom view of the automated mobile carrier of FIG. 6.

FIG. 8 shows an end view of the automated mobile carrier 12 showing the carrier base 38, the support structure 34 and the payload receiving portion 36. The motor 70 is provided as part of the support structure 34. FIG. 9 shows an underside view of the automated mobile carrier 12, showing that the lift pinion gears 50 extend outside the body of the carrier 12, and the underside of the carrier includes one or more perception systems 58 for detecting indicia on the markers 28. The bi-directional independently operable drive wheels 30 are controlled by motors 31 in the carrier base 38.

Figure 10A:
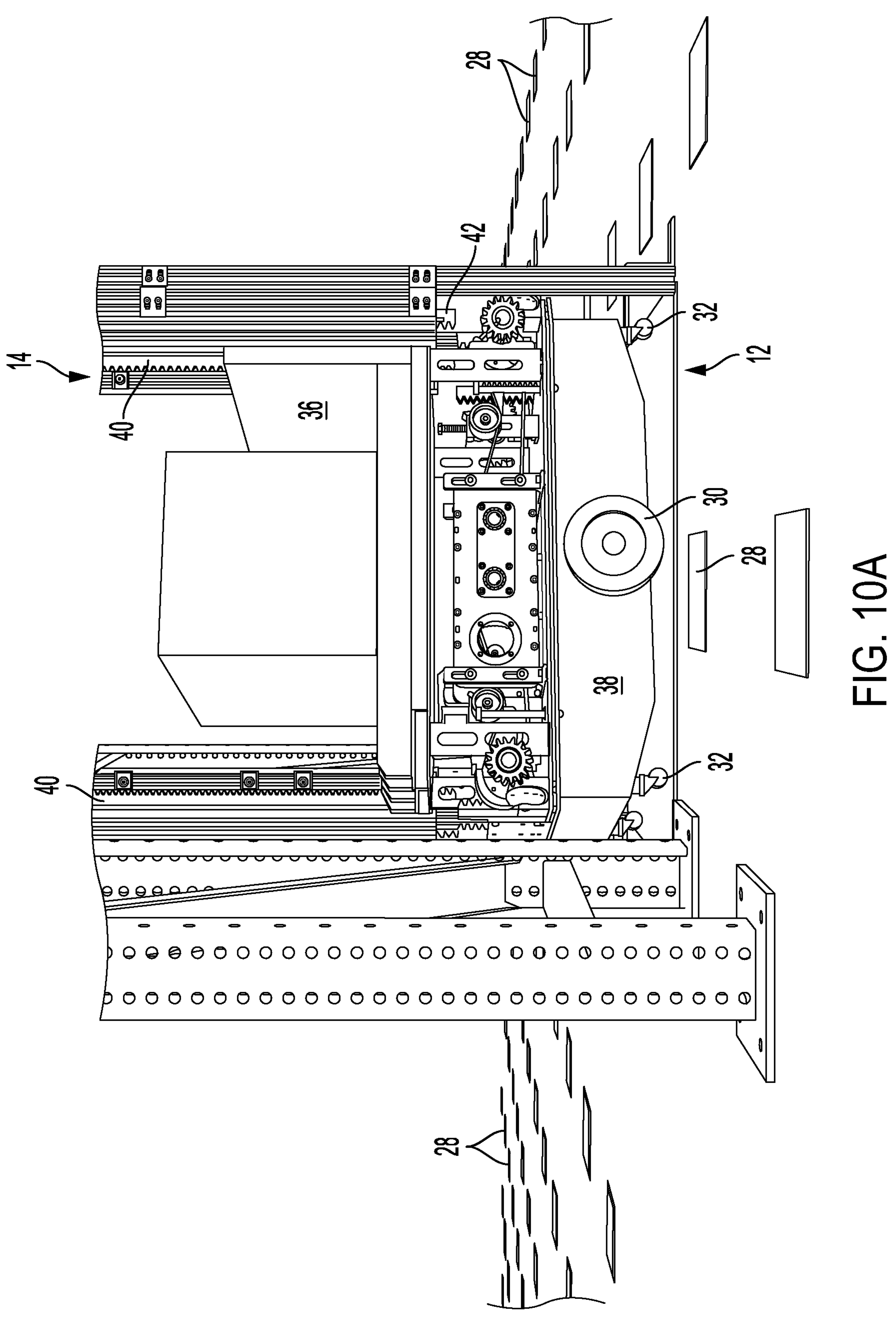
FIGS. 10A and 10B show illustrative diagrammatic views of the automated mobile carrier of FIG. 3 being rotated from a first position at the base of the vertical lift structures (FIG. 10A) to a second position at the base of the vertical lift structure (FIG. 10B)
Figure 10B:
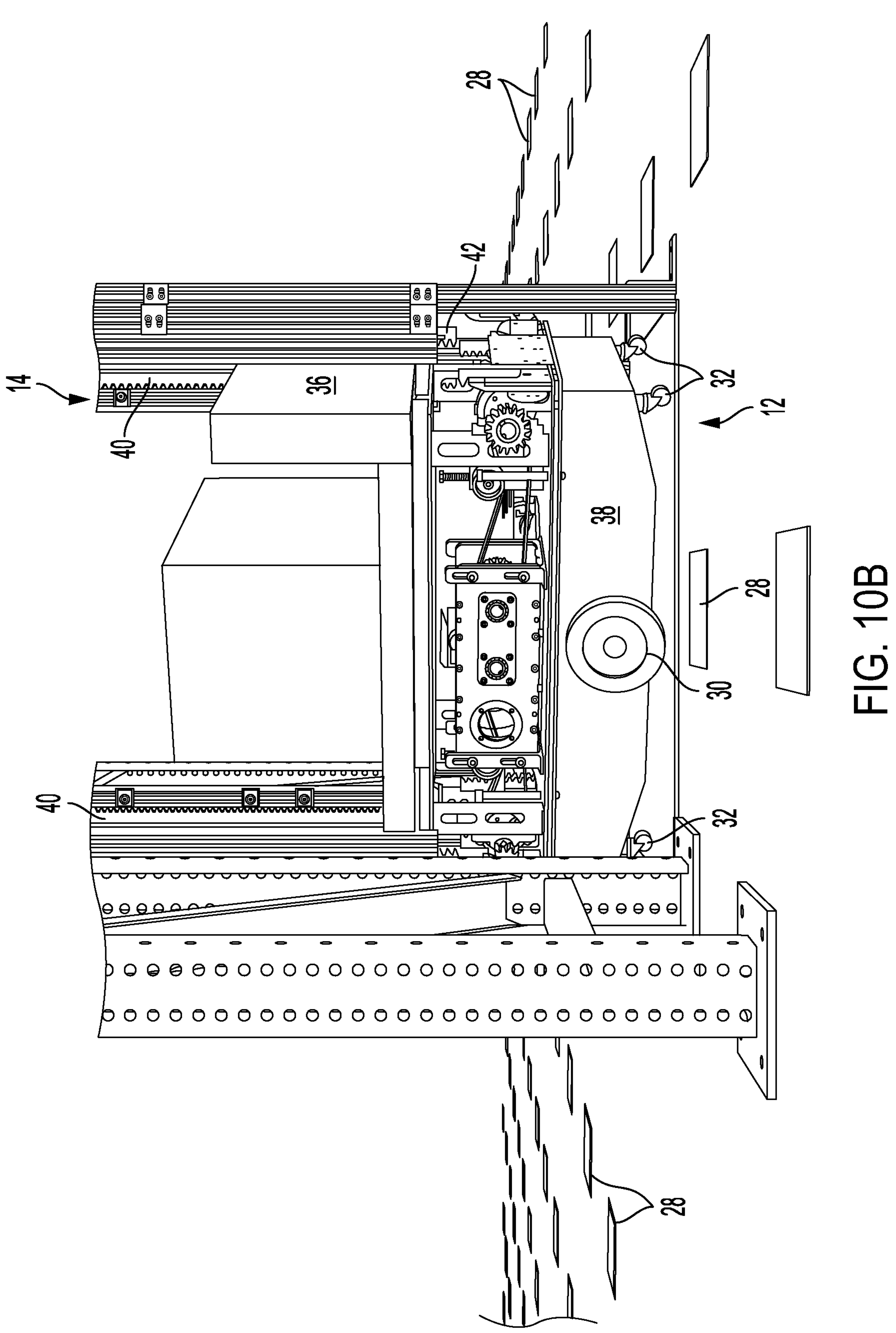

With reference to FIGS. 10A and 10B, the automated mobile carrier 12 may re-adjust its position within the base of the vertical structure 14 via actuation of either or both independently actuatable bi-directional drive wheels 30. FIG. 10A shows the automated mobile carrier 12 turned in a first direction with respect to the lift gear racks 40, and FIG. 10B shows the automated mobile carrier 12 turned in an opposite second direction with respect to the lift gear racks 40. The carrier 12 is able to be moved such that the lifting system remains below the lowermost ends 42 of the lift gear racks 40 during entry, repositioning and exit of the carrier 12 with respect to the vertical structure 14. In this way, the carrier 12 may position itself under the lift gear racks 40 such that the lift gear racks may be engaged by the lift gears 76 (of FIG. 7).

Figure 11A:
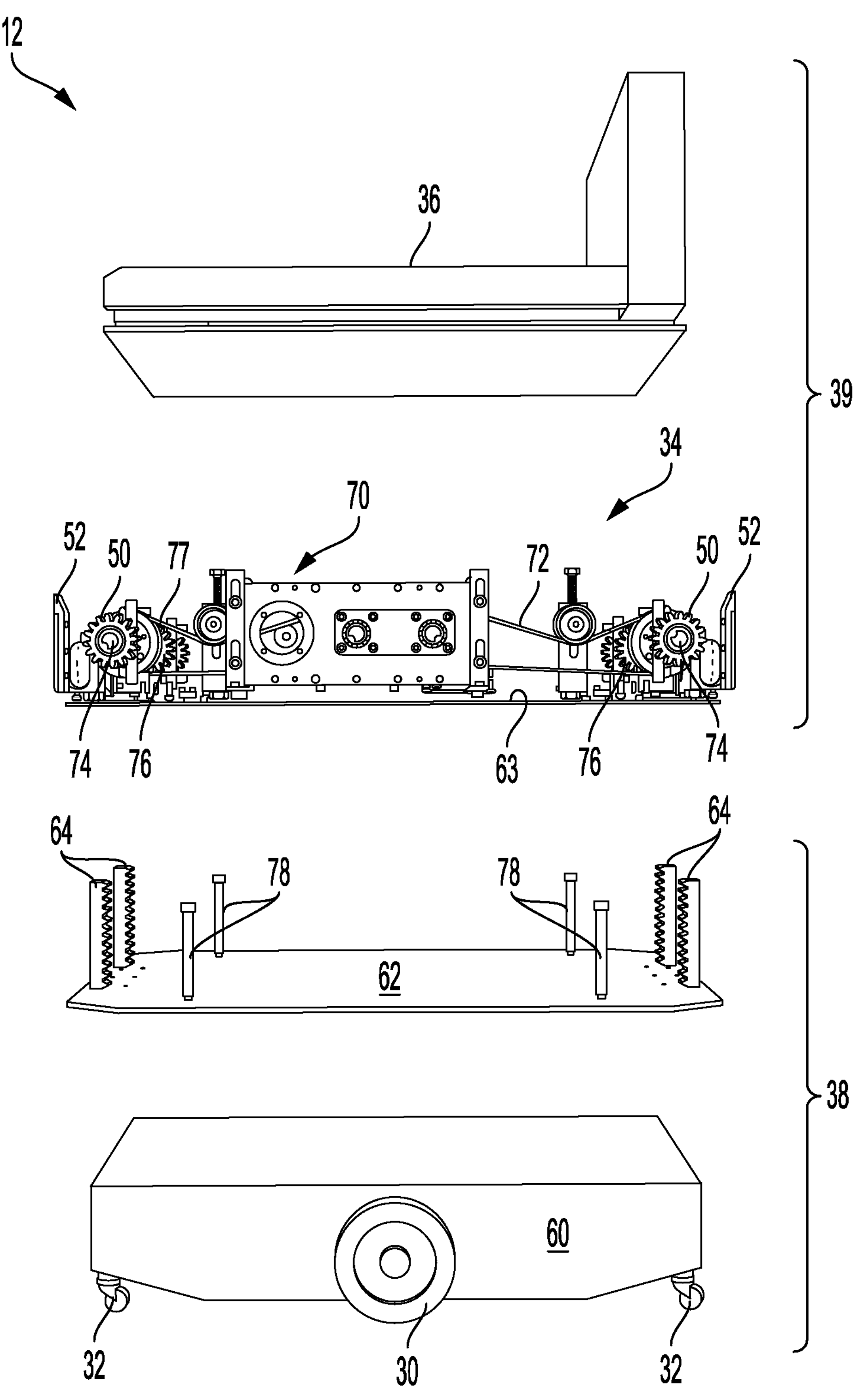
FIGS. 11A and 11B show illustrative diagrammatic exploded views of the automated mobile carrier of FIG. 3 showing a side exploded view (FIG. 11A) and an end exploded view (FIG. 11B)
Figure 11B:
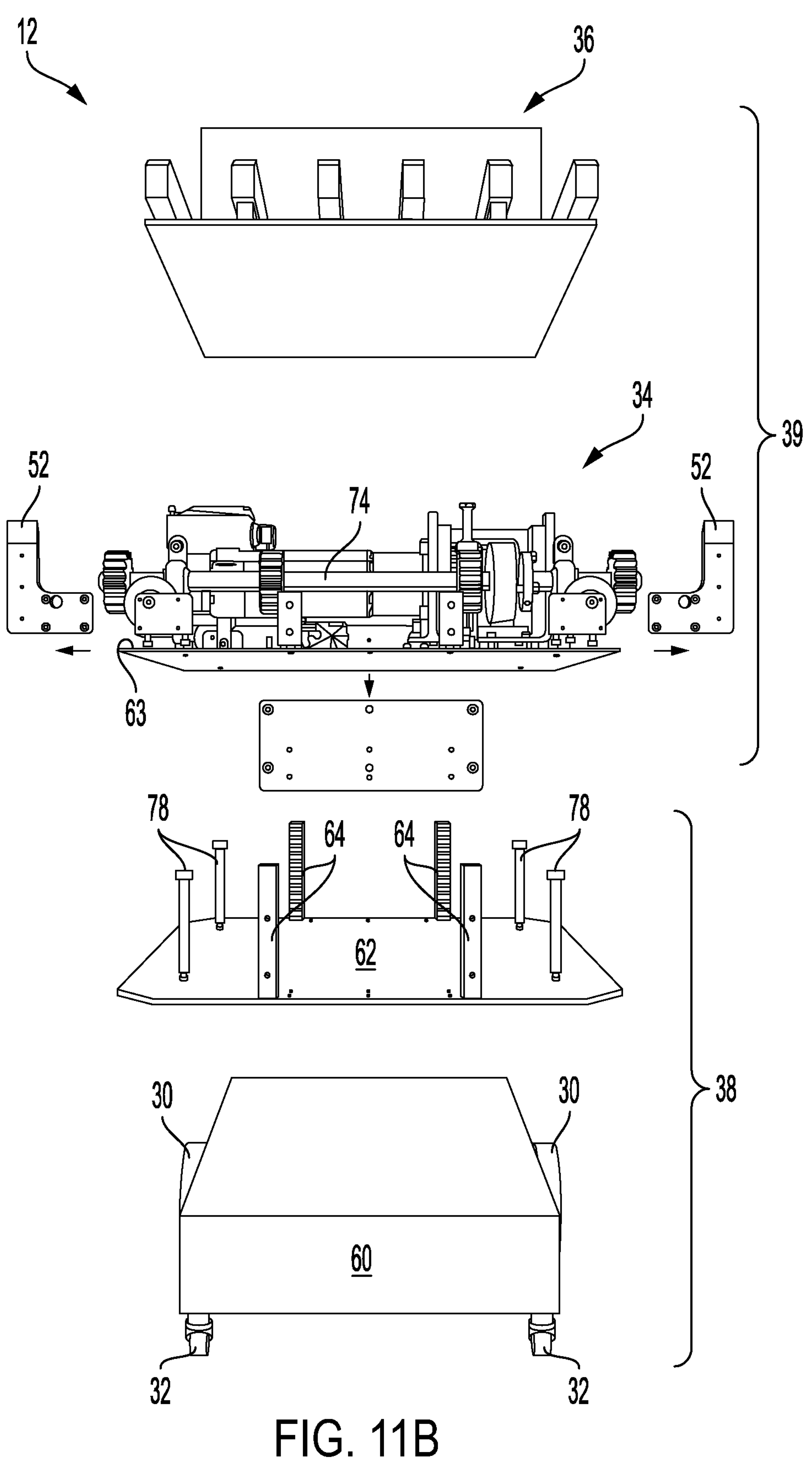

FIGS. 11A and 11B show side and end exploded views of the elements of the automated mobile carrier 12. With reference to FIG. 11A, the carrier base 38 includes a chassis 60 with the wheels 30, wheel motors 31 (as shown in FIG. 9) and casters 32. The carrier base 38 also includes a base top 62 that includes four base gear racks 64 that extend upward form the base top 62. The base top 62 is secured to the top of the chassis 60. The carrier upper portion 39 includes the support structure 34 and the payload receiving portion 36. When the side gears 73 are actuated, the side gears 73 climb along the base gear racks 64 causing the carrier upper portion 39 to rise upward with respect to the carrier base 38. The support structure 34 includes a support structure floor 63 and two multi-purpose drive shafts 74 that are driven by a single motor 70 via first belt 77 and second belt 72. With further reference to FIG. 11B, each multi-purpose drive shaft 74 includes two attached base pinion gears 50 (at ends thereof) and two attached lift pinion gears 76. The base pinion gears 76 (when powered by the motor 70), cause the support structure 34 to climb the base gear racks 64 of the carrier base 38, causing the support structure 34 to vertically separate from the carrier base 38.

Figure 12A:
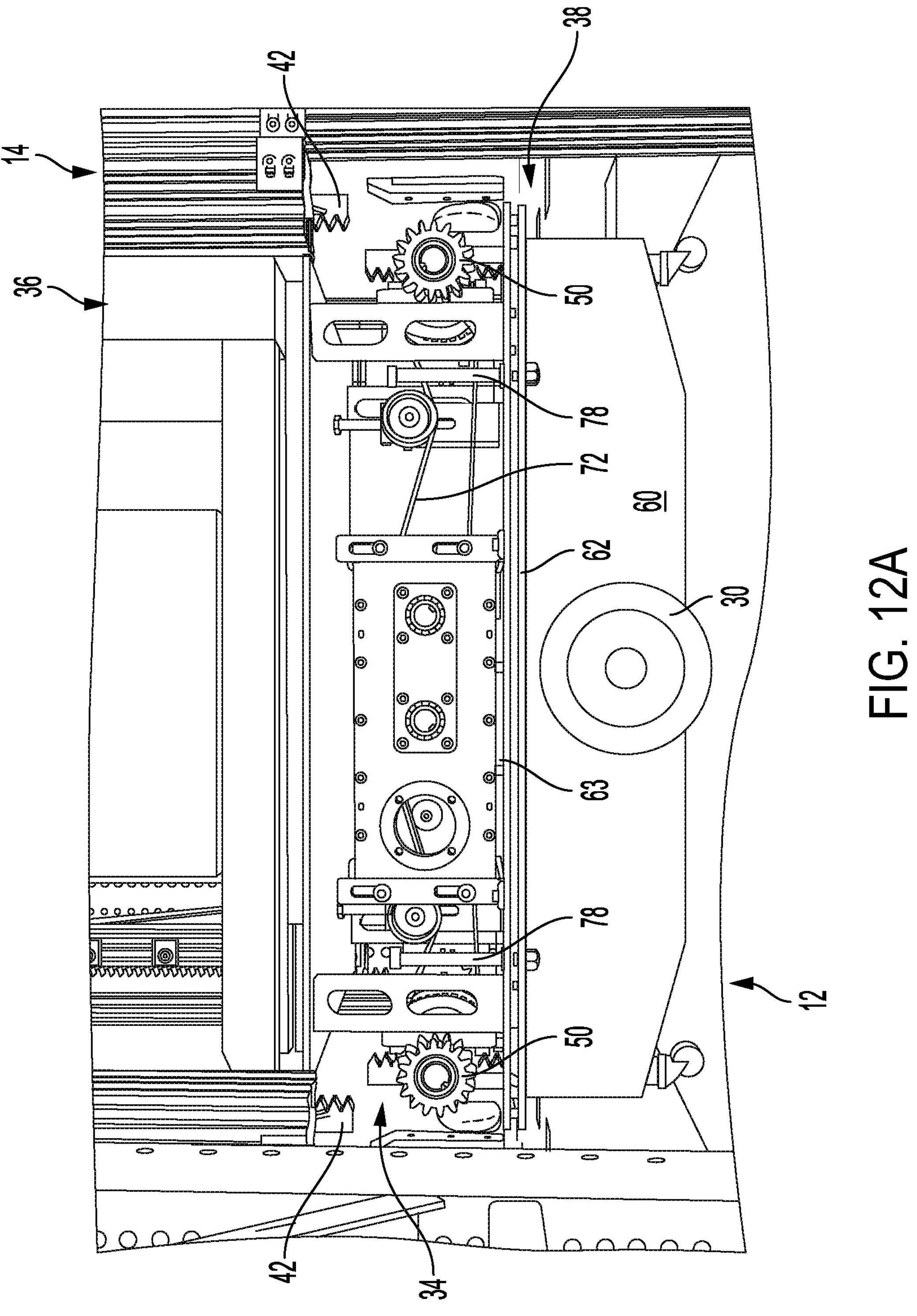
FIGS. 12A and 12B show illustrative diagrammatic side views of the automated mobile carrier of FIG. 3 positioned under the base of the vertical lift structure with the support structure not elevated (FIG. 12A) and the support structure elevated (FIG. 12B)
Figure 12B:
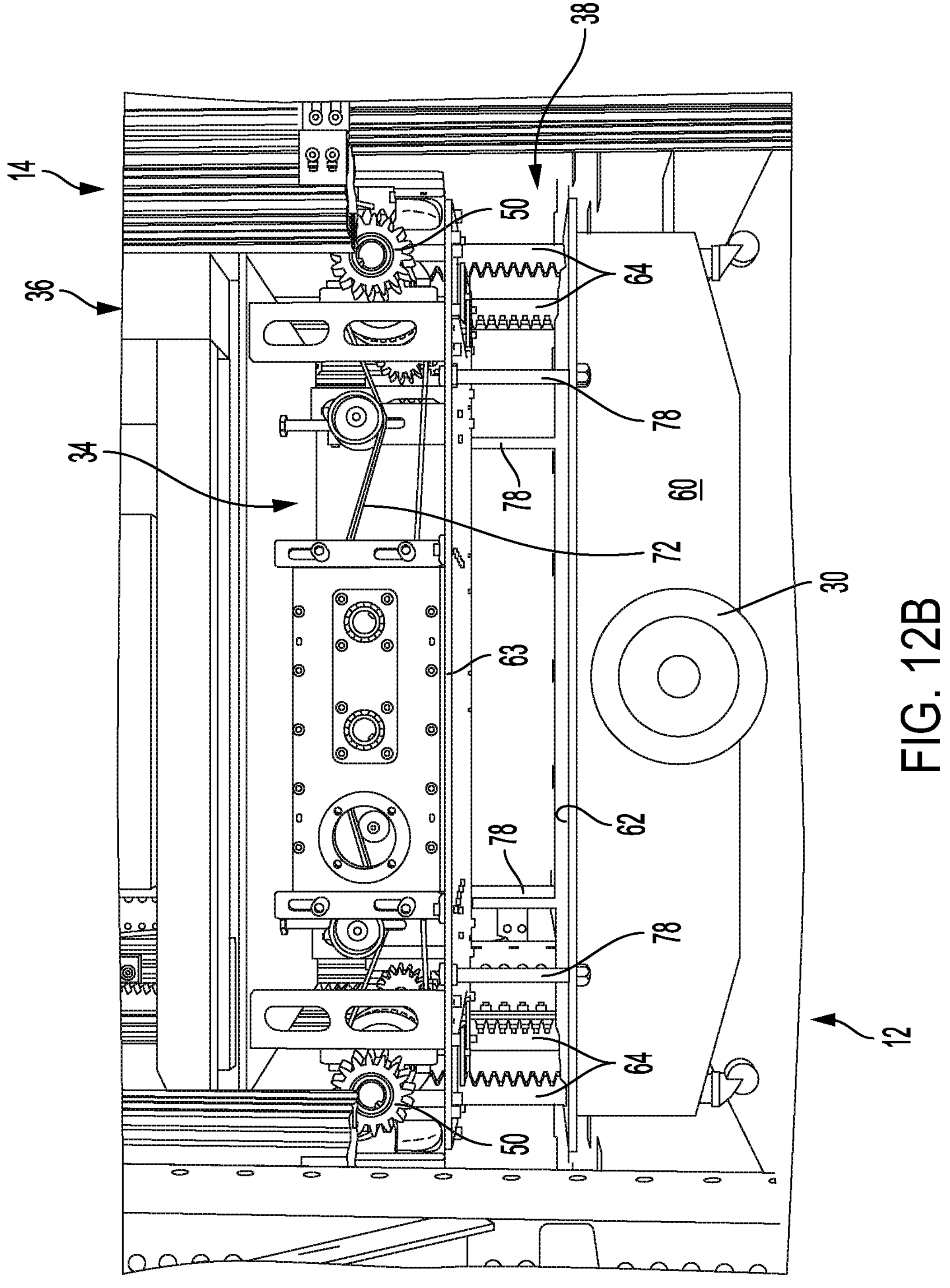

In particular, FIG. 12A shows the carrier 12 at the base of the vertical structure 14 with the support structure 34 of the carrier 12 resting on top of the carrier base 38. With reference to FIG. 12B, when the base pinion gears 76 are activated and climb the base gear racks 64, the support structure 34 vertically separates (lifts away) from the carrier base 38. The extent of separation is contained by capped slide rods 78, which maintain a maximum distance between the support structure 34 and the carrier base 38. Continued actuation of the lift pinions 50 (by the motor 70) causes the entire carrier 12 to rise along the lift gear racks 40.

Figure 14:
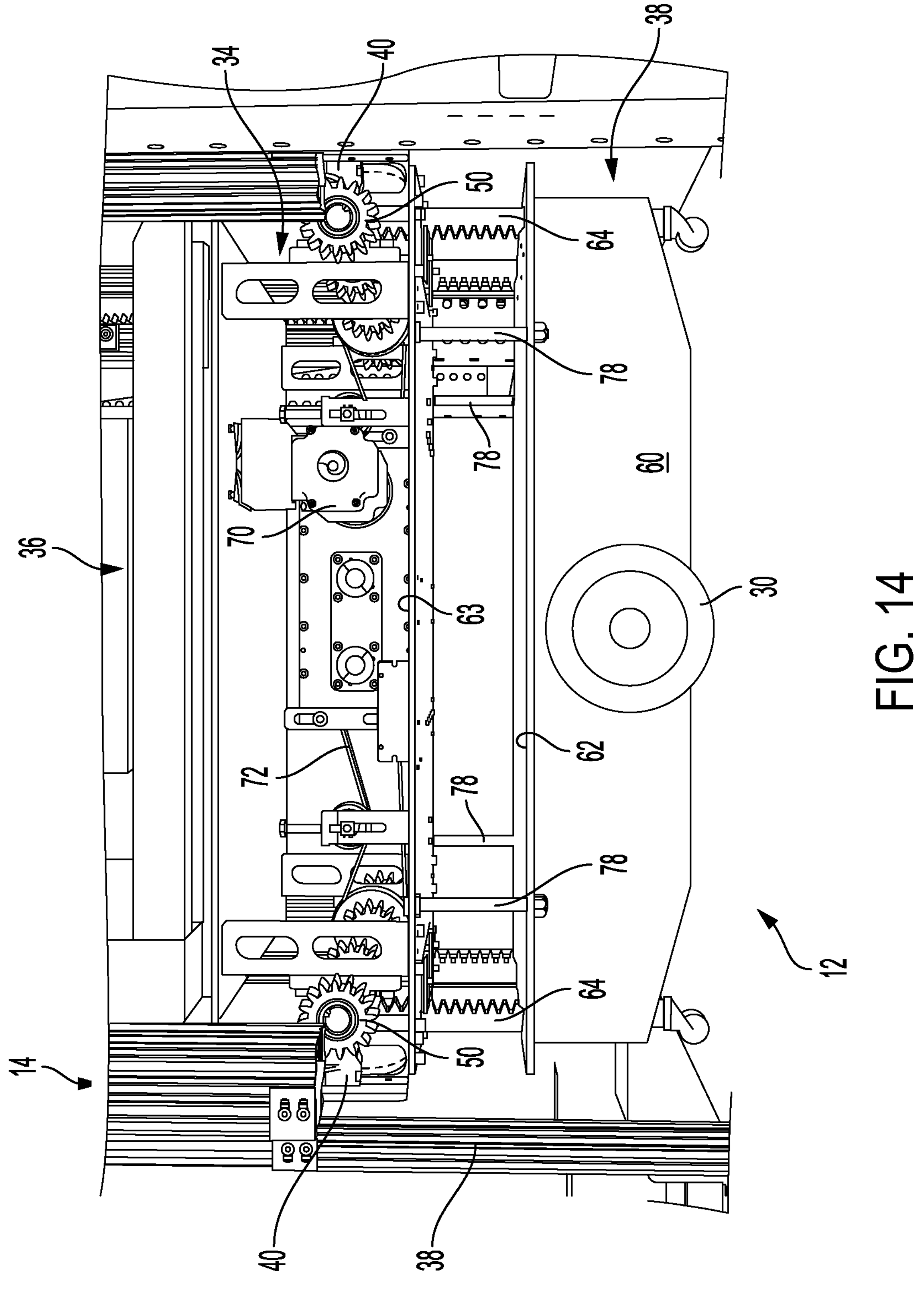
FIG. 14 shows an illustrative diagrammatic side view of the automated mobile carrier of FIG. 12B with the support structure elevated showing the automated mobile carrier from a second side opposite the side shown in FIG. 12B.

FIGS. 13 and 14 show the drive system including the motor 70 with the drive gear 71 attached to the motor shaft. With reference to FIG. 13, the drive gear 71 drives the side gear 73, which directly drives the side gear 75. Each of the side gears 73, 75 drives a belt 72, 77 that engages and drives one of the multi-purpose drive shafts 74. In particular, when the motor runs clockwise (from the perspective of FIG. 13) the drive gear runs clockwise, the side gear 73 runs counterclockwise and the side gear 75 runs clockwise. This causes the base pinion gears 76 on each side to climb the base gear racks 64 causing the lift pinion gears 50 to contact and engage the lift gear racks 40. Since base pinion gears 76 and lift pinion gears 50 are on a common shaft, continued rotation after lift pinion gears are engaged to the lift gear racks 40 will cause the base carrier 38 to separate further from the support structure 34 until the base pinion gears 76 disengage from the base gear racks 64. At that time, the base carrier 38 will effectively hang from the capped slide rods 78 (which limit the separation of the base carrier 38 from the support structure 34), and continued rotation subsequently causes the lift pinion gears 50 to climb the lift gear racks 40 causing the carrier 12 to rise along the vertical structure 14. Running the motor counterclockwise causes the lift pinion gears to lower the carrier 12 along the lift gear racks 40 of the vertical structure, and when the base pinion gears 76 contact the base gear racks 64, continued rotation brings the support structure 34 into contact with the carrier base 38 and lift pinion gears 50 disengage from the lift gear racks 40, releasing the carrier from any connection with the vertical structure 14.

FIG. 14 shows the carrier 12 from a side opposite the side shown in FIG. 12B with the support structure 34 elevated with respect to the carrier base 38. The support structure 34 is elevated with respect to the carrier case 38, and the lift pinion gears 50 are in contact with the lift gear racks 40. The capped slide rods 78 have terminated the separation of the support structure 34 from the carrier base 38 such that continued movement of the support structure 34 (via the lift pinions 50) causes the carrier 12 to rise along the lift rack gears 40.

Figure 15A:
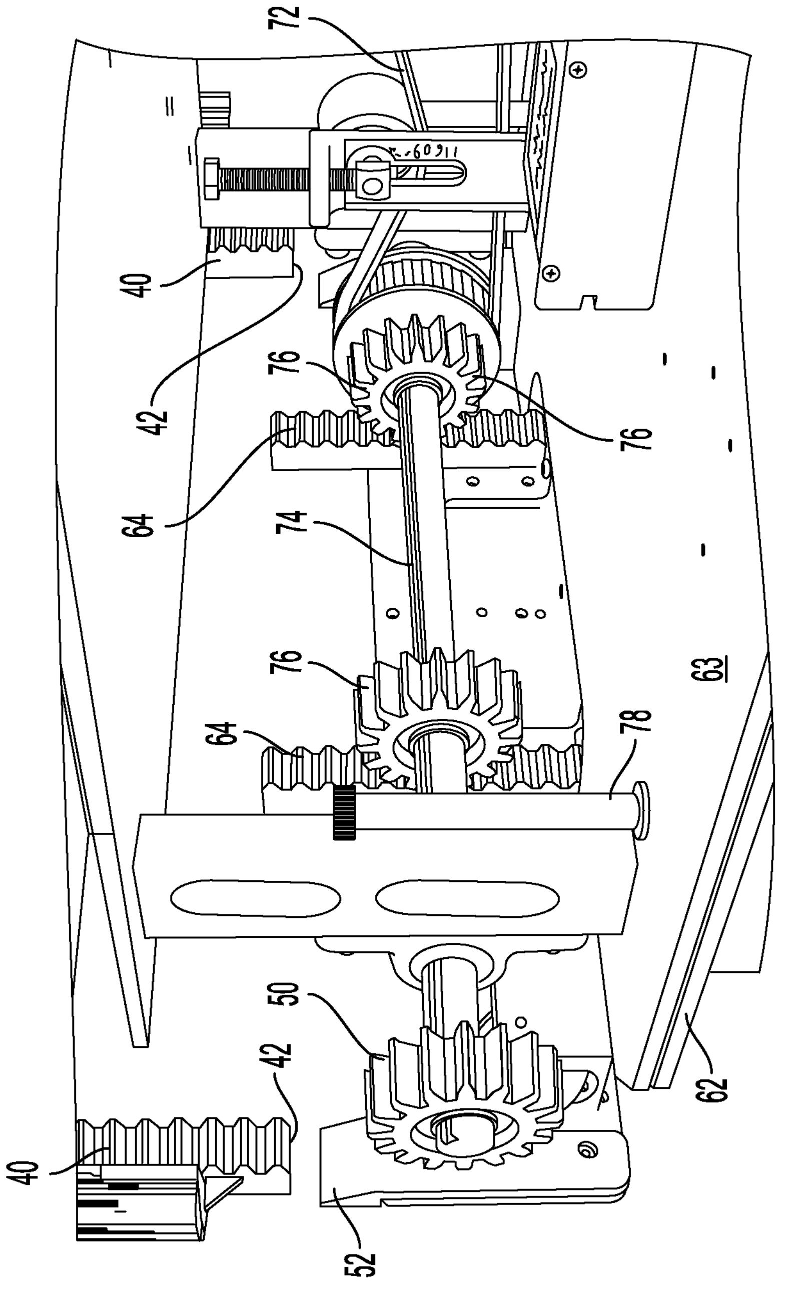
FIGS. 15A-15C show illustrative diagrammatic enlarged views of the lift pinion gears of the automated mobile carrier of FIG. 3, showing the pinion gears positioned below the lift gear racks (FIG. 15A), having engaged the lift gear racks (FIG. 15B), and climbing up the lift gear racks (FIG. 15C)
Figure 15B:
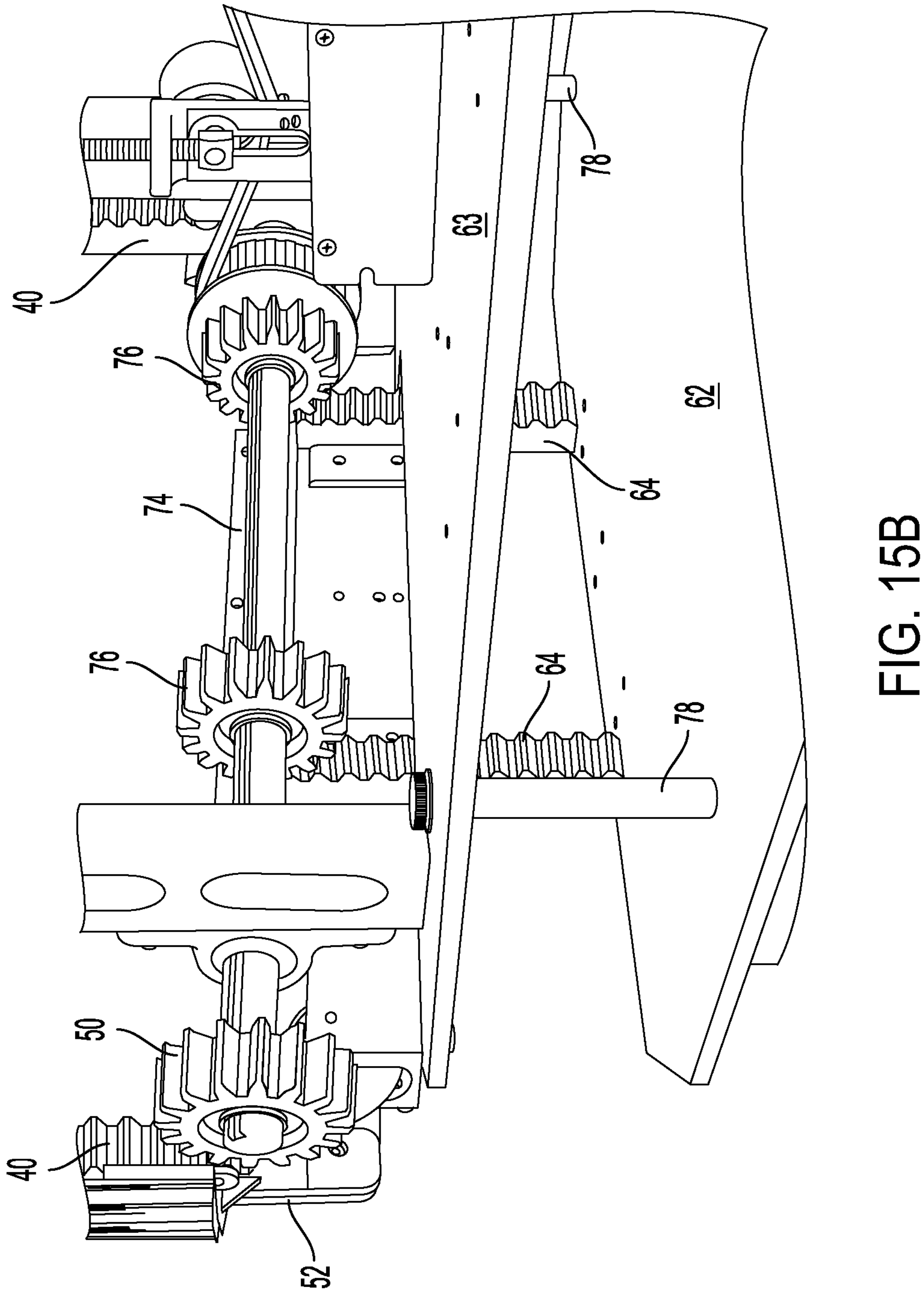
Figure 15C:
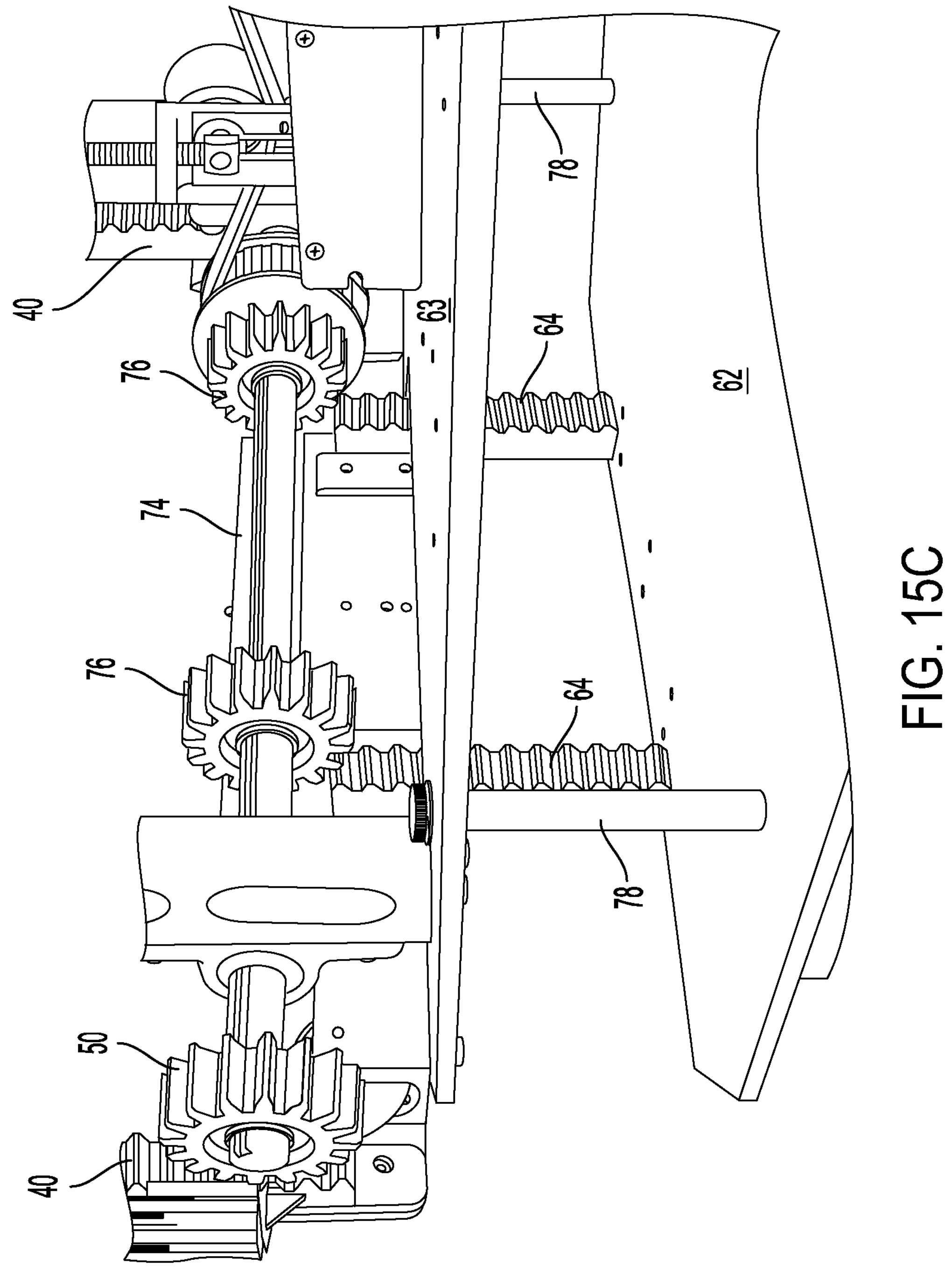
Figure 16:
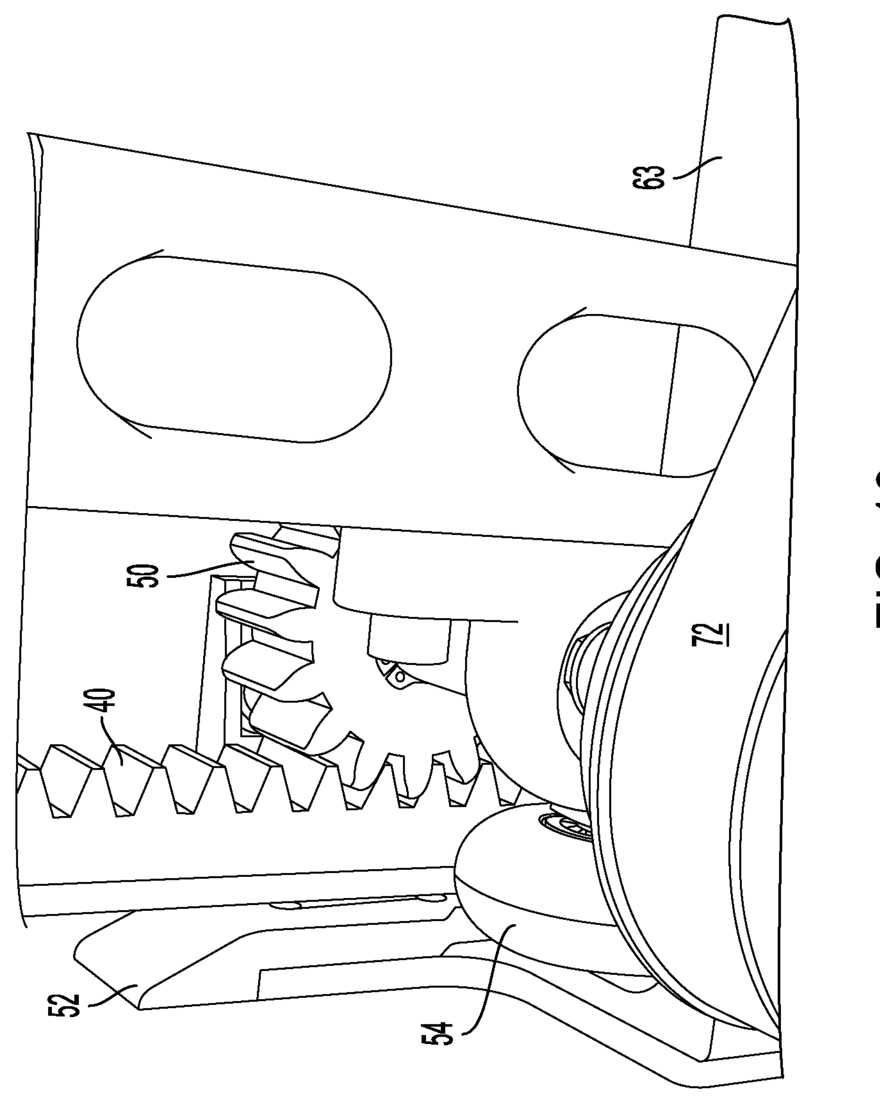
FIG. 16 shows an illustrative diagrammatic enlarged view of a pinion gear engaged with a lift gear rack.

FIG. 15A shows the base pinion gears 76 climbing the base gear racks 64 as driven by the motor via the belt 72. The support structure floor 63 is initially in contact with the base top 62, and the support structure base is free to slide along the capped slide rods 78. With reference to FIG. 15B, when the base pinion gears 76 near the top of the base gear racks 64, the lift pinion gears 50 engage the lift gear racks 40. As the shafts 74 continue to rotate, the load of the carrier is lifted by the lift pinion gears 50 as they climb the lift gear racks 40 as shown in FIG. 15C. When the lift pinion gears 50 approach the lift gear racks 40, a tapered end of the slide guide 52 facilitates engagement of the pinion gears 50 with the racks 40, and as the pinion gears 40 travel along the racks 40, alignment is maintained, at least in part, by the slide guide 52 and the freely rotating roller guide 54 as shown in FIG. 16.

The slide guides 52 may also provide that fewer lift pinion gears 50 may be used to lift the automated mobile carrier along fewer lift gear racks 40 because the slide guides 52 may provide a brace against which any cantilevered force from the weight of the automated mobile carrier (and any objects thereon) may be supported while engaged with any number of lift racks. For example, two lift pinion gears on the same side of an automated mobile carrier may be used to lift an automated mobile carrier (and object) by having the slide guides 52 brace against the associated two lift gear racks 40. Alternatively, two lift pinion gears on the opposite sides (e.g., opposite and alternate sides) of an automated mobile carrier may be used to lift an automated mobile carrier (and object) by having the slide guides 52 brace against the associated two lift gear racks 40. Further, three two lift pinion gears (two on one side and one on the other side) of an automated mobile carrier may be used to lift an automated mobile carrier (and object) by having the slide guides 52 brace against the associated two lift gear racks 40. In at least this way, two, three or four lift pinion gears 50 may be used to engage two, three or four lift gear racks 40.

With reference again to FIG. 1, each level of the shelving 20, 22, 24 includes a shuttle carrier 18 that moves objects to and from the automated mobile carrier 12 as well as to and from the shelving 16. Each shuttle carrier 18 is able to move along the shelving between two rows of shelves, and is able to rotate its payload receiving portion between positions facing each of the two opposing shelves as well as facing the automated mobile carrier 12. FIG. 1, for example, shows the shuttle carrier 18 on level 20 facing shelving in the foreground, shows the shuttle carrier 18 on level 22 facing the vertical structure 14, and shows the shuttle carrier 18 on level 24 facing shelving on the distal side (away from the foreground).

In accordance with an aspect, the automated mobile shuttle includes, for example, a mobile base unit for moving the automated mobile shuttle in at least one direction, a payload for supporting at least one object on a payload receiving portion, a payload rotation system for rotating the payload receiving portion about a first axis that is orthogonal with respect to the at least one direction of movement of the automated mobile shuttle, a payload translation system for translating the payload in at least a second direction that is orthogonal with respect to the first axis; and a payload elevation system for raising and lowering either the payload surface receiving portion along a third direction that is parallel with the first axis. In accordance with an aspect therefore, the system provides four major axes of motion, including drive movement of the carrier, rotation of the payload, extension of the payload and lifting of the payload. The degrees of freedom among the major axes of motion yields flexibility in providing longitudinally heterogenous storage as discussed herein.

Mobile shuttle position feedback (sometimes referred to as localization) can be achieved by many means familiar to those in the field of mobile robotics, which include but are not limited to measures of odometry, integrated calculation using inertia feedback from measurement units (IMU), unique localization markers (sometimes referred to as fiducials), non-unique localization markers with area markers/homing positions (e.g., counting pulses from regularly spaced flags), or even fixed point continuous measurement such as time-of-flight laser sensors, or multi-beacon triangulation.

It is further understood that even with mobile shuttles that engage a rack system, the shuttles (including in some cases shuttle-lift-transports) may leave the racks altogether to perform a package exchange or other operation outside the racks. Additionally, the choice of drive should pair with the choice of localization technology as well as the previously mentioned additional mobilities outside the captive-rails embodiment to achieve the overall system goal.

In accordance with various aspects, the system provides versatility of payload handling using a multitude of closely pitched tines that have the ability to interface favorably with almost any package wider than 2× the tine pitch. Moreover, the design can be scaled up or down to accommodate differing environments. For example, the tines may be pitched closer together to handle even small objects or significantly farther apart for consistently large objects. In accordance with an aspect, the smallest objects may be a least 3 inches or 5 inches in its shortest dimension. With this aspect smaller objects would be transportable when grouped into larger carrying units (e.g., in boxes, bins, trays or totes).

In accordance with a further aspect, the invention provides a shuttle carrier payload portion that includes a roller tip that shares the load after lift during extraction between the rollers resting on the shelf valleys and the guide or rollers within the shuttle body. The same load sharing occurs during shelf insertion and exchanges with system level induct and discharge devices. This strategy that provides support from two ends is significant with regard to the components selection for a given load.

Each shuttle carrier may receive an object from a mobile carrier 18, move along a row between a plurality of shelving locations, and provide the object to any of the shelves on either side along the row. The mobile shuttle carriers 18 are also adapted to retrieve objects from the shelves and bring the retrieved objects to a mobile carrier 18. The system 10 may receive input objects and provide retrieved objects via the mobile carrier 18 that moves among the processing ends of each of the rows. Operation of the system (and all of the systems disclosed herein) may be provided by one or more computer processing systems 100 in communication with the mobile shuttle carriers 18 and the automated mobile carriers 12 herein described.

Figure 17:
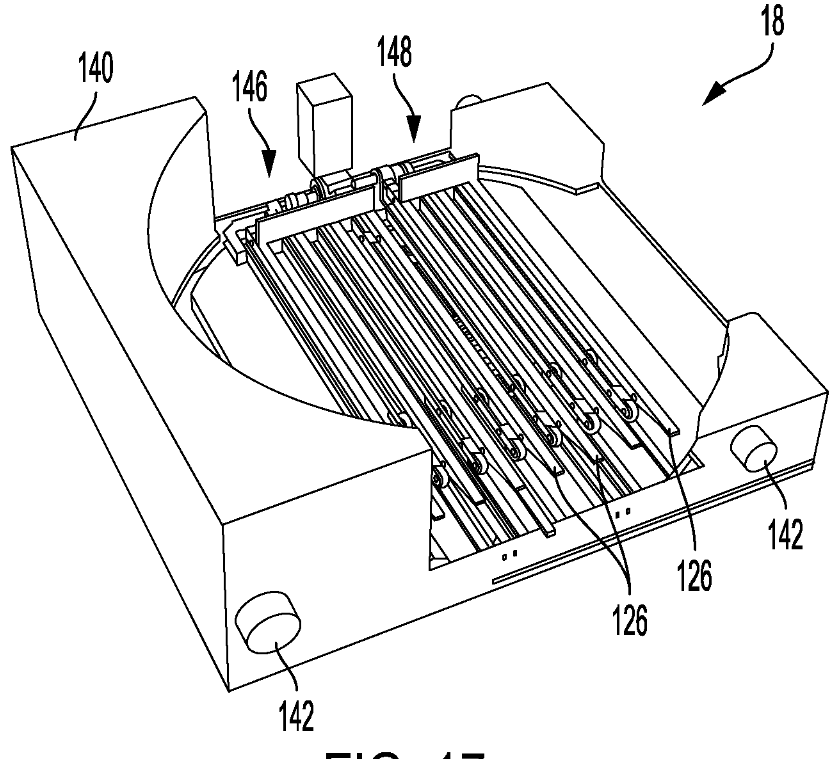
FIG. 17 shows an illustrative diagrammatic side elevated view of a mobile shuttle carrier for use in the system of FIG. 1.
Figure 18:
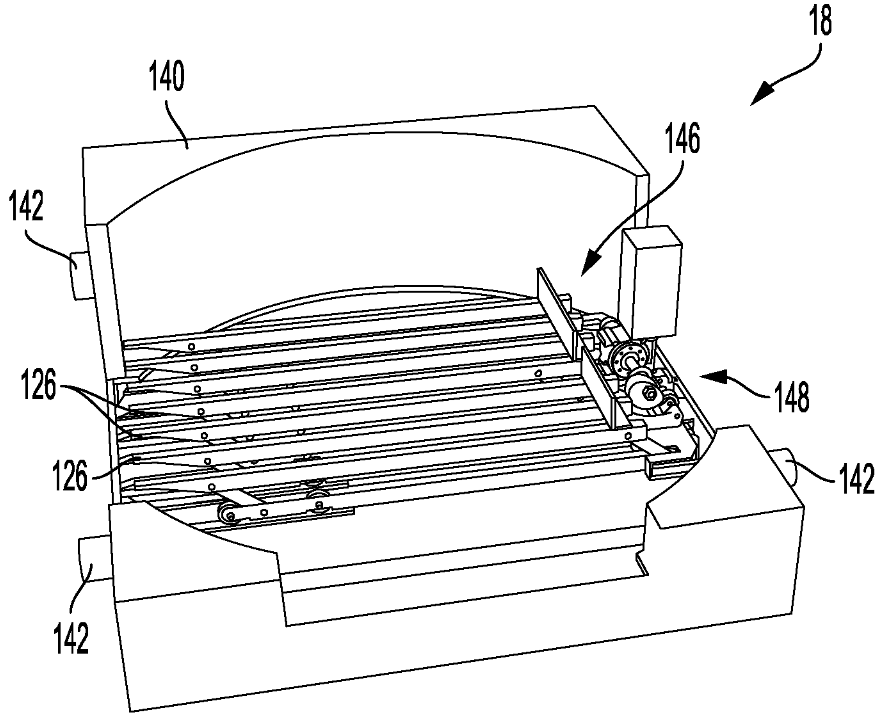
FIG. 18 shows an illustrative diagrammatic end elevated view of the mobile shuttle carrier of FIG. 17.
Figure 19:
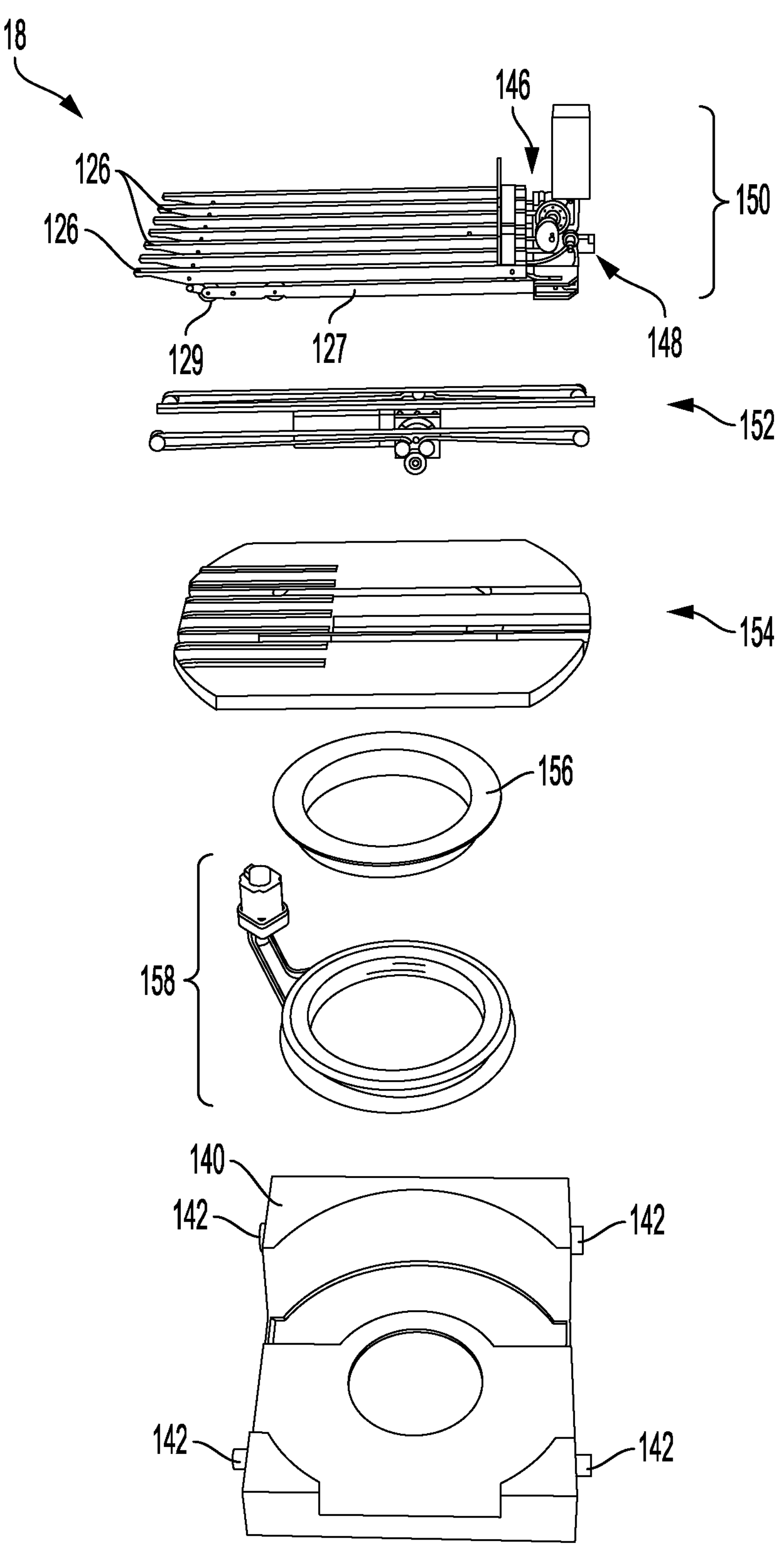
FIG. 19 shows an illustrative diagrammatic exploded side view of the mobile shuttle carrier of FIG. 17.

With reference to FIGS. 17 and 18, each mobile shuttle carrier 18 (in accordance with an aspect of the invention) includes a mobile unit chassis 140 with four wheels 142 (e.g., two of which are powered by motors within the chassis housing) for moving the carrier 18 along rails 144 (shown in FIGS. 23 and 24) that are mounted to the inner sides of the shelves 112. FIG. 17 shows a rear elevational view of the mobile shuttle carrier 18 and FIG. 18 shows a front elevational view of the mobile shuttle carrier 18. The position of each mobile shuttle carrier 18 along the shelving is monitored by sensor systems on the carriers 18 and the shelving 112. With further reference to FIG. 19, a payload receiving portion 150 that includes tines 126 is provided on a translation system 152 for moving the payload with respect to a translation base 154. The translation base 154 includes an attached gear 156 that is driven by a rotation system 158 with respect to the chassis 140. The tines 126 are provided as two sets, each set of which is mounted for elevational movement by independent elevation actuation systems 146, 148 (as discussed in more detail below).

In accordance with certain aspects therefore, the system provides positioning of the shuttle tines 126 such that they longitudinally aligned with valleys in the shelving 112 of the shelf system. In accordance with further aspects, the system may separate areas of the shelving (aisles, vertical levels, longitudinal bays) by package size and the position is less variable in the longitudinal direction. In these cases the tines must still align but the one-for-one relationship of tine to valley is not as important where, for example, a subset of the shuttles within the fleet may only see large packages for instance and can have wider spacing of the payload tines and interface at 5*x* the shelf pitch.

Figure 23:
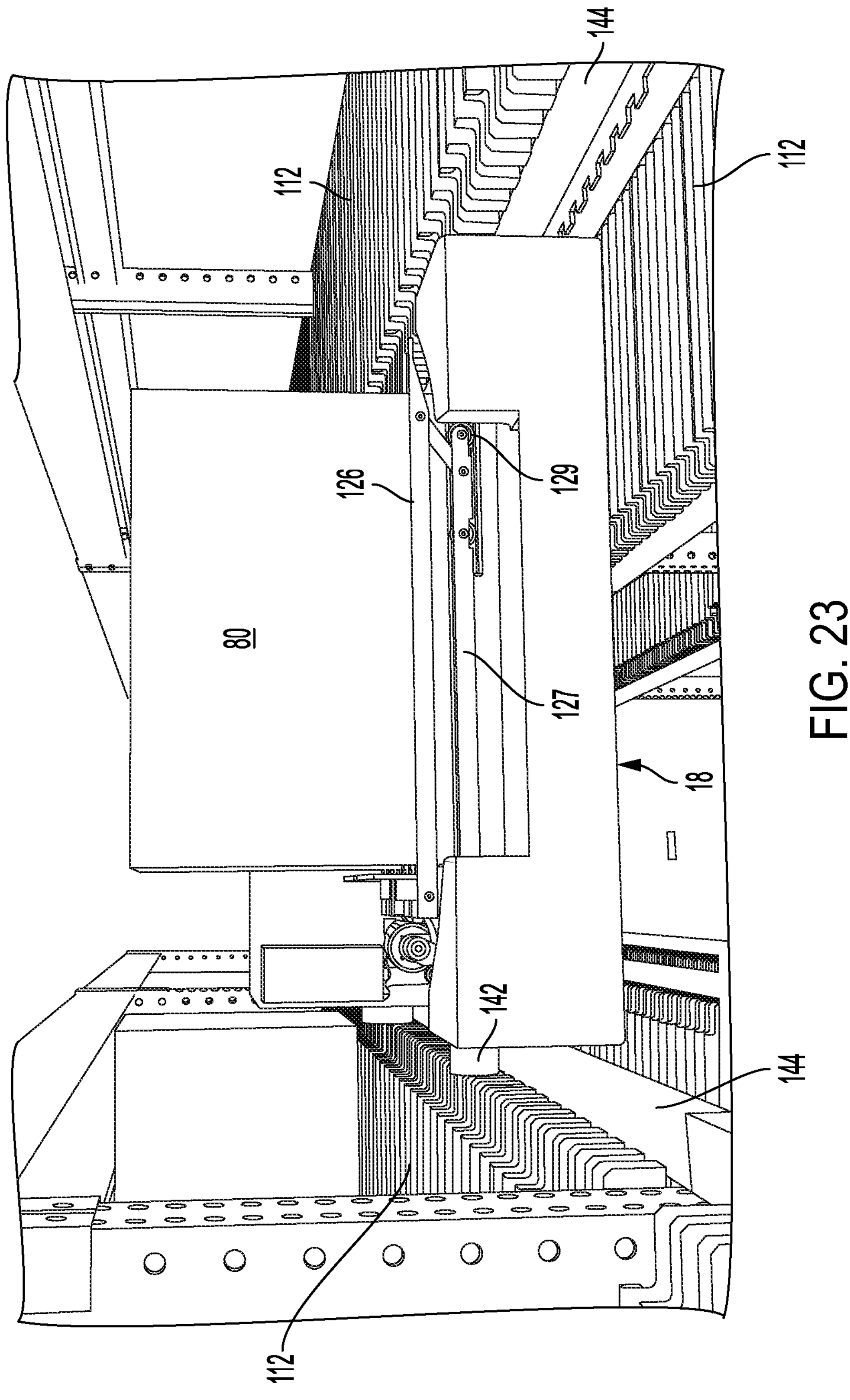
FIG. 23 shows an illustrative diagrammatic end view of the mobile shuttle carrier moving between shelving in the system of FIG. 1.
Figure 24:
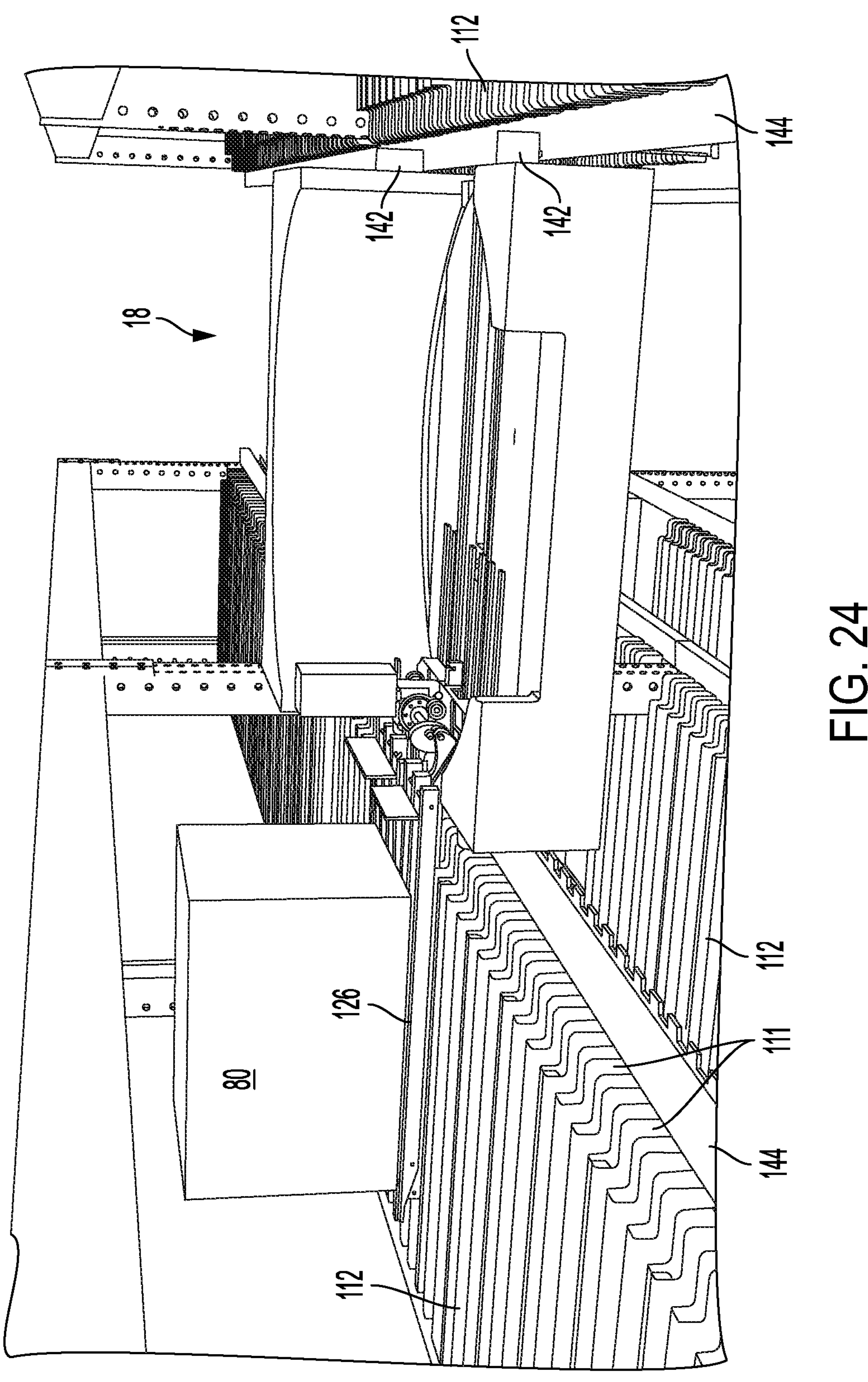
FIG. 24 shows an illustrative diagrammatic end view of the mobile shuttle carrier of FIG. 23 transferring the object onto a shelving unit.

FIG. 19 shows that the tines 126 are each supported by runners 127, and the runners each includes one or more lead rollers 129 (as also shown in FIGS. 17, 18 and 23). The corrugated shelf includes crests 113 and valleys 111 (shown in FIG. 24), and the runners are aligned with and enter the valleys 111 such that the lead roller(s) 129 enter the valleys 111 of the shelf and begin to distribute the load to the shelf during transfer. The corrugated shelves may be continuous (as shown) or discontinuous (e.g., formed of disconnected u-shaped troughs) along the shelf direction. FIG. 24 shows the payload receiving portion 150 having been extended into the shelf 112 by the translation system 152. The payload receiving portion 150 may be extended in an elevated position (as shown in FIG. 24) when an object is being placed onto the shelf (and then lowered when withdrawn), or may be extended in a lowered position when removing an object from the shelf (and then raised when withdrawn).

Figure 20A:
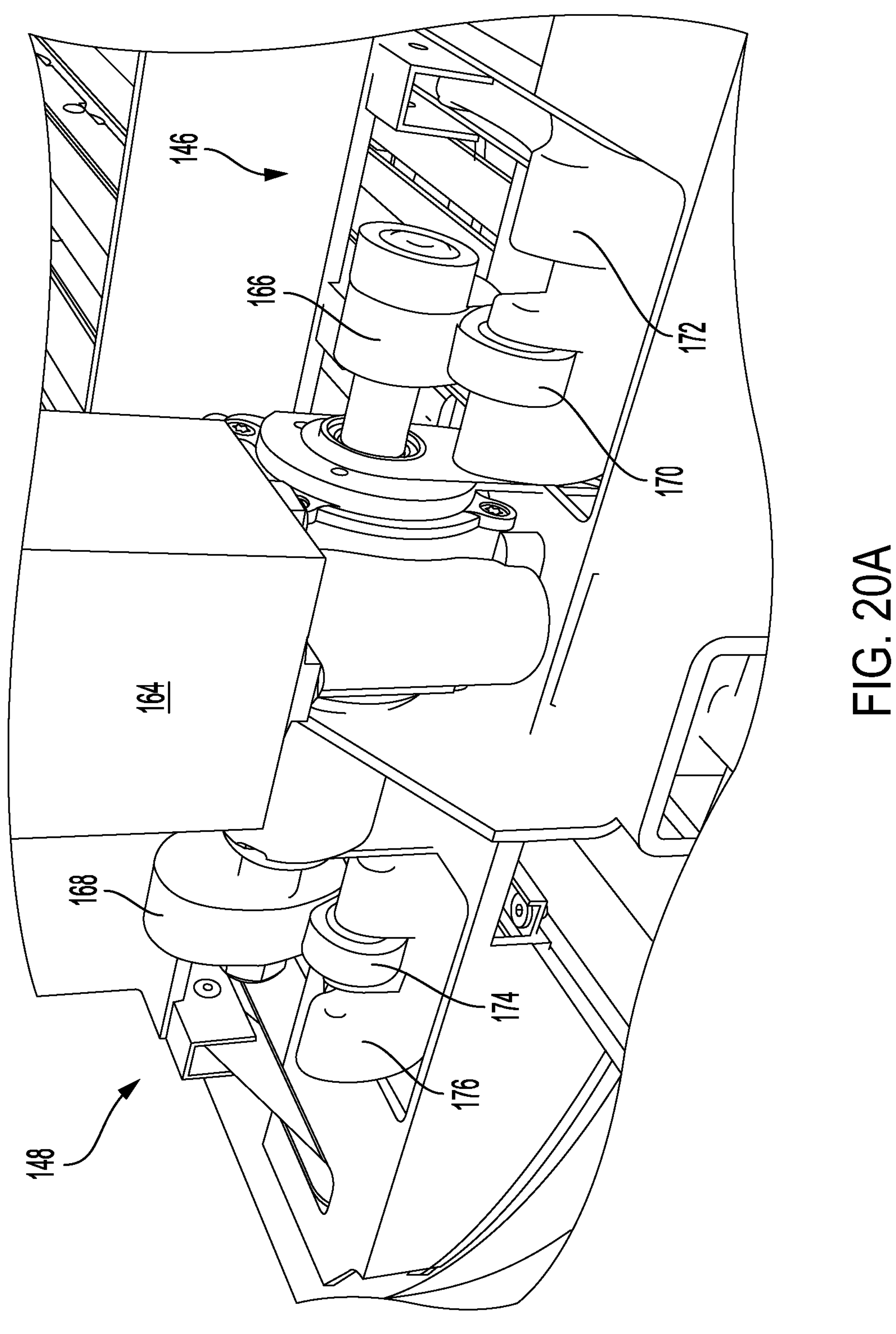
FIGS. 20A and 20B show illustrative diagrammatic enlarged views of shuttle elevation actuation systems of the mobile shuttle carrier of FIG. 17 showing the shuttle elevation actuation systems not lifting a payload receiving portion (FIG. 20A) and lifting the payload receiving portion (FIG. 20B)
Figure 20B:
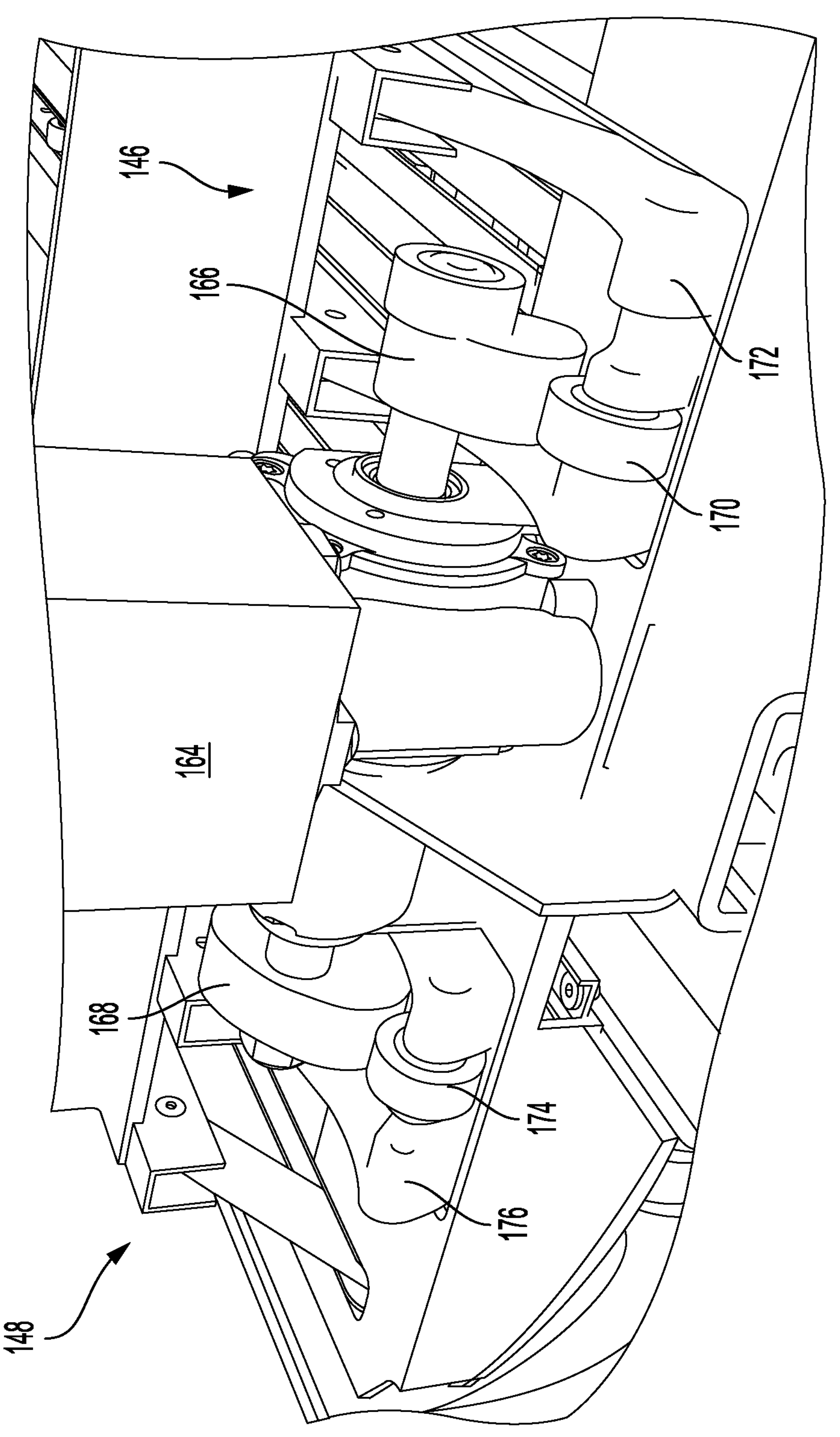

The elevation actuation systems 146, 148 discussed with reference to FIGS. 17-19 are independently actuatable to raise either a first set of associated tines and/or a second set of associated tines. With reference to FIGS. 20A and 20B, the actuation is provided by a pair of cams 166, 168, one of which (166) may be urged against a first cam follower 170 of a first rocker base 172, and the other of which may be urged against a second cam follower 174 of a second rocker base 176. Actuation of the cams is provided by a motor system 164 with the cams 166, 168 mounted on a double ended shaft. When a rocker base is pushed down, an associated set of tines is raised. FIG. 20A shows both cams 166, 168 having been rotated further such that neither rocker 172, 174 is engaged by a cam, causing all tines to be lowered. FIG. 20B shows both cams 166, 168 having been rotated such that both rockers 170, 174 are urged downward lifting all tines.

Each mobile shuttle unit therefore provides rotational adjustment of its payload, elevational adjustment of its payload and translational adjustment of its payload. Because the system records where objects are placed, the system has a record at all times of all objects locations on the shelves. One payload elevation system for example, may be used with multi-position cams to provide segmented elevation of the payload tines. This permits greater flexibility in handling and placing differently sized objects onto the shelves, freeing the system from using oversized designated discrete storage locations. Smaller objects may thereby be stored closer together. This concept can be referred to as longitudinally heterogeneous storage.

Figure 21:
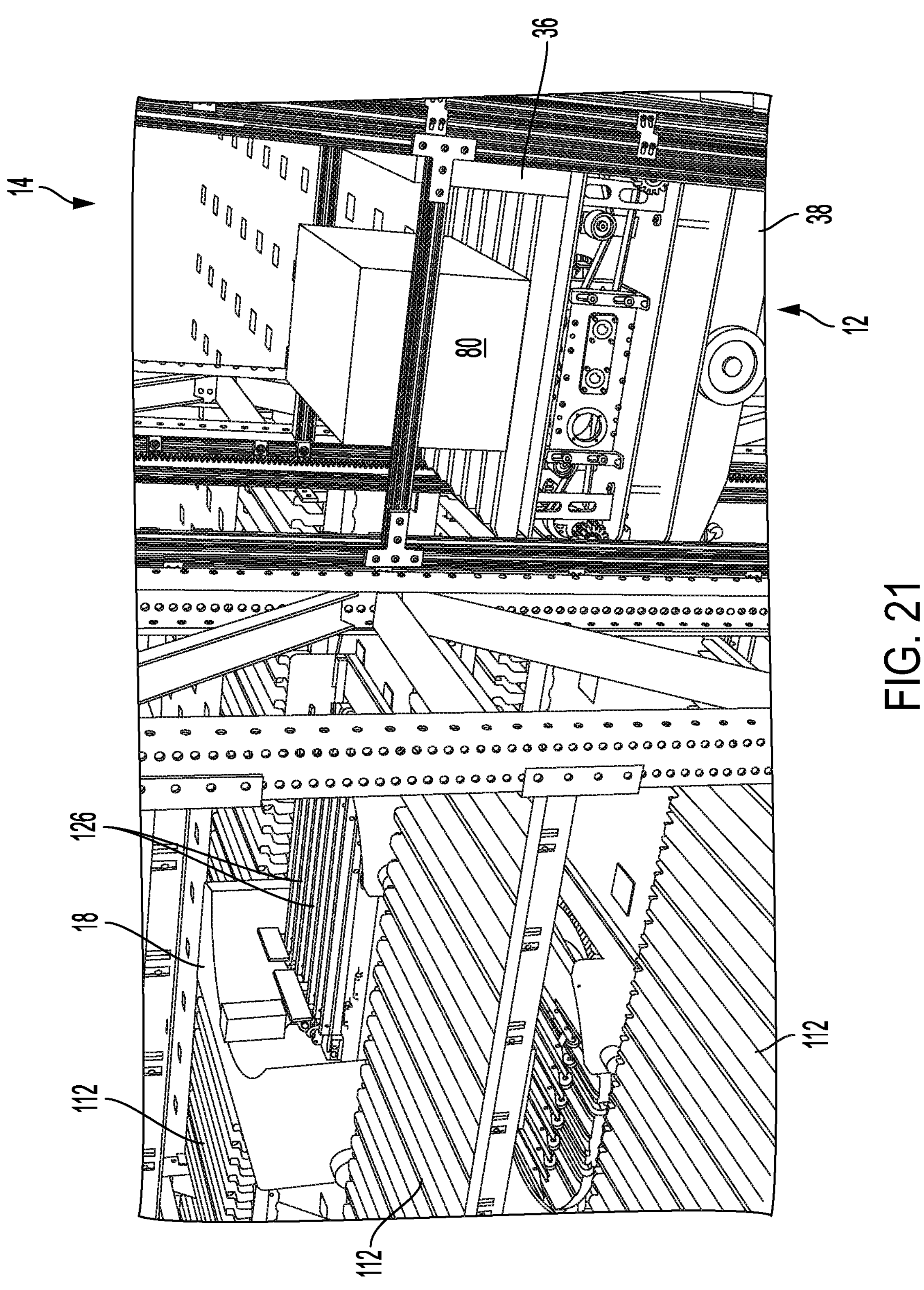
FIG. 21 shows an illustrative diagrammatic view of the automated mobile carrier of FIG. 1 climbing the vertical lift structure.
Figure 22A:
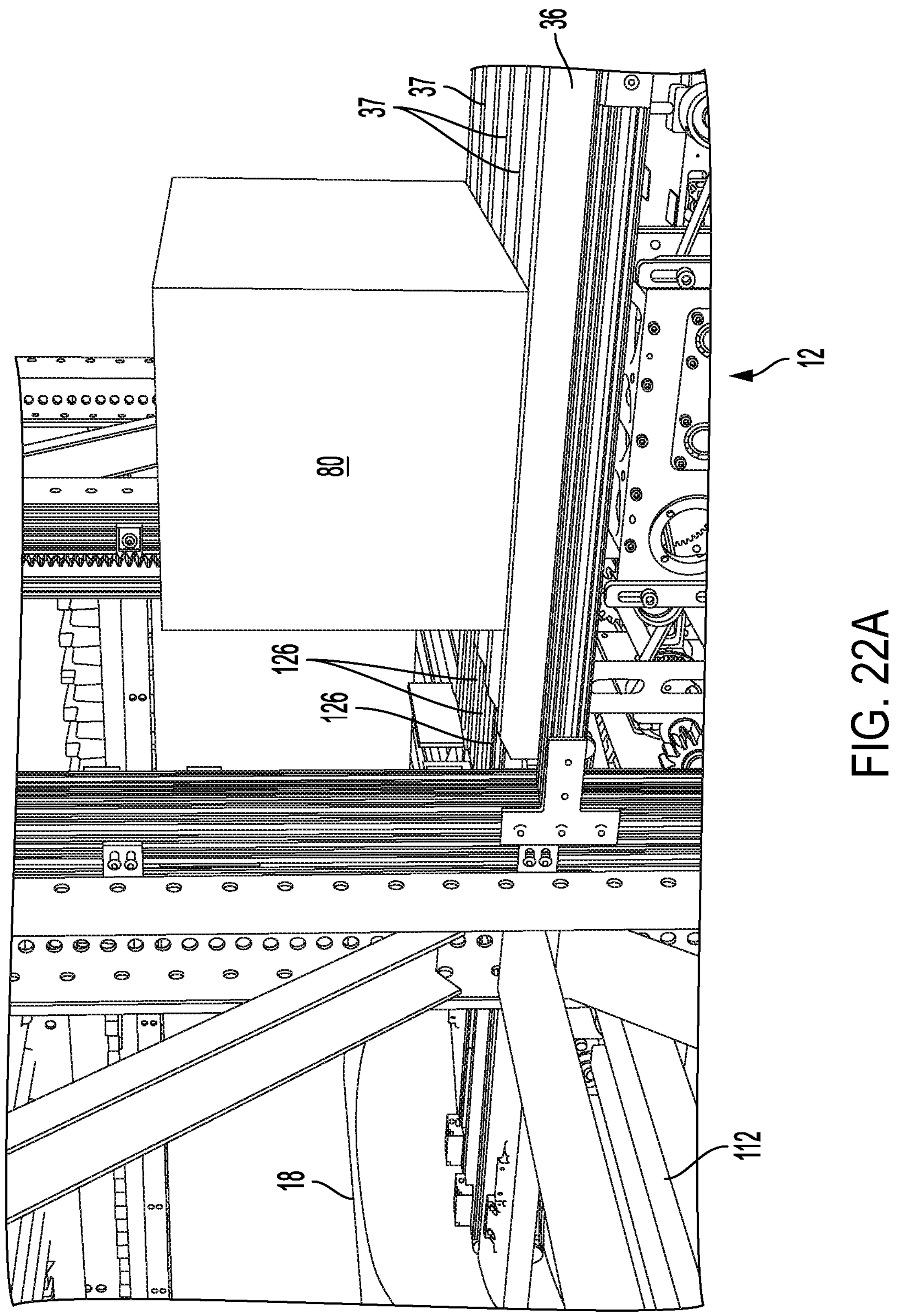
FIGS. 22A-22C show illustrative diagrammatic views of the mobile shuttle carrier and the automated mobile carrier in the system of FIG. 1, showing the mobile shuttle carrier approaching the elevated automated mobile carrier (FIG. 22A), lifting an object off of the automated mobile carrier (FIG. 22B), and removing the object from the automated mobile carrier thereby transferring the object to the mobile shuttle carrier (FIG. 22C)
Figure 22B:
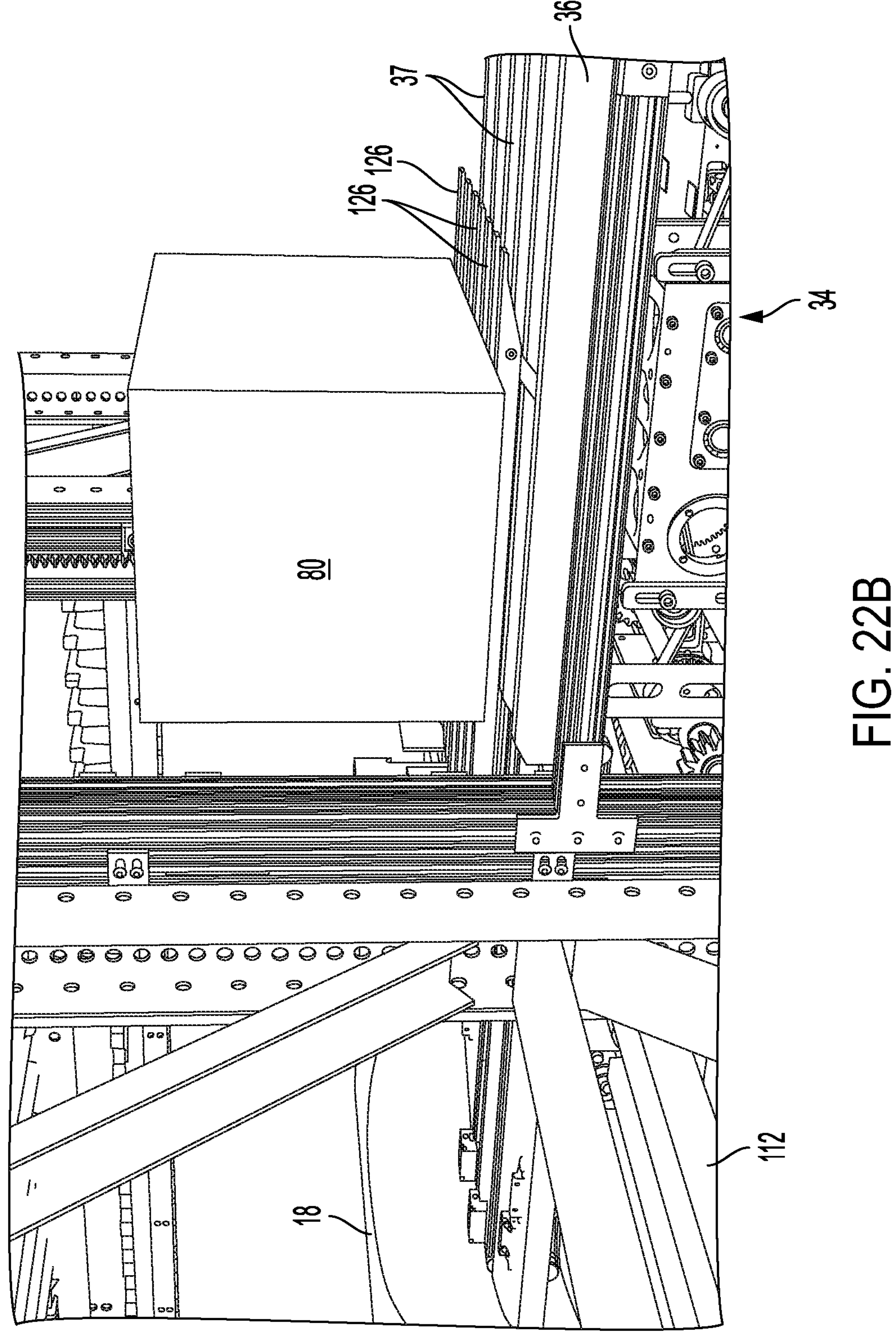

FIG. 21 shows the mobile carrier 12 lifting itself into position while a shuttle carrier 18 is approaching a loading area, and FIG. 22A shows the mobile carrier 12 and the shuttle carrier 18 at the loading area. FIG. 22A shows the tines 126 in a lowered position, and FIG. 22B shows the tines 126 as having been raised. In the lowered position, as shown in FIG. 22A, the tines 126 are at an elevation below a crest height of the adjacent shelving 112 as well as the support ribs 37 of any adjacent mobile carrier 12. In the raised position, as shown in FIG. 22B, the tines 126 are above the crest height of the adjacent shelving 112 and the support ribs 37 of any adjacent mobile carrier 12. The shelving may be provided in a roughly corrugated form, providing alternating crests and valleys. The translation system 152 may be engaged to extend the payload into the corrugated shelf 112 (either above the shelf or interleaved between the crests) to deposit objects onto the shelf 112 or retrieve objects from the shelf 112. The payload receiving portion 150, translation system 152 and translation base 154 may be rotated 90 degrees in either direction from center (facing a mobile carrier 18) by the rotation system 158 (e.g., for loading or distribution with respect to the shelves 112).

Figure 22C:
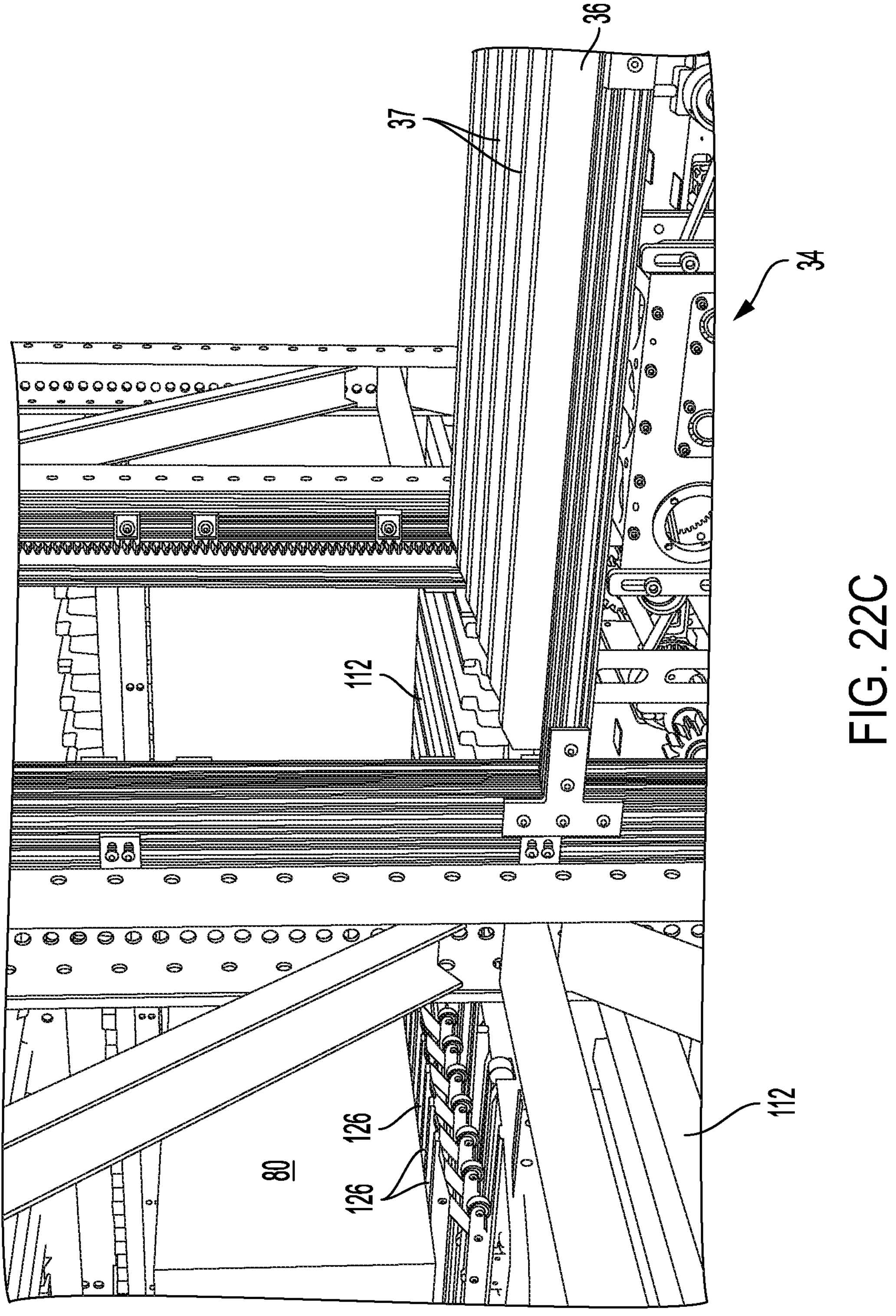

As also shown in FIG. 22A, the tines 126 of the shuttle carrier 18 are lowered, and are inserted into the payload supporting portion 36 between the ribs 37. With reference to FIG. 22B, when the tines 126 are raised (by the rotation of the cams 166, 168 of FIGS. 20A, 20B discussed above), the object 80 is lifted and supported instead by the tines 126. As shown in FIG. 22C, the tines 126 are drawn back inward of the shuttle carrier 18 bringing the payload object 80 with them. The tines 126 may then be lowered or (preferably) remain in the raised position as the shuttle carrier 18 is moved along the rails 144 (shown in FIGS. 23 and 24) to the designated destination shelf location. The rotational system 152 is then engaged to turn the payload to align the free ends of the tines 126 toward the destination location shelf (which is either of the opposing side shelves 112). FIG. 23 shows the shuttle carrier 18 turned toward a (right side as shown) shelf 112 for moving the object 80 to the right side (as shown) shelf. FIG. 24 shows the shuttle carrier 18 turned toward a left side (as shown) shelf 112 and having moved the raised tines into the left side shelf for moving the object 80 to the left side (as shown) shelf.

Figure 26A:
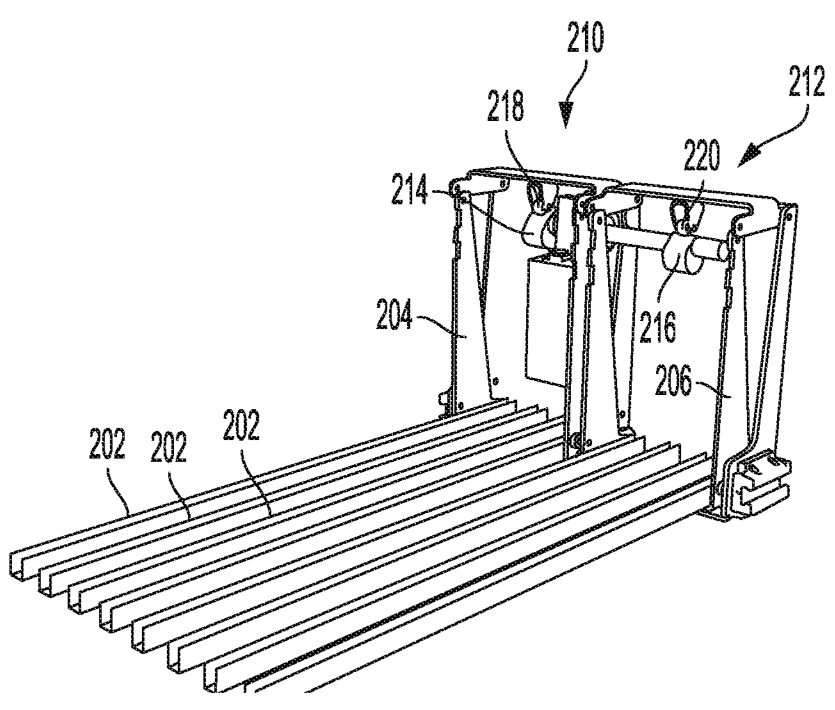
FIGS. 26A and 26B show illustrative diagrammatic views of FIG. 25 showing cam mechanisms not engaged to lift the tines (FIG. 26A) and engaged to lift the tines (FIG. 26B)
Figure 26B:
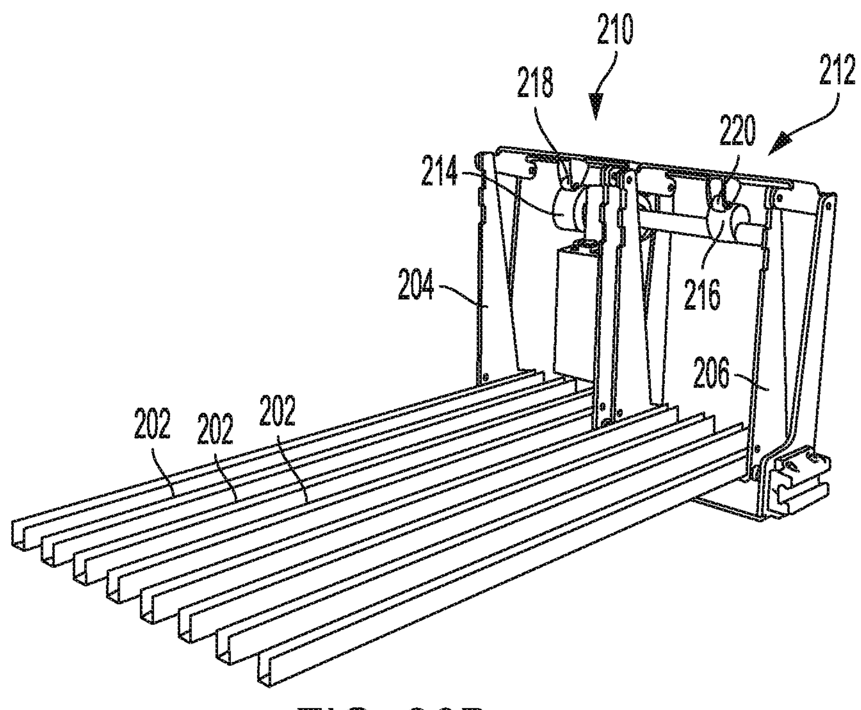
Figure 27:
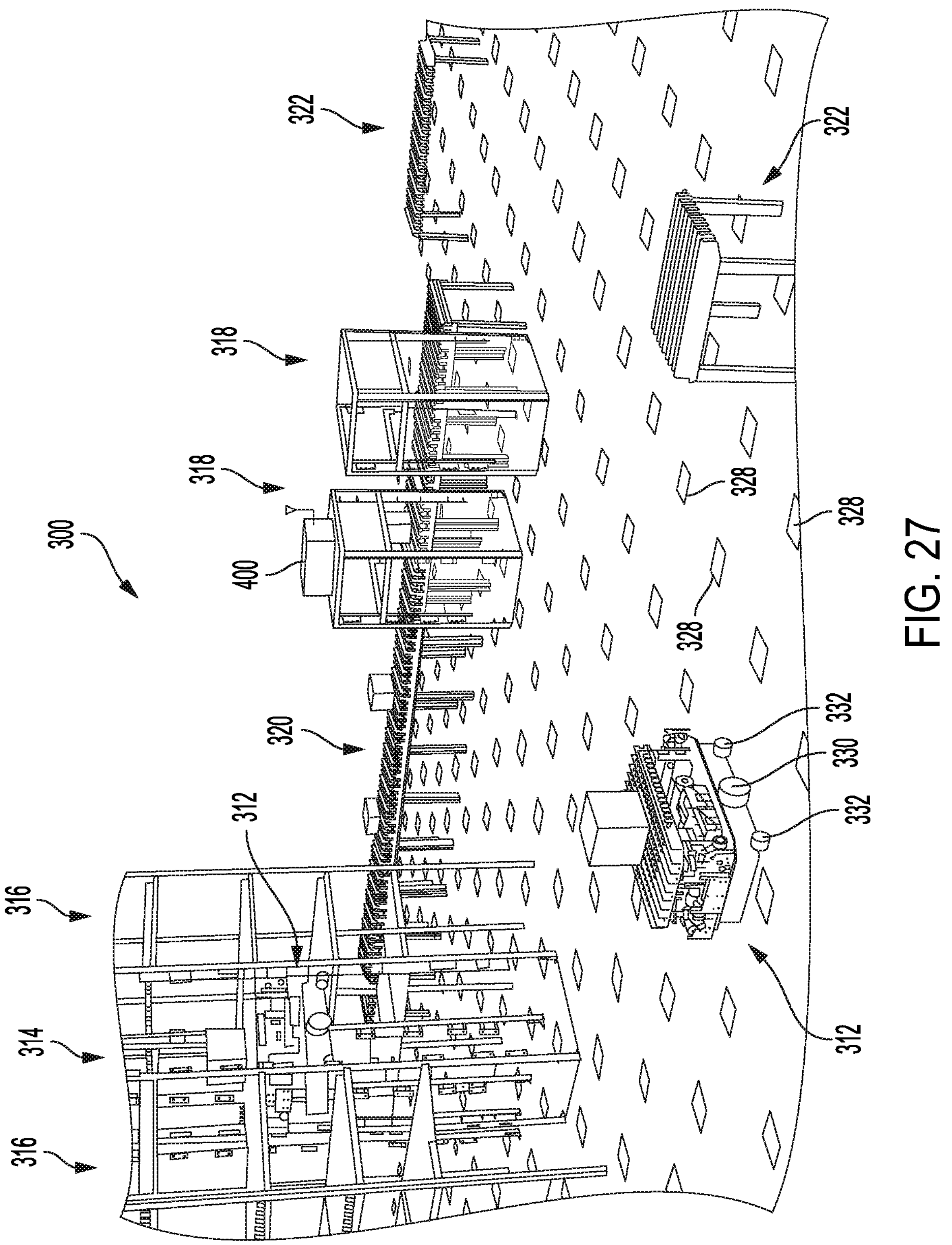
FIG. 27 shows an illustrative diagrammatic view of an object processing system in accordance with another aspect of the present invention that includes an automated mobile carrier with an active transfer mechanism.

As noted above, the cams 166, 168 of the elevation system shown in FIGS. 20A and 20B may be different from one another such that tines associated with the cam 168 (and rocker base 176) may be elevated either with tines associated with the cam 166 (and rocker base 172) or by themselves. This permits the shuttle carrier to place smaller objects onto the shelves 112 closer to other objects, thereby conserving space. In accordance with further aspects, the payload receiving portion 150 of the shuttle carrier 18 of FIGS. 17-24 may be exchanged for a payload receiving portion 250 as shown in FIGS. 25-27 that includes a cantilever shuttle elevation system.

Figure 25:
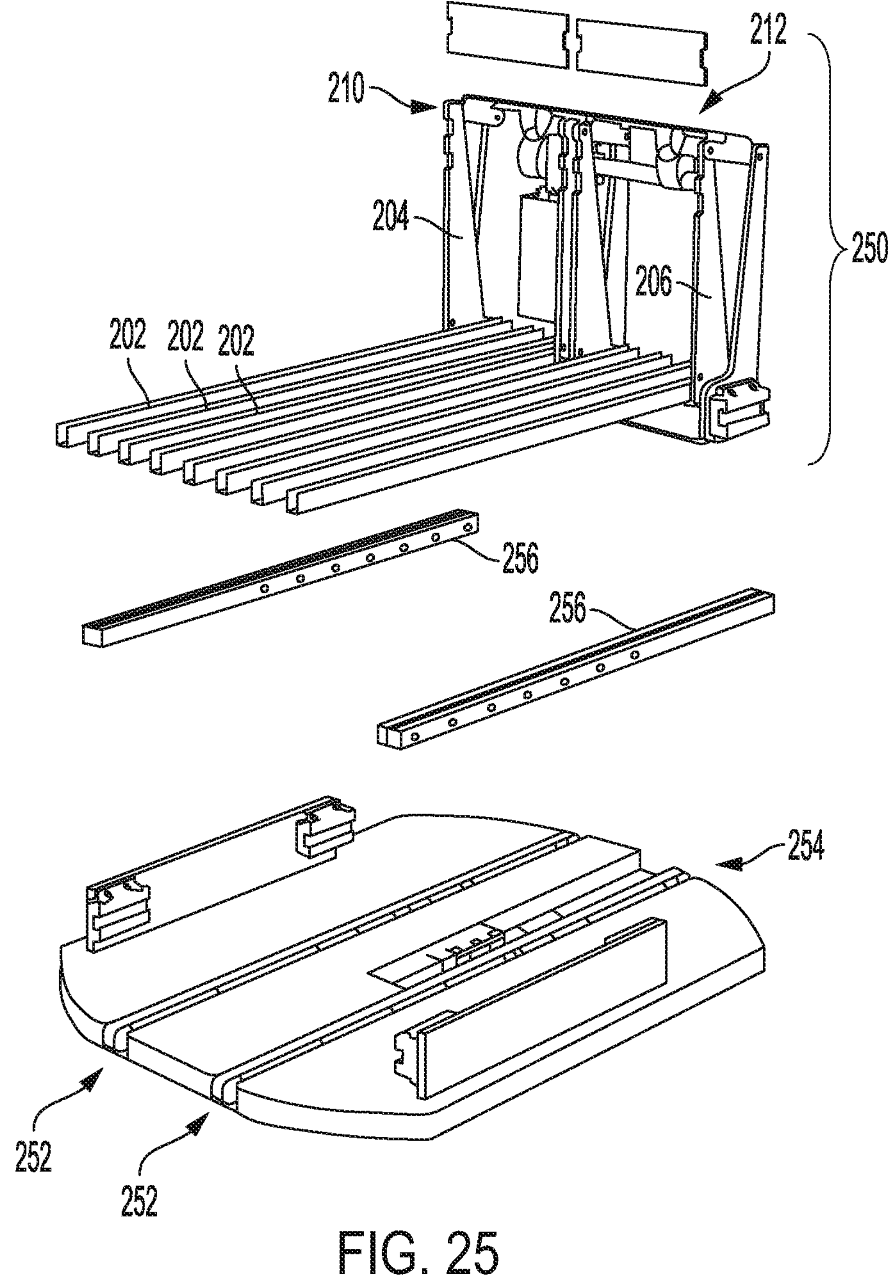
FIG. 25 shows an illustrative diagrammatic exploded view of a mobile shuttle carrier in accordance with another aspect of the present invention that includes a cantilever shuttle elevation system.

FIG. 25 shows an exploded view of an upper portion of a shuttle carrier system in accordance with a further aspect of the invention that employs a cantilever shuttle elevation system. The payload receiving portion 250 similarly includes two sets of tines 202, one set associated with a suspended seat 204 and one set associated with a suspended seat 206 as shown in FIGS. 26A and 26B. FIG. 26A shows the payload receiving portion in an lowered position, and FIG. 26B shows the payload receiving portion in an elevated position. With reference again to FIG. 25, the payload receiving portion 250 is mounted via runners 256 onto a translation system 252 on a translation base 254. The payload receiving portion 250 is thereby movable, as is the payload receiving portion 150 (of FIGS. 17-24), away from and returning to the associated shuttle carrier. Further, the payload receiving portion 250, translation system 252 and translation base 254 are mounted on a rotation system 158 via a gear 156 as discussed above, permitting the associated shuttle carrier to be rotated 180 degrees, with a center being aligned with the vertical structure 14.

The payload receiving portion 250 rides along translation rails 256 that are attached to a translation base 254 via the translation system 252. The payload receiving portion 250, rails 256, translation system 252 and translation base 254 are rotatable with respect to the mobile unit chassis by a rotation system as discussed above with reference in particular to FIG. 19. The payload receiving portion 250 includes tines 202 that extend from one of the two suspended seats 204, 206 that raise and lower the tines 202. The seats 204, 206 are suspended from cam mechanisms 210, 212 behind protective covers.

As shown in FIG. 26A, when cam mechanisms 214, 216 are rotated such that they do not act on cam-followers 218, 220, the suspended seats 204, 206 (and the tines 202) remain in a lowered position. With further reference to FIG. 26B, when the cam mechanisms 214 and 216 are rotated such that cam-followers 218, 220 are urged upward, the suspended seats 204, 206 are urged upward as well, bringing the tines 202 to their raised position. Again, one shuttle elevation system may be used with multi-position cams to provide segmented shuttle elevation of the payload tines. This permits greater flexibility in handling and placing differently sized objects onto the shelves, freeing the system from using oversized designated discrete storage locations, and permitting smaller objects to be stored closer together.

Because the tines 202 are sized to fit between crests and valleys of the corrugated shelf 112, the extended tines (when raised/lowered) may be used to place objects onto the shelves 112 or remove objects from the shelves, and to place objects onto or remove objects from a mobile carrier 12 as discussed above. Again, because the system records where objects are placed, the system has a record at all times of all object locations on the shelves. All operations may be controlled by the one or more computer processing systems 100.

In accordance with further aspects, object processing systems and methods of the present invention may include mobile carriers that themselves are able to move objects on and off the mobile carries. For example, FIG. 27 shows a system 300 that includes mobile carriers 312 that navigate a floor with markers 328, similar to markers 228 as discussed above, and that similarly employ two independently operable drive wheels 330 as well as follower wheels 332 or casters as discussed above. Each mobile carrier 312 may position itself below shelving vertical structures 314 between vertically stacked shelving 316, or conveyor vertical structures 318 adjacent a roller conveyor 320 as discussed in more detail below. Each mobile carrier may also position itself adjacent a floor-based shelf 322 (e.g., a plurality of variable width corrugated shelves) for transferring objects between the mobile carrier and each floor-based shelf 322 as discussed in more detail below. All operations may be controlled by one or more computer processing systems 400.

Figure 28A:
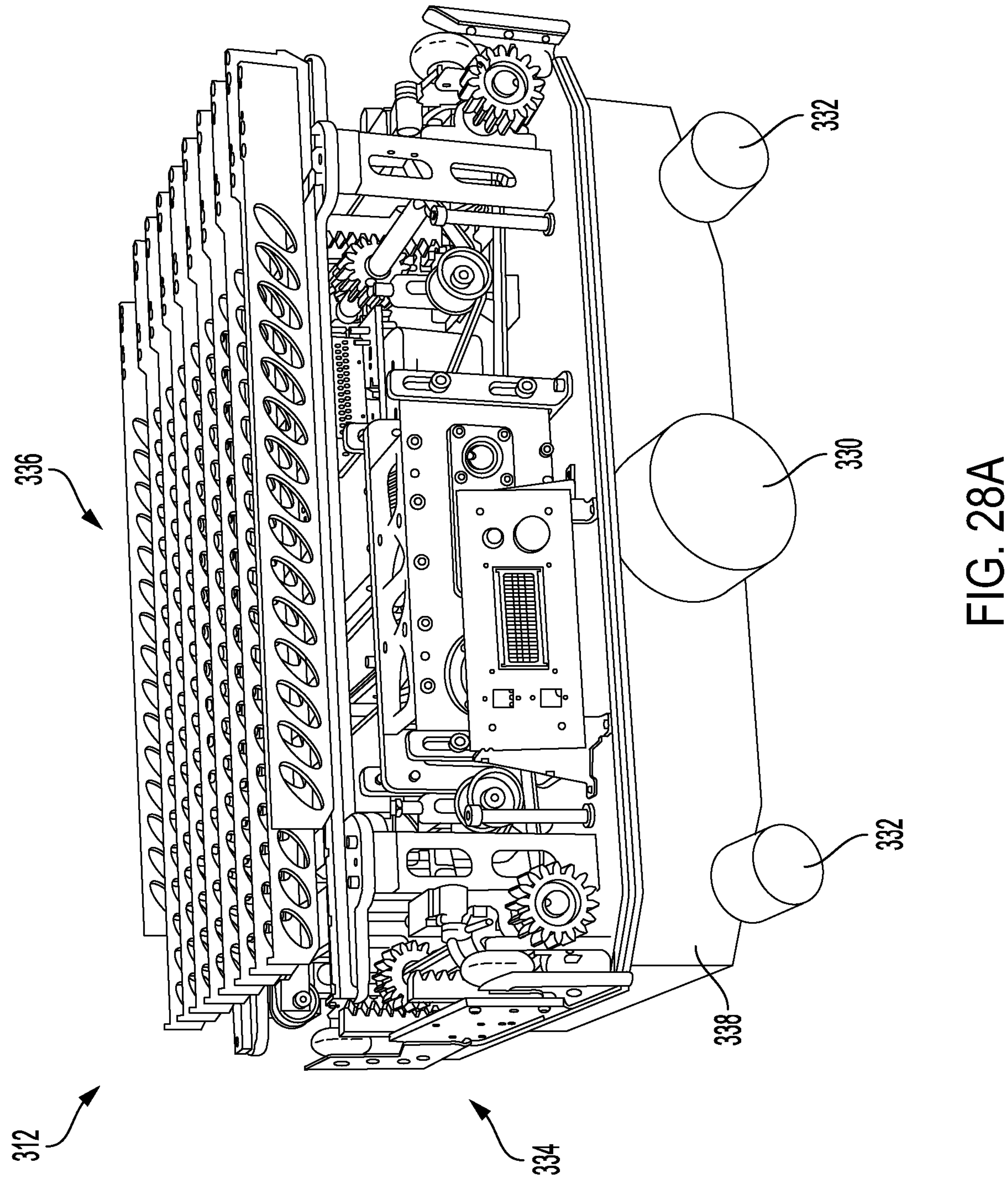
FIGS. 28A and 28B show illustrative diagrammatic views of the automated mobile carrier of FIG. 27 with the active transfer mechanism not extended (FIG. 28A) and extended (FIG. 28B)
Figure 28B:
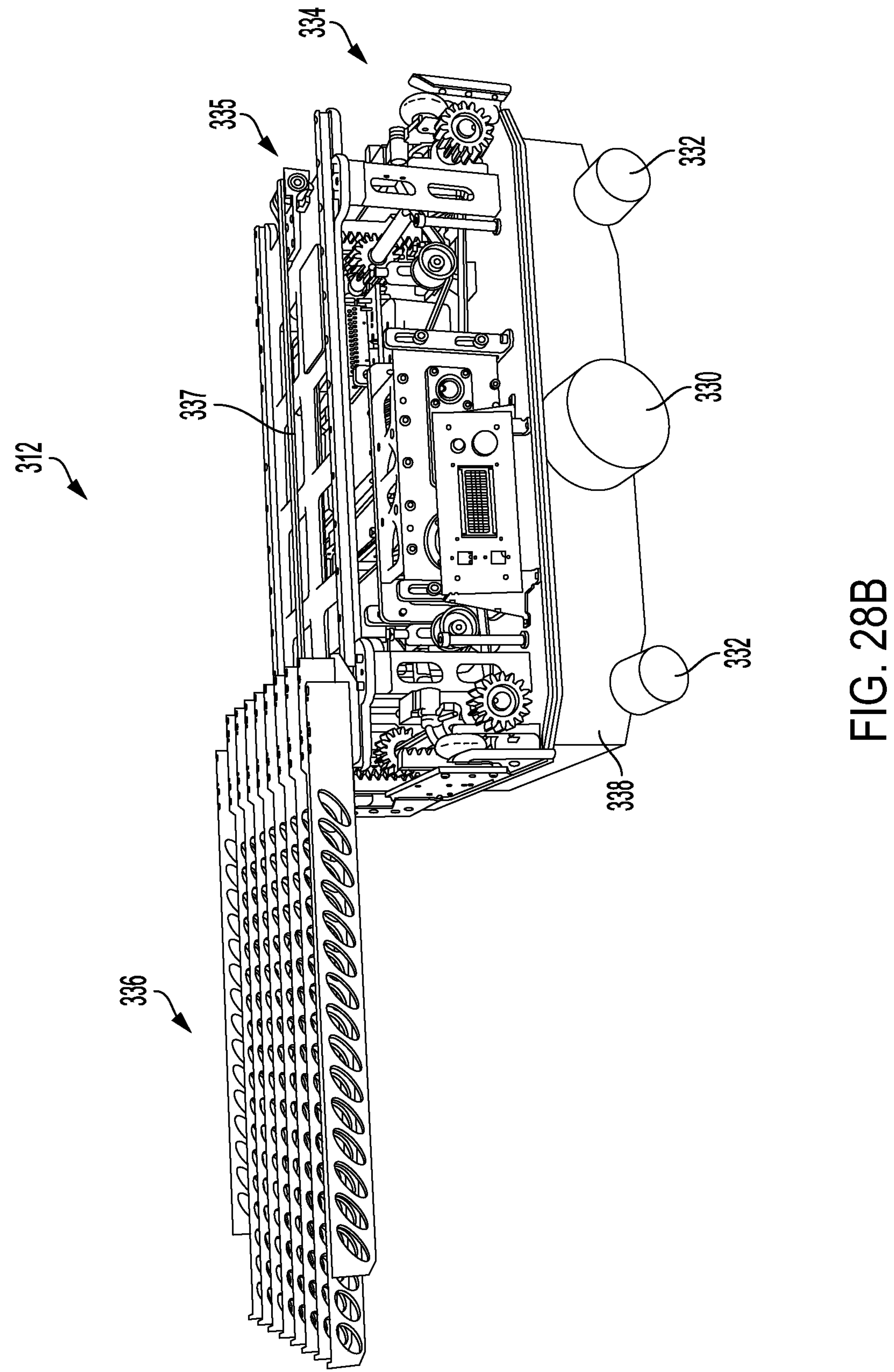

With reference to FIGS. 28A and 28B, each mobile carrier 312 includes a payload receiving portion 336 that is mounted on a support structure 334 via a linear extension system 335. The support structure 334 is elevationally-adjustably mounted on a carrier base 338 as discussed above with reference to the mobile carrier 12 including the support structure 34 and carrier base 38. The payload receiving portion 336 is linearly positionable with respect to the carrier base 338 by a linear extension system 335 between an extended position and a returned position with respect to a central region of the automated mobile carrier. The linear extension system 335 includes a reciprocating belt 337 as discussed in more detail below with reference to FIGS. 31 and 32 and operates mechanically and functionally independently of the payload elevation system for elevating the carrier upper portion with respect to the carrier base portion (as well as the lifting system that involves the lift pinion gears engaging the lift racks). This facilitates moving objects between the automated mobile carrier and locations such as shelving units, roller conveyors and free-standing shelves. FIG. 28B shows the payload receiving portion 336 in the extended position, and FIG. 28A shows the payload receiving portion 336 in the returned position over the carrier base 338.

Figure 29A:
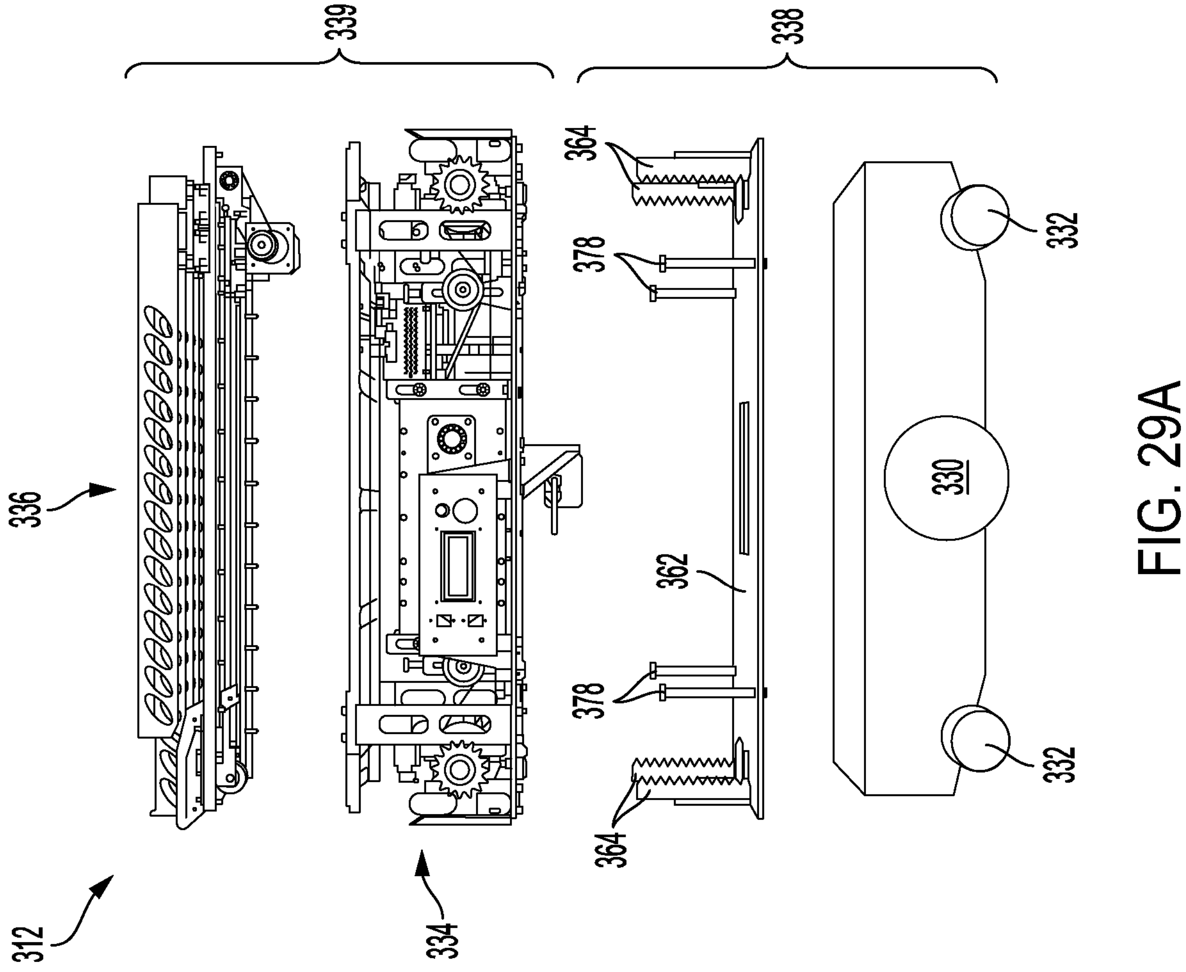
FIGS. 29A and 29B show illustrative diagrammatic exploded views of the automated mobile carrier of FIG. 27, showing the transfer mechanism not extended (FIG. 29A), and showing the transfer mechanism extended (FIG. 29B)
Figure 29B:
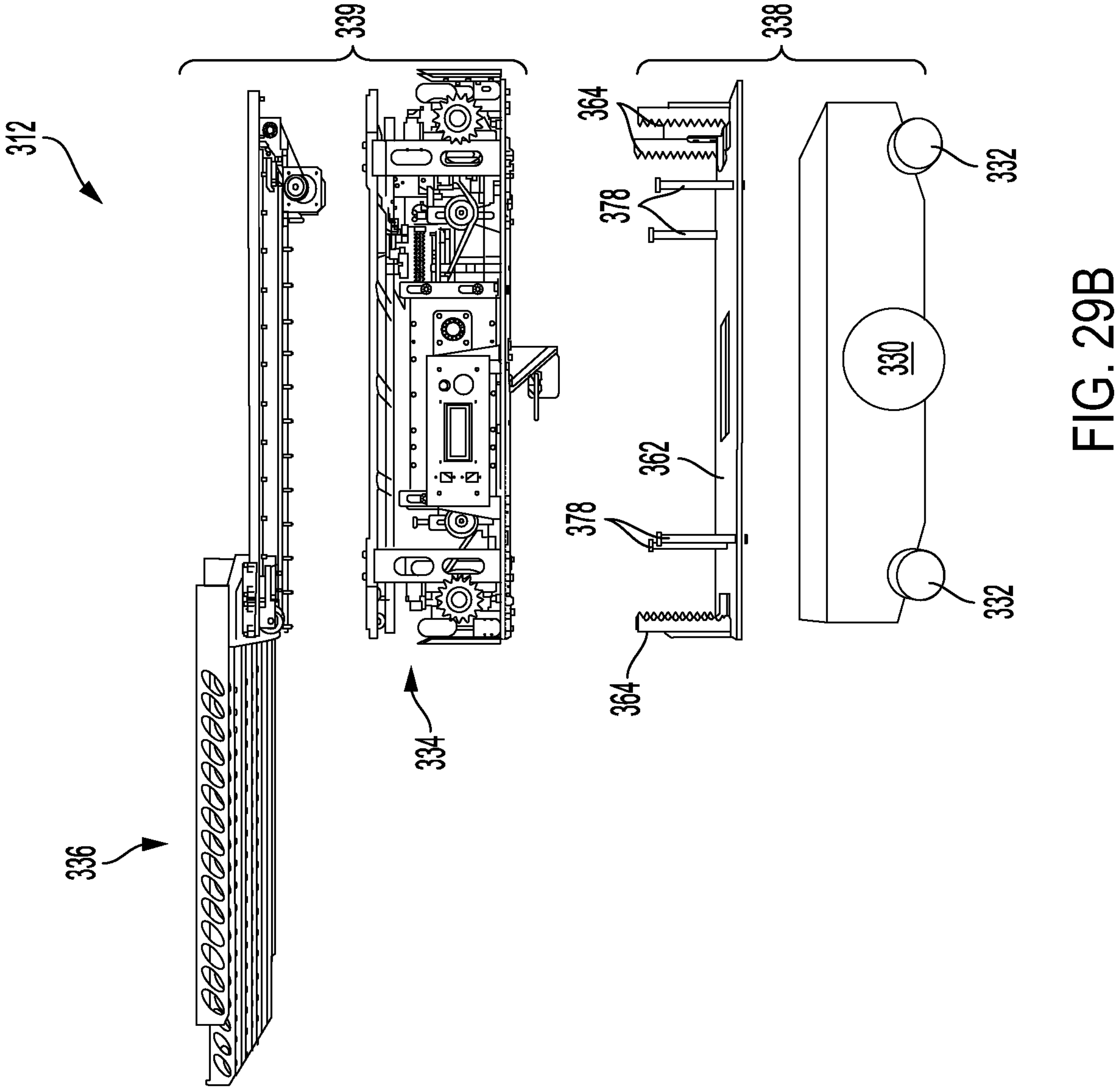

FIGS. 29A and 29B show exploded views of the automated mobile carrier 312 showing the carrier base portion 338 and the carrier upper portion 339. With reference to FIG. 29A, the carrier base portion include the chassis on which the wheels 330, 332 are mounted and the base top 362 that includes the base rack gears 264 and the capped slide rods 378. The carrier upper portion 339 includes the support structure 334 and the payload receiving portion 336. With reference to FIG. 29B, the support ribs of the payload receiving portion 336 may be actuated to extend away from the central region of the automated mobile carrier. The combination of the support ribs extending and retracting as well as the carrier upper portion being raised and lowered with respect to the carrier base portion provides substantial dexterity in picking objects from and placing objects onto a variety of locations. In particular, the ribs may be extended and then raised to pick up an object, and the ribs may be extended and then lowered to transfer an object onto a location as discussed in more detail herein. Because the extending ribs are part of the carrier upper portion, they rise and fall with the carrier upper portion as it is moved with respect to the carrier base portion. Similarly, when the automated mobile carrier is on a vertical lift structure, the carrier itself may be raised and lowered on the vertical lift structure to similarly transfer objects to and from the carrier.

Figure 30:
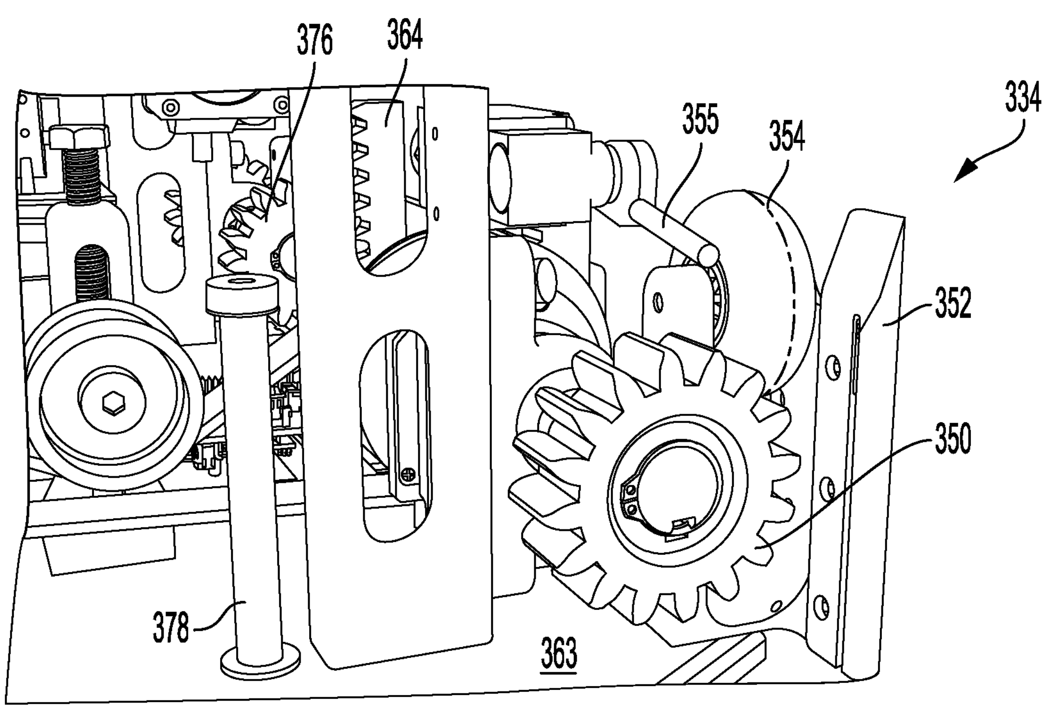
FIG. 30 shows an illustrative diagrammatic enlarged view of a lift portion of the automated mobile carrier of FIG. 27.

FIG. 30 shows an enlarged view of a portion of the support structure 334 of the mobile carrier 312, showing a lift pinion gear 350 for engaging a lift gear rack of the vertical structure 312, as well as a slide guide 352 and a freely rotating roller guide 354 as discussed above with regard to the mobile carrier 12. The mobile carrier 312 may also include a deflectable detection system 355 to confirm that a rack gear has been engaged by the associated lifting pinion gear. The support structure includes a structure floor 363 that is vertically moveable with respect to a base top 362 by driving base pinion gears 376 along base rack gears 364 until the structure floor 363 separates from the base top 362 by a distance provided by the capped slide rods 378 as discussed above with reference to the mobile carrier 12.

The support structure 334 includes the lifting system that includes lift pinion gears 350, slide guides 352 and roller guides 354. In the system of FIG. 30, four of each are provided (one in each respective corner). The uppermost portions of the lifting system (e.g., slide guides 352) are below the lowermost ends 342 of the lift gear racks 340 as shown in FIGS. 33 and 34.

Figure 31:
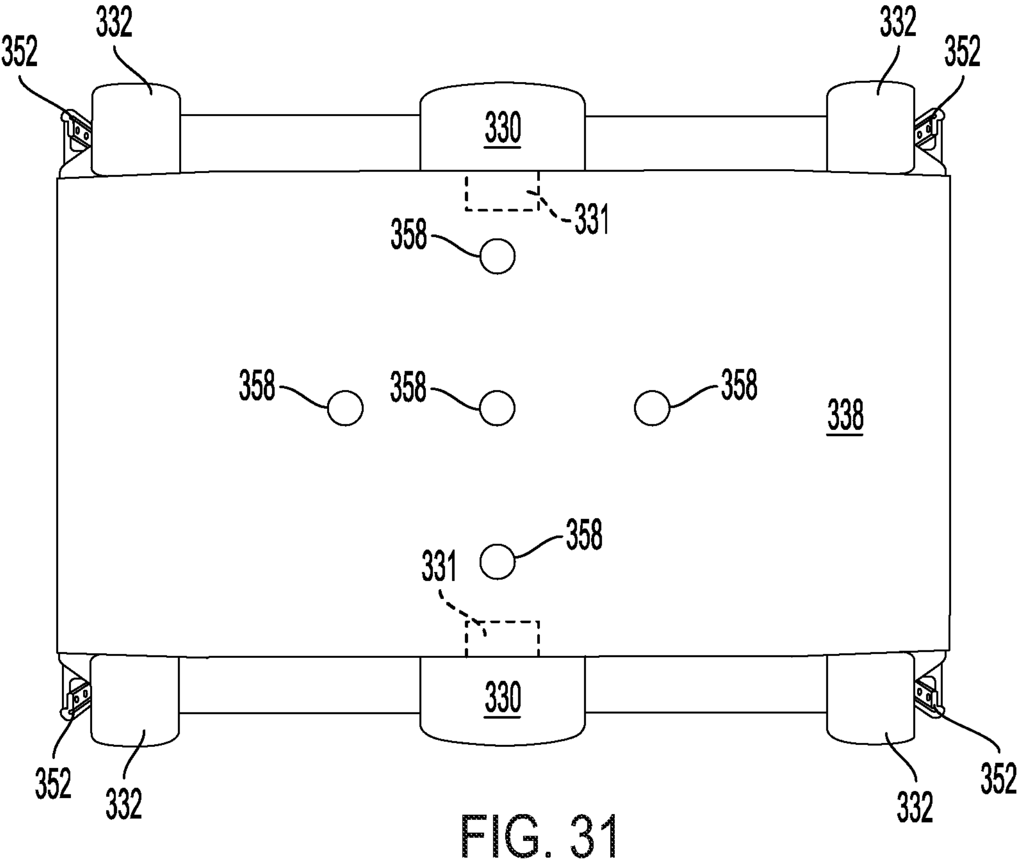
FIG. 31 shows an illustrative diagrammatic bottom view of the automated mobile carrier of FIG. 27.

FIG. 31 shows an underside view of the automated mobile carrier 312, where the lift pinion gears extend outside the body of the carrier 312 (not shown, as they are obstructed by the wheels) and the underside of the carrier includes one or more perception systems 358 for detecting indicia on the markers 328. The bi-directional independently operable drive wheels 330 are controlled by motors 331 in the carrier base 338.

Figure 32A:
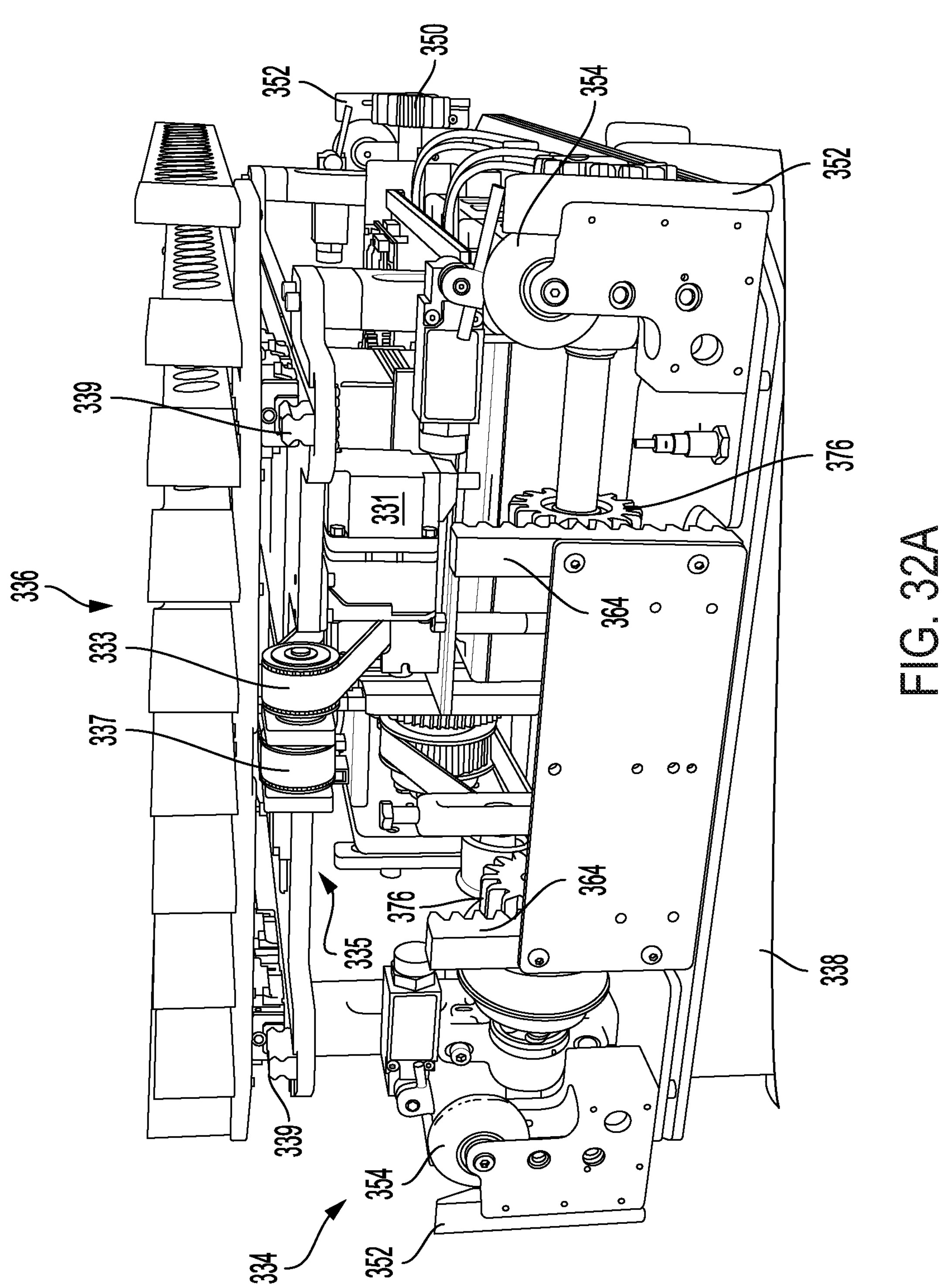
FIGS. 32A and 32B show illustrative diagrammatic end views of the automated mobile carrier of FIG. 27, showing the payload receiving portion not extended (FIG. 32A), and showing the payload receiving portion extended (FIG. 32B)
Figure 32B:
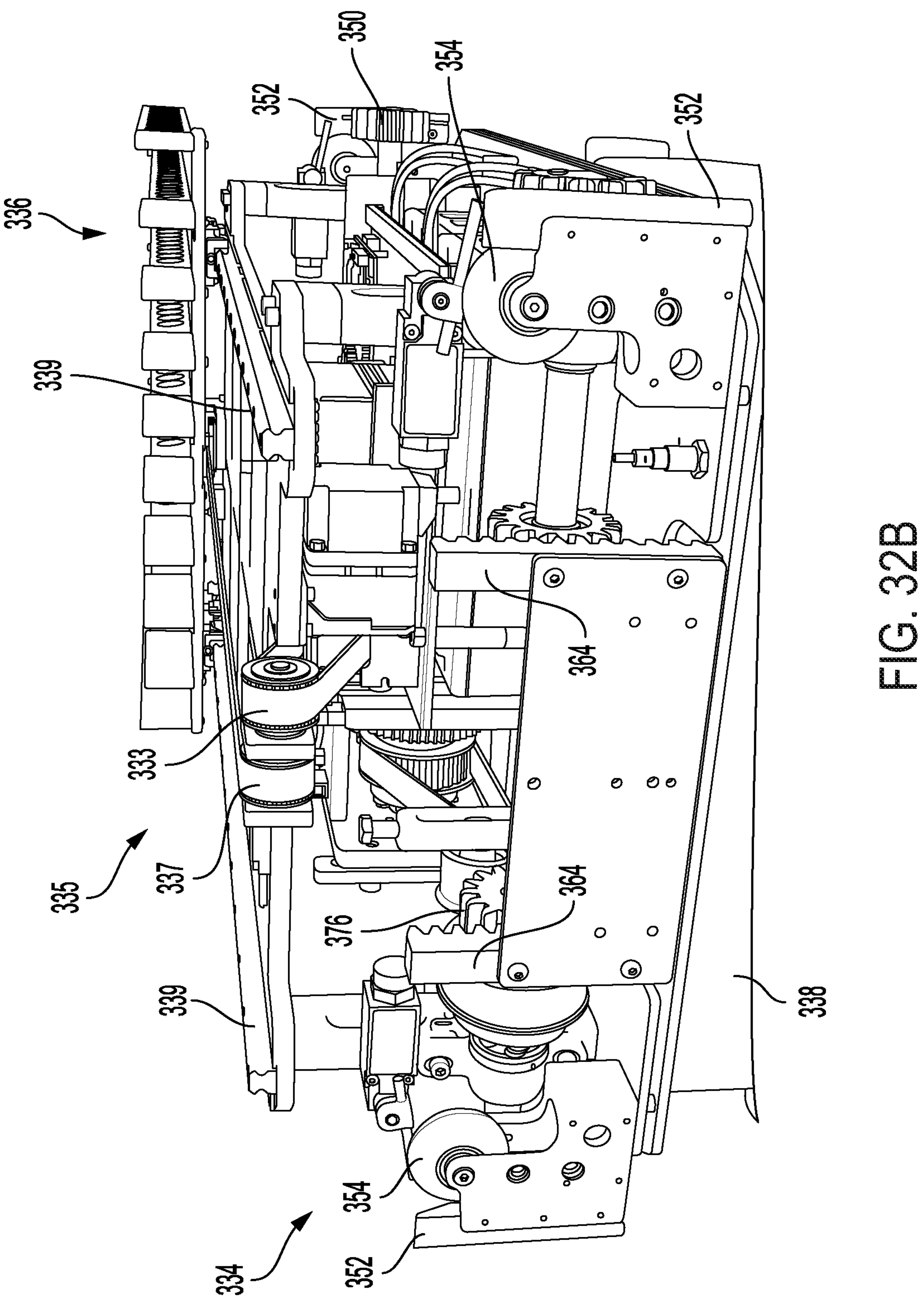

The linear extension system 335 includes the reciprocating belt 337 that is driven by an extension motor 331 via a drive belt 333 as shown in FIGS. 32A and 32B. The payload receiving portion 336 is also supported by and rides along rails 339. The payload receiving portion 336 is reciprocally driven between a first position over the carrier base 338 (as shown in FIG. 32A) to an extended position as shown in FIG. 32B, and subsequently returned to the position of FIG. 32A. FIGS. 32A and 32B also show the base pinion gears 376 that engage the base rack gears 364 permitting the support structure 334 and payload receiving portion 336 to rise with respect to the carrier base 338 as discussed above. Once elevated, the lift pinion gears 350 engage lift rack gears 340 (as shown in FIGS. 33-34) of the vertical structure 314, and vertical structure 318 (as shown in FIG. 27) so that the mobile carrier 312, as guided by the slide guides 352 and roller guides 354, climbs up (and down) the structures along the lift rack gears 340.

Figure 33:
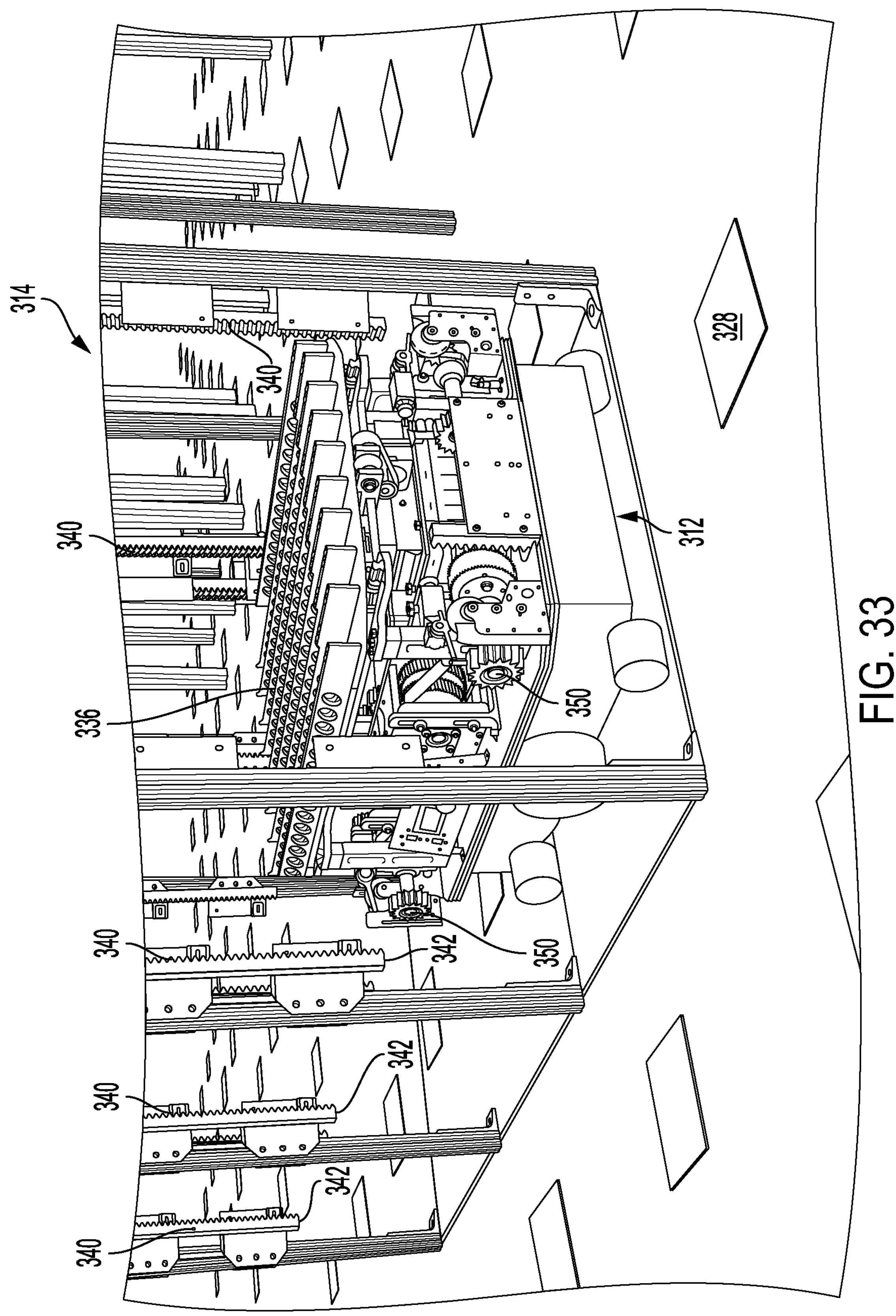
FIG. 33 show an illustrative diagrammatic view of the automated mobile carrier of FIG. 27 in a first position at the base of the vertical lift structures.
Figure 34:
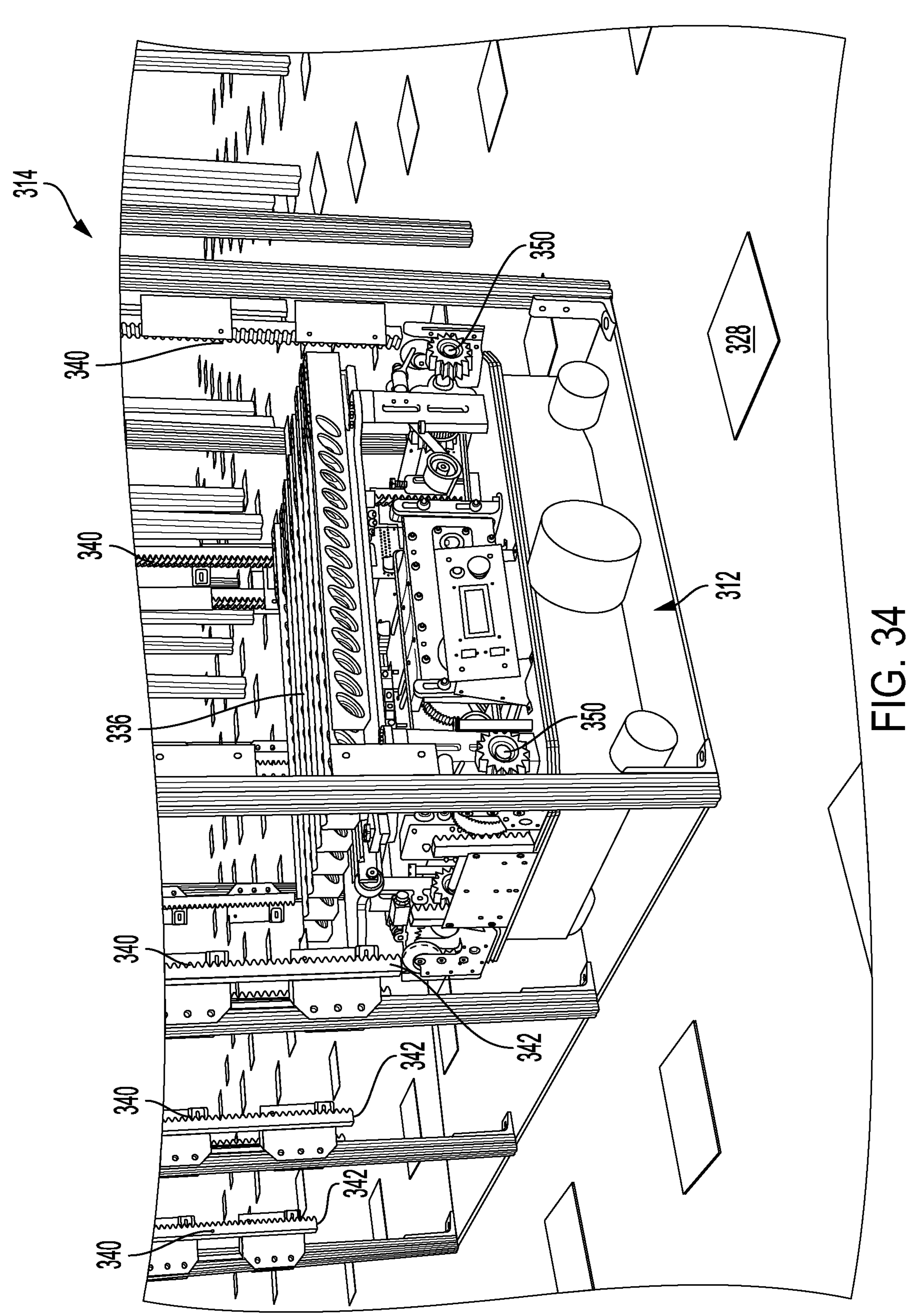
FIG. 34 shows an illustrative diagrammatic view of the automated mobile carrier of FIG. 33 rotated to a second position at the base of the vertical lift structure.

As shown in FIGS. 33 and 34, the shelving 316 may include a plurality of mutually adjacent vertical structures 314, permitting each mobile carrier to access different horizontal portions of shelves 316. Prior to engaging a vertical structure 314, the mobile carrier may enter an area below lowermost ends 342 of lift rack gears 340 (as shown in FIG. 33). The mobile carrier 312 may then turn to position itself to face the direction of the shelf intended to be accessed, and to position the lift pinion gears 350 below and aligned with the lift rack gears 340 (as shown in FIG. 34). The mobile carrier 312 then climbs the vertical structure 314 as discussed above with reference to the mobile carrier 12 climbing the vertical structure 14.

Figure 35:
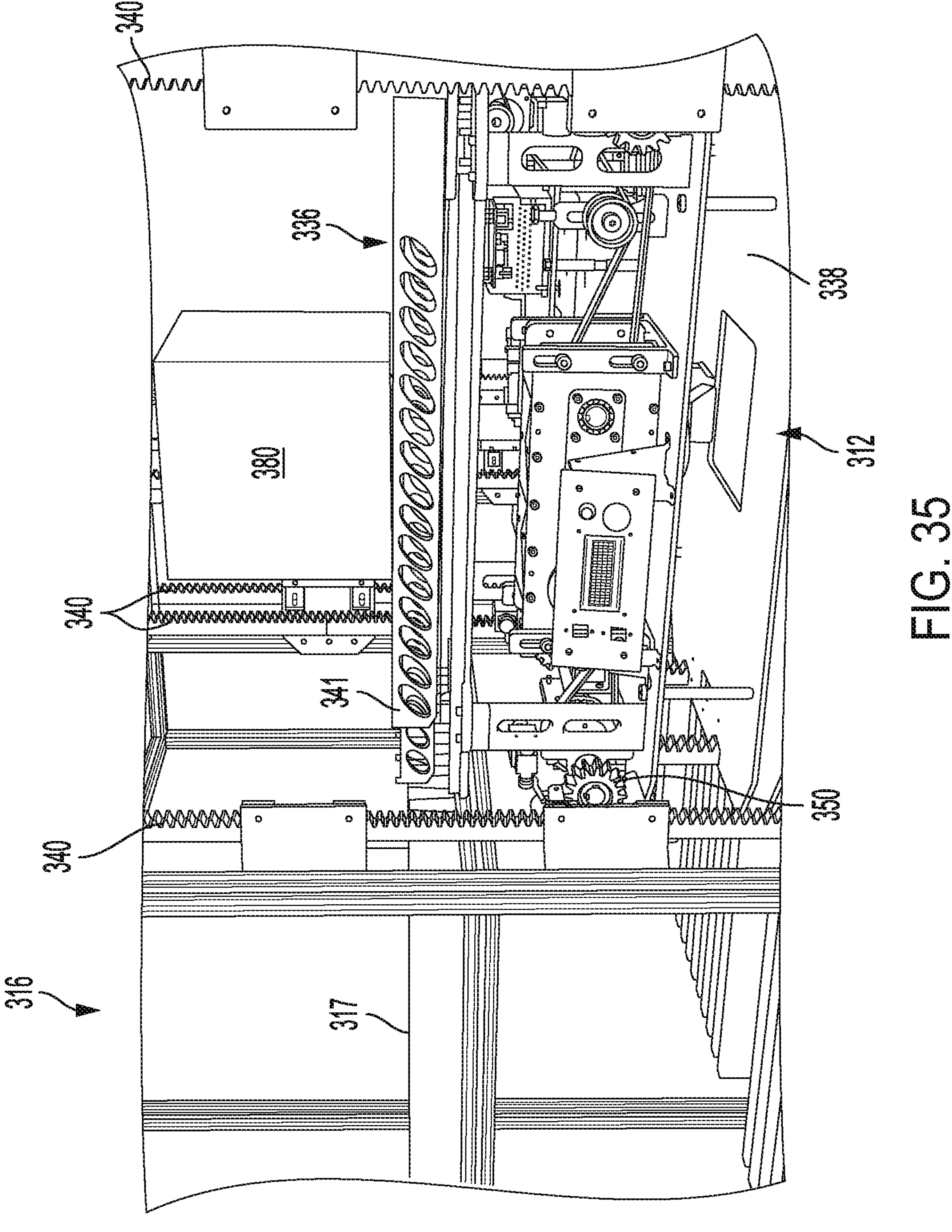
FIG. 35 shows an illustrative diagrammatic view of the automated mobile carrier of FIG. 27 positioned to move an object onto a static shelf of a shelving unit.
Figure 36:
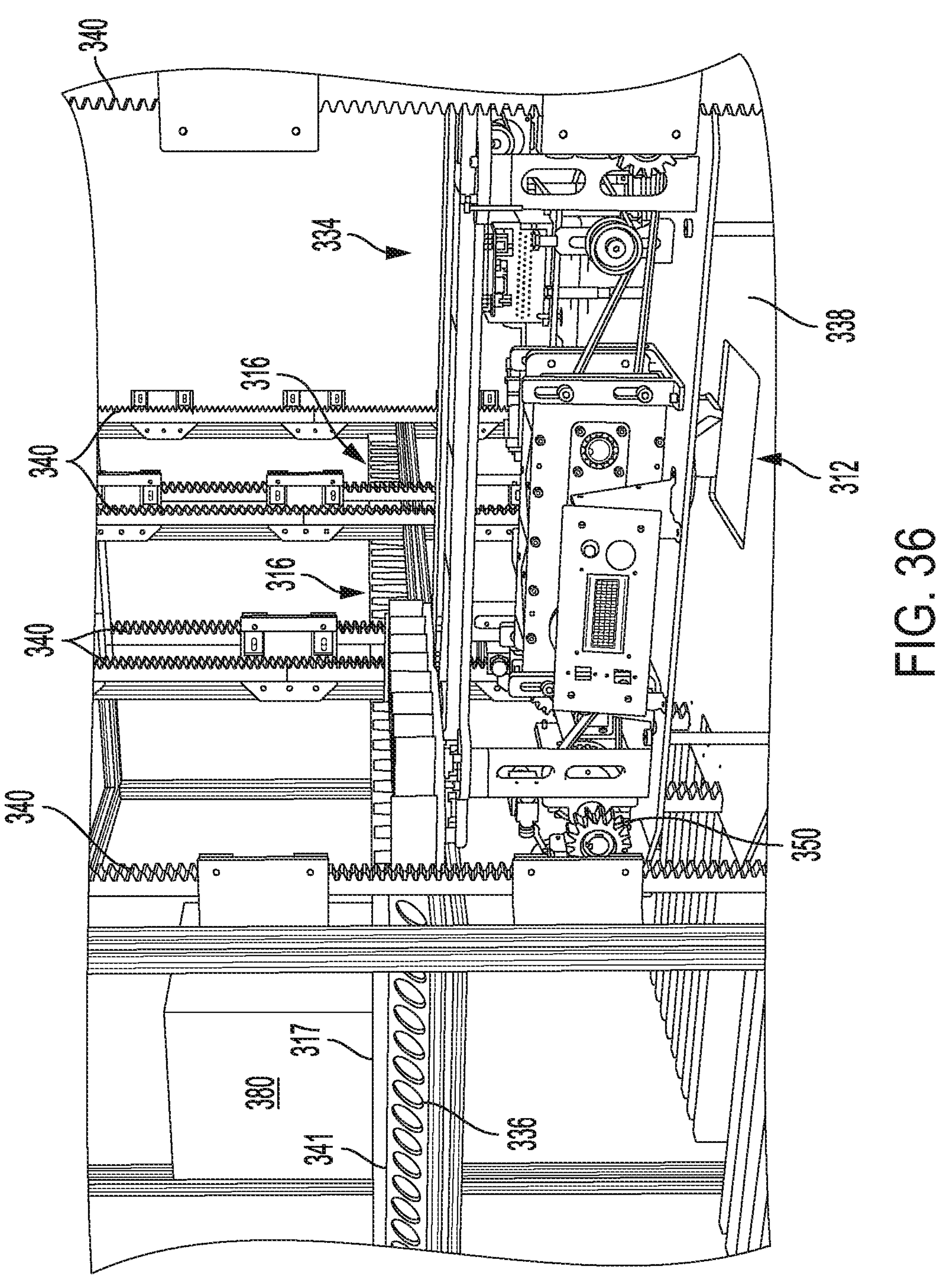
FIG. 36 shows an illustrative diagrammatic view of the automated mobile carrier of FIG. 35 having transferred the object onto the static shelf of a shelving unit.

Because the mobile carrier 312 includes the extendable payload receiving portion 336, the mobile carrier 312 itself may place objects onto (or remove objects from) the shelving 316. FIG. 35 for example shows an object 380 on a payload receiving portion 336 of the mobile carrier 312 at a lifted position within the vertical structure 314 of a shelving 316. The mobile carrier 312 stops rising when the tops of the support ribs 341 of the payload receiving portion 336 are above the highest points of a shelf 317 of the shelving 316. The shelving 316 is generally corrugated (as shown in FIG. 36), permitting the support ribs 341 to move between adjacent peaks of the shelf 317. The payload receiving portion 336 extends out over the shelf 317. The mobile carrier 312 then lowers itself through an actuation of the motorized gearing associated with the lift pinion gears 350 (as herein described in more detail). The rotation of lift pinion gears by a small amount therefore shifts the weight of the object 380 from the support ribs 341 to the shelf 317 as shown in FIG. 36. The process may be used in reverse (extending below a shelf and then raising the mobile carrier through the rotation of lift pinion gears 350) to lift an object off of a shelf onto the mobile carrier. Although shuttle carriers are not needed here, there must be a vertical structure associated with each column adjacent each shelf location desired to be accessed.

Figure 37:
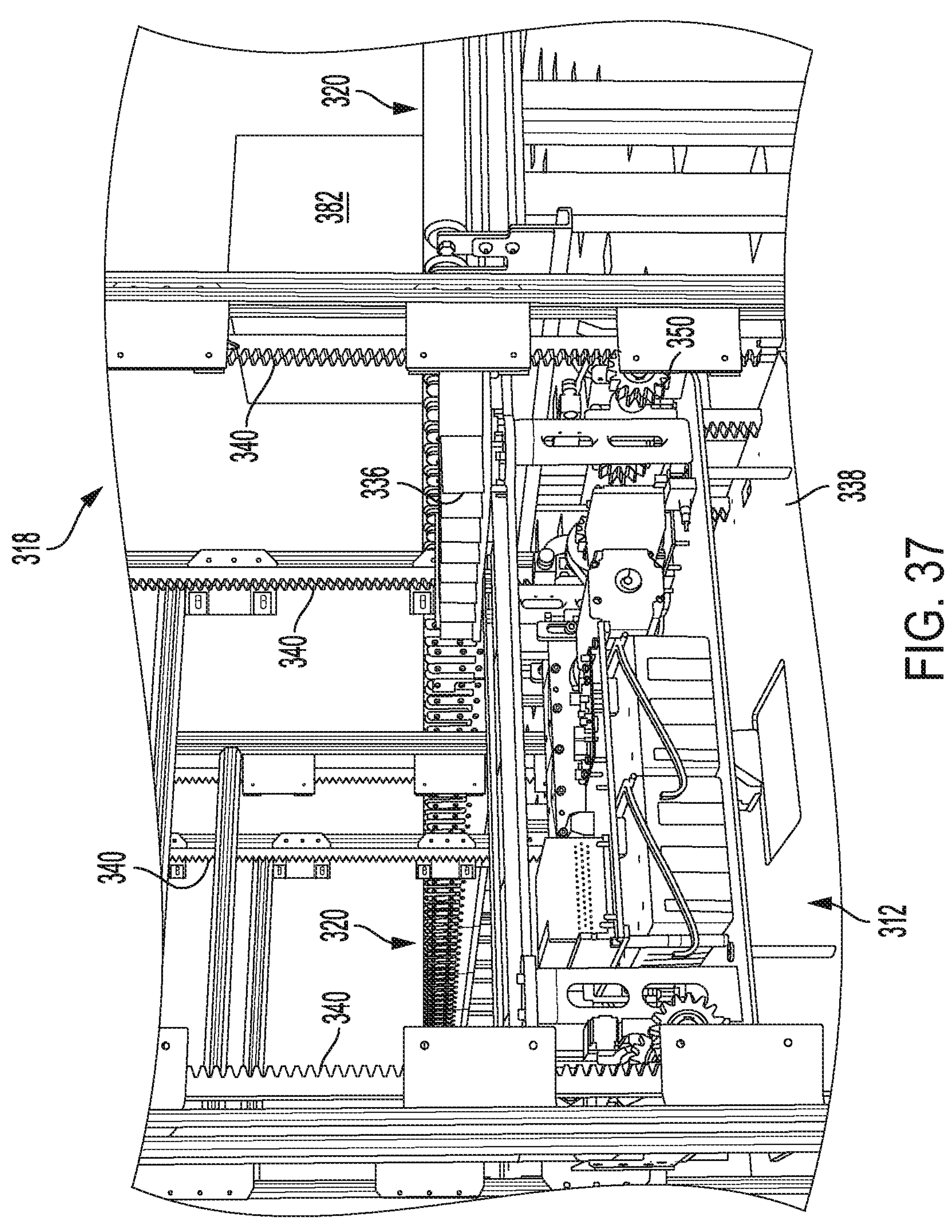
FIG. 37 shows an illustrative diagrammatic view of the automated mobile carrier of FIG. 35 positioned to retrieve an object from a roller conveyor section.
Figure 38:
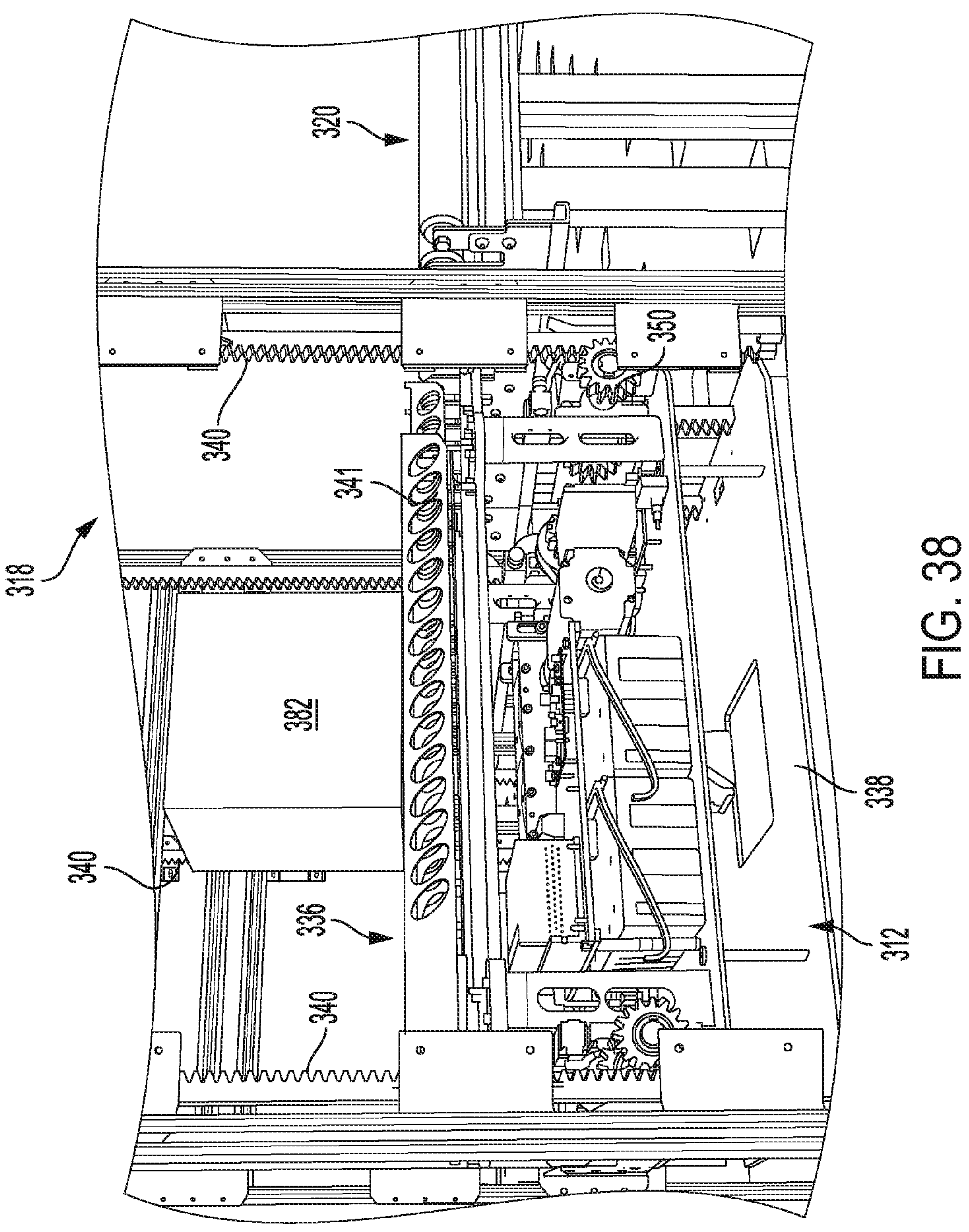
FIG. 38 shows an illustrative diagrammatic view of the automated mobile carrier of FIG. 37 having retrieved the object from the roller conveyor section.

The extendable payload receiving portion 336 of the mobile carrier 312 may also be used to retrieve objects from (or place objects onto) the roller conveyor 320. FIG. 37 for example shows an object 382 on the roller conveyor 320, and shows a payload receiving portion 336 of the mobile carrier 312 at a lifted position within a conveyor vertical structure 318. The mobile carrier 312 stops rising when the tops of the support ribs 341 of the payload receiving portion 336 are just below the highest points of the rollers of the roller conveyor 320. The payload receiving portion 336 extends out between the rollers. The mobile carrier 312 then raises itself a small amount by actuating rotation of lift pinion gears 350, thereby shifting the weight of the object 382 from the rollers to the support ribs 341 as shown in FIG. 38. The process may be used in reverse (extending above the rollers and then lowering the mobile carrier) to transfer an object from the mobile carrier 312 to the roller conveyor 320.

The lifting system including the lifting rack gears 340 and the lifting pinion gears 350 may be used in cooperation with the linear extension drive system to transfer objects between mobile carriers and any of shelving or roller conveyors or any station that includes slot openings to accommodate the support ribs 341.

Figure 39:
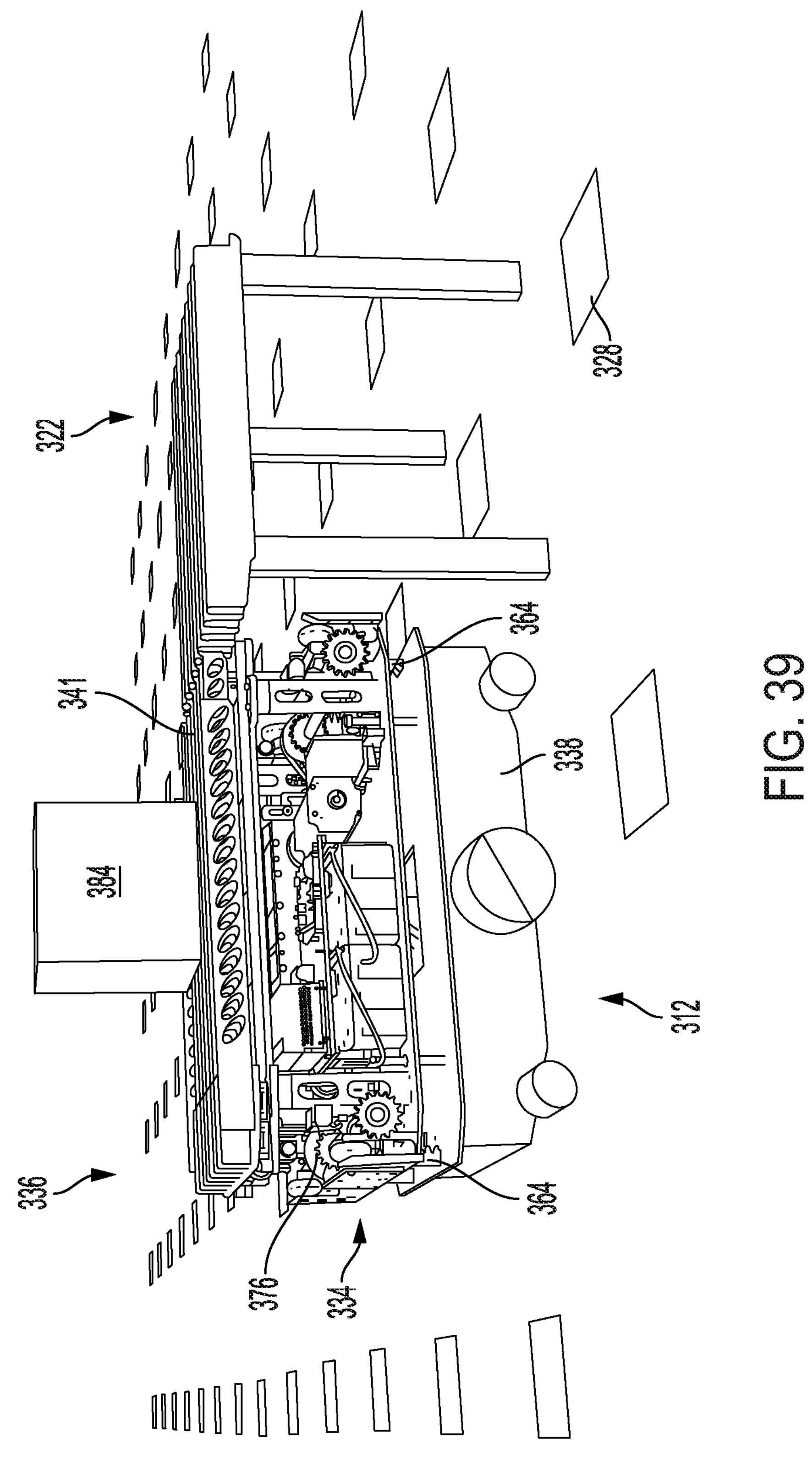
FIG. 39 shows an illustrative diagrammatic view of the automated mobile carrier of FIG. 27 positioned to move an object onto a free-standing shelf on a floor.
Figure 40:
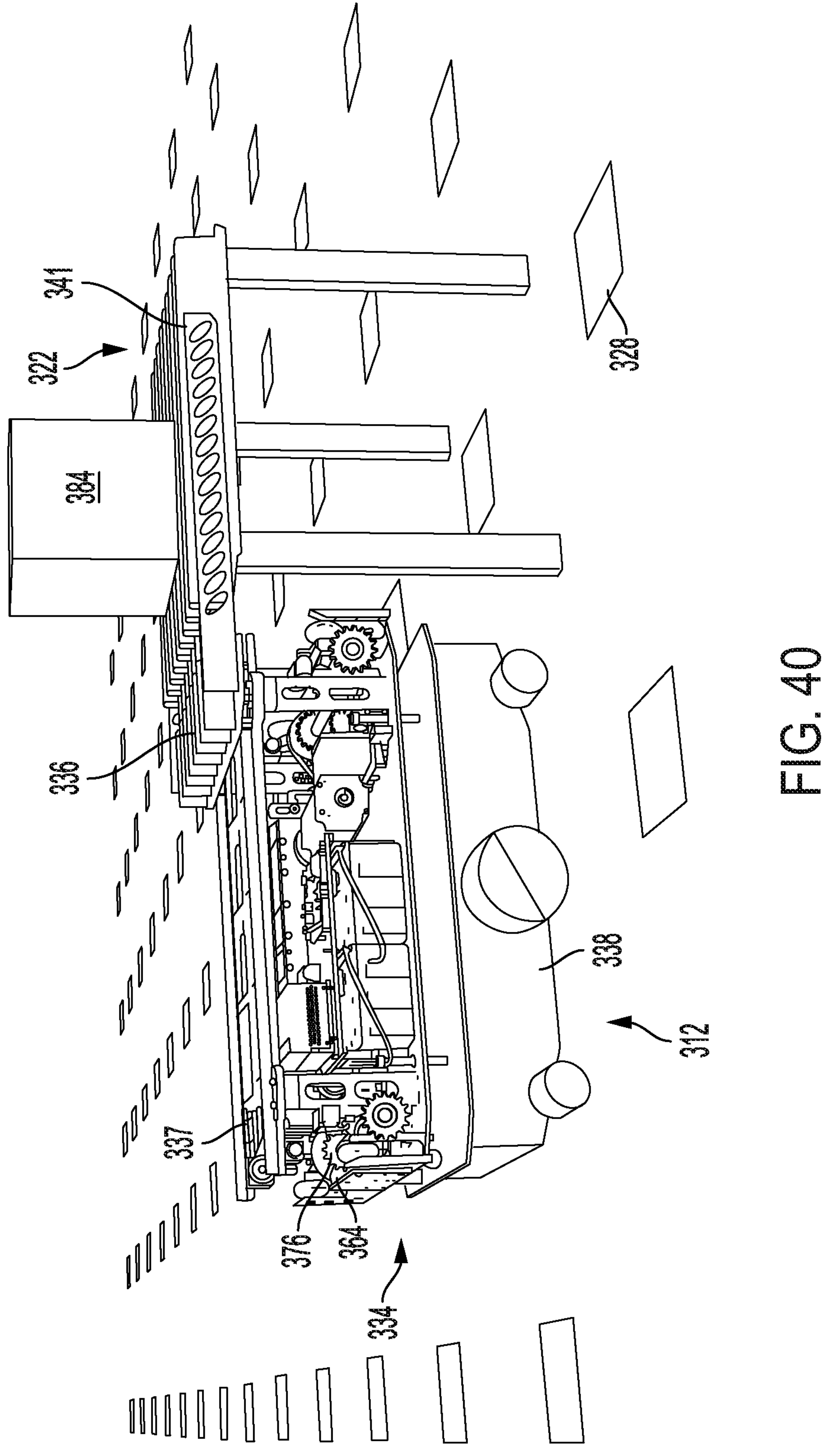
FIG. 40 shows an illustrative diagrammatic view of the automated mobile carrier of FIG. 35 having transferred the object onto the free-standing shelf on the floor.

In accordance with yet further aspects, the mobile carrier may employ the base pinion gears 376 and the base rack gears 364 of the mobile carrier itself to transfer objects between the mobile carrier and a low shelf 322. FIG. 39 for example shows an object 384 on a payload receiving portion 336 of the mobile carrier 312 that is on the floor. The mobile carrier 312 raises the support structure 334 and payload receiving portion 336 with respect to the carrier base 338 (even though it is not below any lift rack gears). The support structure 334 and payload receiving portion 336 stops rising when the tops of the support ribs 341 of the payload receiving portion 336 are above the highest points of the shelf 322 of the shelving 316 (again formed of a generally corrugated shape), permitting the support ribs 341 to move between adjacent peaks of the shelf 322. The payload receiving portion 336 extends out over the shelf 322, and the support structure 334 and payload receiving portion 336 are then lowered back down toward the carrier base (again by action of the base pinion gears 376 on the base rack gears 364). This lowering then shifts the weight of the object 384 from the support ribs 341 to the shelf 322 as shown in FIG. 40. The process may be used in reverse (extending below a shelf and then raising the mobile carrier) to lift an object off of the shelf onto the mobile carrier.

With respect to lower stations (such as shelves) that are near the ground, the mobile carrier need not climb any lift rack gears. The transfer is accomplished using the linear extension drive system in cooperation with the base pinion gears 376 and the base rack gears 364 on the mobile carrier itself. As is described herein above, the actuation of the gearing arrangement that rotates the base pinion gears 376 (and by association, lift pinion gears 350, though not currently engaged), the support structure 334, and the payload receiving portion 336, is raised relative to the carrier base 338. Such shelves may extend horizontally, permitting mobile carriers to access each portion of a shelf by simply driving up to the selected shelf portion, and multiple such floor shelves may be provided. Again, operation of the mobile carriers, roller conveyor, and mobile carrier motors and perception system is provided by one or more computer processing systems.

Figure 41A:
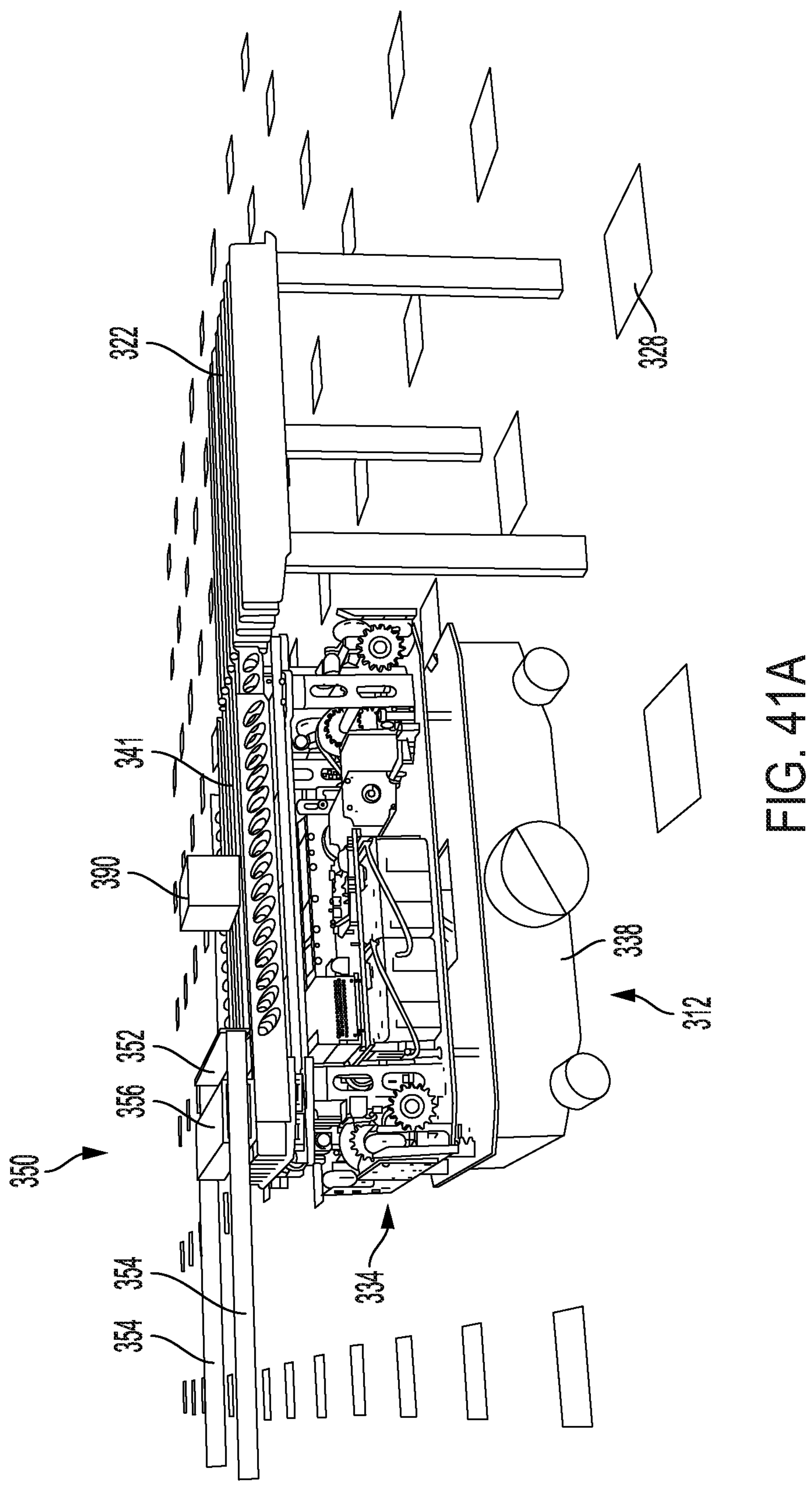
FIGS. 41A-41D show illustrative diagrammatic views of an automated mobile carrier in for use in an object processing system of a further aspect of the invention, showing a push bar of the automated mobile carrier positioned to move an object on the payload receiving portion (FIG. 41A), having moved the object on the payload receiving portion (FIG. 41B), having retracted the push bar (FIG. 41C), and having moved a second object onto the free-standing shelf on the floor (FIG. 41D)
Figure 41B:
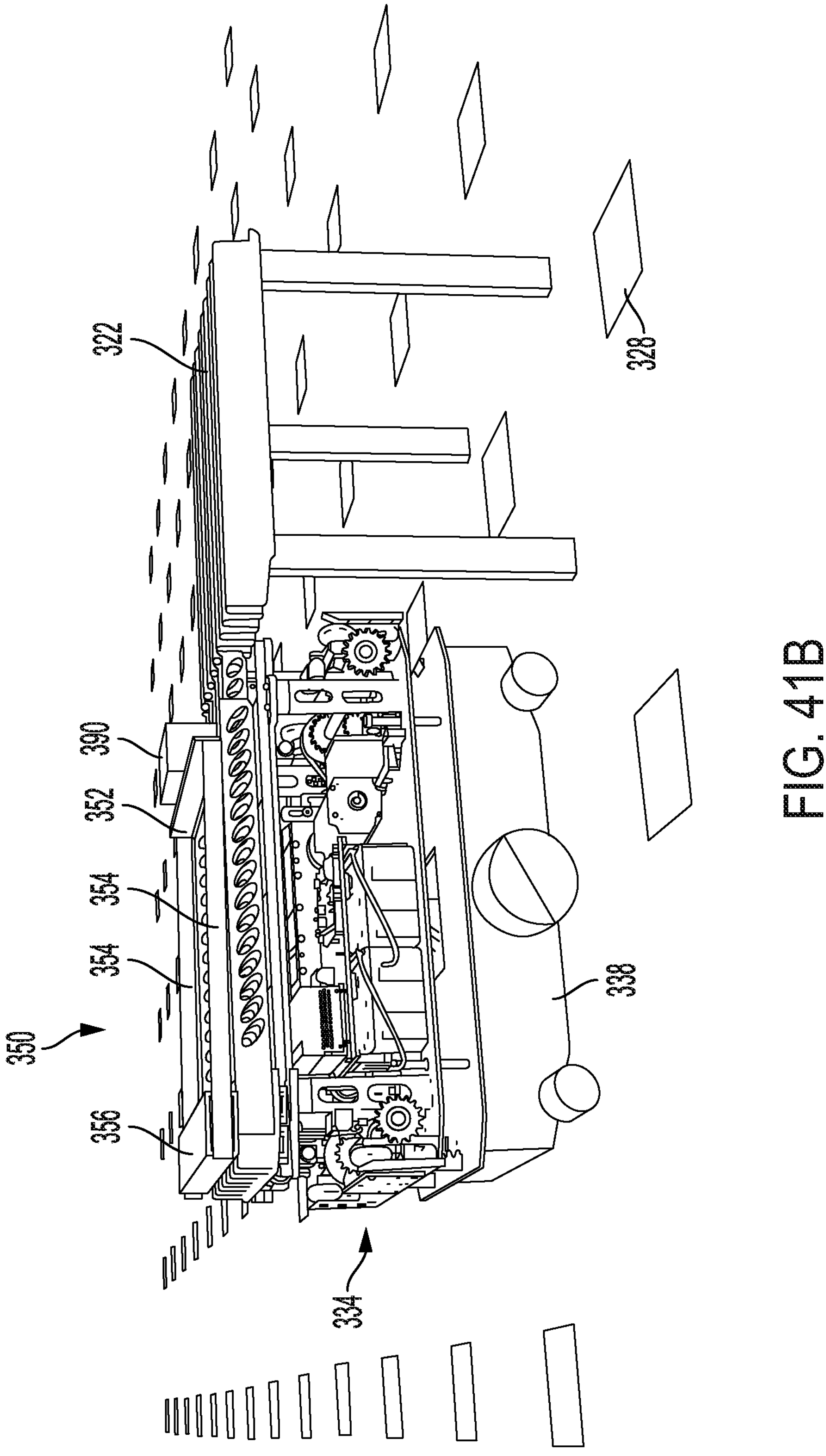
Figure 41C:
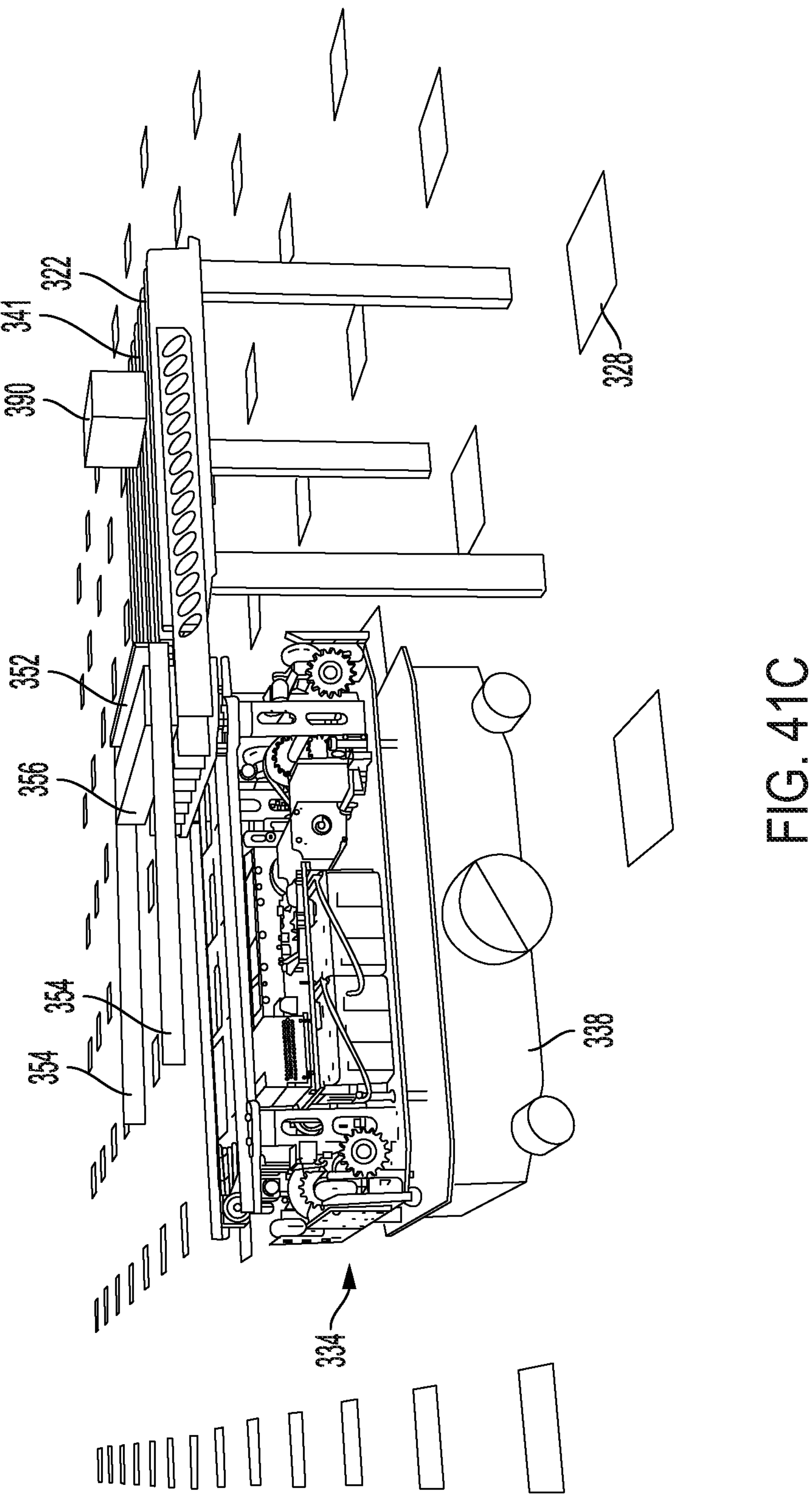
Figure 41D:
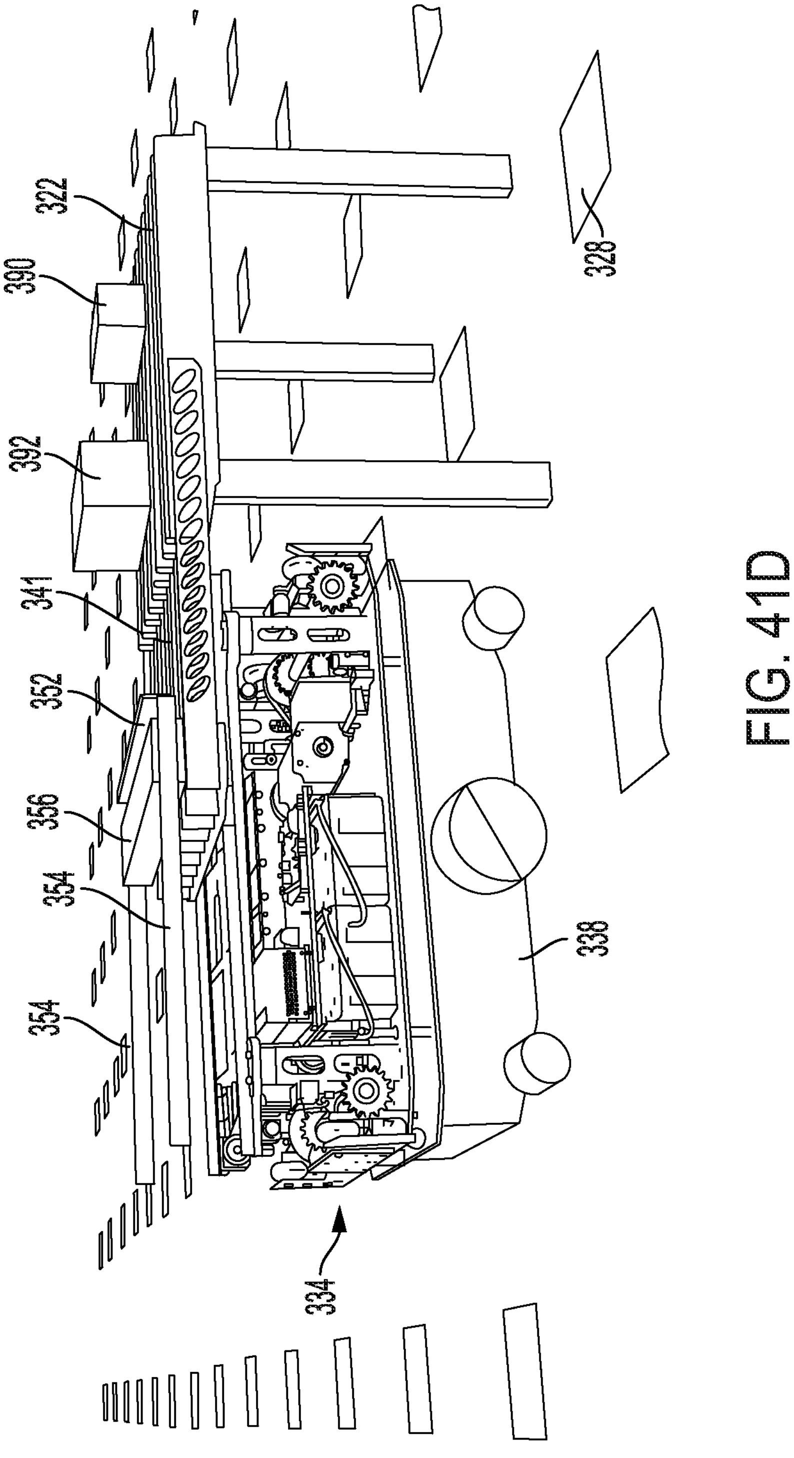

The automated mobile carrier 12 of FIG. 1, and the automated mobile carrier 312 of FIG. 27 may further include a payload position adjustment system for adjusting a position of an object on the payload receiving portion of the carrier. For example, FIG. 41A shows the carrier 312 with a payload position adjustment system 350 for adjusting a position of an object 390 on the support ribs 341 of the payload receiving portion. The payload position adjustment system 350 includes a push bar 352 that may be moved by a power system 356 via rails 354. FIG. 41B shows the push bar 352 having urged the object 390 to a forward position on the support ribs 341 of the payload receiving portion. In FIGS. 41A and 41B the support structure 334 is raised with respect to the base 338 to a height sufficient to provide that the support ribs 341 of the payload receiving surface are higher than the highest portions of the shelf 322. In this arrangement, the support ribs 341 may be moved among the corrugations of the shelf to bring the object 390 above the shelf 322. With reference to FIG. 41C, the push bar 352 in then drawn back toward the power system 356 and the support ribs (together with the support structure 334) is lowered such that the object 390 remains on a distal portion of the shelf The push bar 352 is first withdrawn and then the support structure is lowered to prevent the push bar 352 from colliding with the shelf In accordance with further aspects, the payload position adjustment portion may accommodate elevational changes of the support structure 334 with respect to the shelf 322. A further object may then be loaded onto an automated mobile carrier and again moved to a forward position on the payload receiving surface. With reference to FIG. 41D, the further object 392 may then be similarly deposited onto the shelf but in proximal position on the shelf. In FIGS. 41C and 41D the support structure 334 is lowered with respect to the base 338 such that the highest edges of the support ribs 341 of the payload receiving surface are below the tops of the shelf. In this way, multiple objects may be positioned at a shelf location that otherwise may have only been able to receive one object.

The raising of the support structure relative the carrier base engages the support structure with a vertical structure (e.g., 14) when the carrier is beneath the vertical structure. The raising (and lowering) of the support structure relative the carrier base is also used to move objects between a carrier and a floor shelf as discussed above with reference to FIGS. 39-41D. With the automated mobile carriers discussed above, the support structures are raised relative the respective carrier bases through operation of base pinion gears that engage base gear racks (e.g., 76, 64 as shown in FIGS. 15A, 15B). The support structure however may be raised and lowered relative the base through a variety of other techniques, including for example, screw drives, ball screw systems, linear actuators, and mechanical cam systems, etc.

Figure 42A:
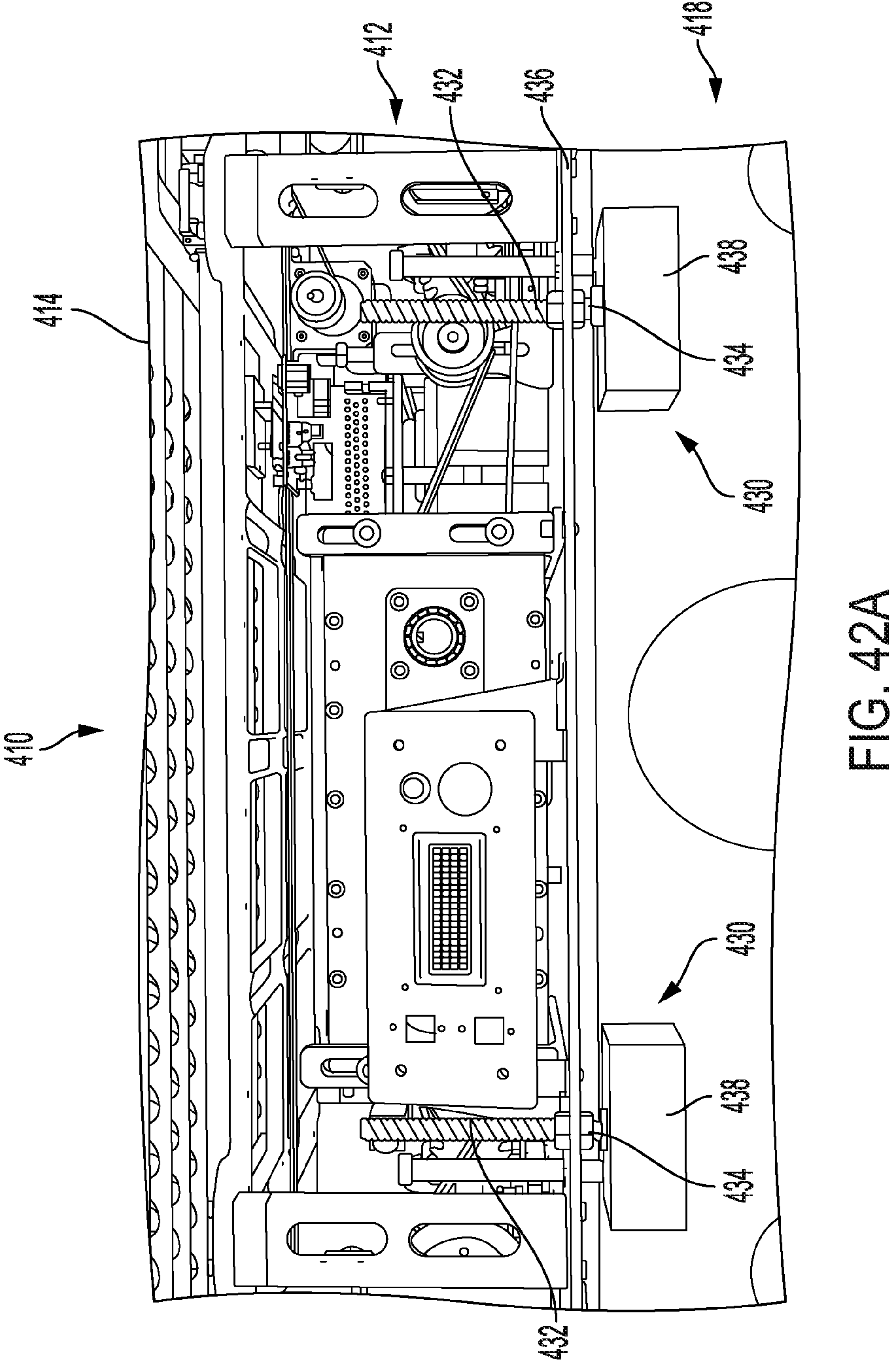
FIGS. 42A and 42B show illustrative diagrammatic side views of the automated mobile carrier in accordance with another aspect of the present invention with a slide rod drive lifting system showing the payload receiving portion not raised (FIG. 42A) and showing the payload receiving portion raised (FIG. 42B)
Figure 42B:
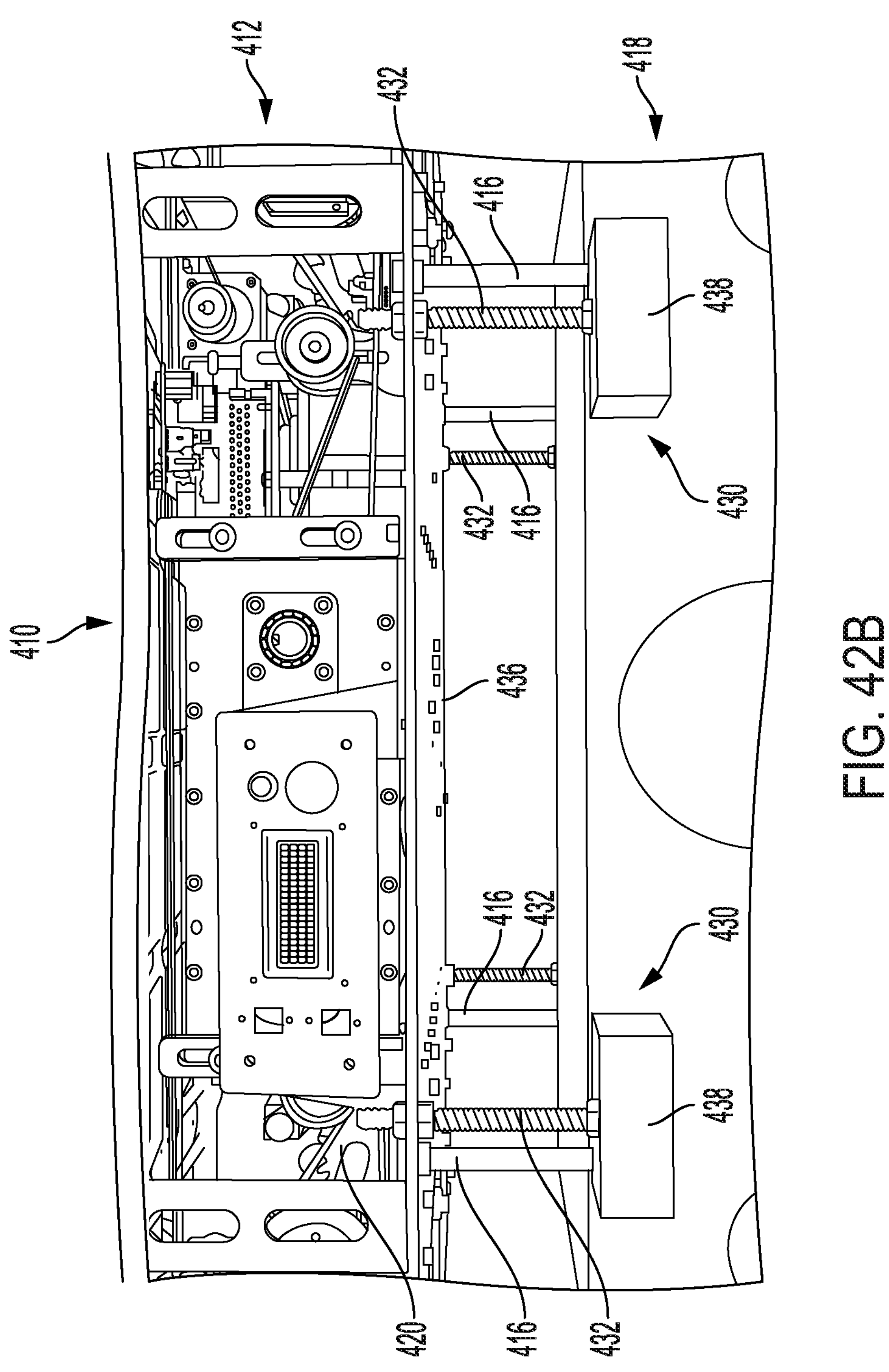

FIGS. 42A and 42B show an automated mobile carrier 410 in accordance with another aspect of the present invention that includes a support structure 412 with a payload receiving portion 414 that may be raised and lowered with respect to a carrier base 418 as optionally guided (at least in part) by capped slide rods 416. Once raised, lift pinion gears 420 engage lift rack gears of a vertical structure, and move along the vertical structure as guided by slide guides 352 and roller guides 354 as discussed above. The carrier 410 also includes screw drive systems 430 (e.g., four screw drive or ball screw systems) that can be mounted on the carrier base 418 as shown, or optionally on the support structure floor 436. Each screw drive system 430 includes a screw 432 and a fitted drive nut 434 (e.g., threaded or provided with bears that serve as threads). The drive nuts 434 are shown fixed to the support structure floor 436, and when the screw drive power system 438 turns each screw 432, the drive nuts 434 urge the support structure floor 436 (and entire support structure 412) upward. Reversing the direction of rotation of the screws 432 returns the support structure to the lower position with respect to the carrier base 418. FIG. 42A shows the support structure 412 in the lowered position with respect to the carrier base 418, and FIG. 42B shows the support structure 412 in the raised position with respect to the carrier base 418. When the support structure 412 is raised, the lift pinion gears 420 engage lift rack gears of a vertical structure and move along the vertical structure as guided by slide guides 352 and roller guides 354 as discussed above. Further, the raising (and lowering) of the support structure relative the carrier base using the screw drive systems 430 is also used to move objects between the carrier and a floor shelf as discussed above with reference to FIGS. 39-41D.

Figure 43A:
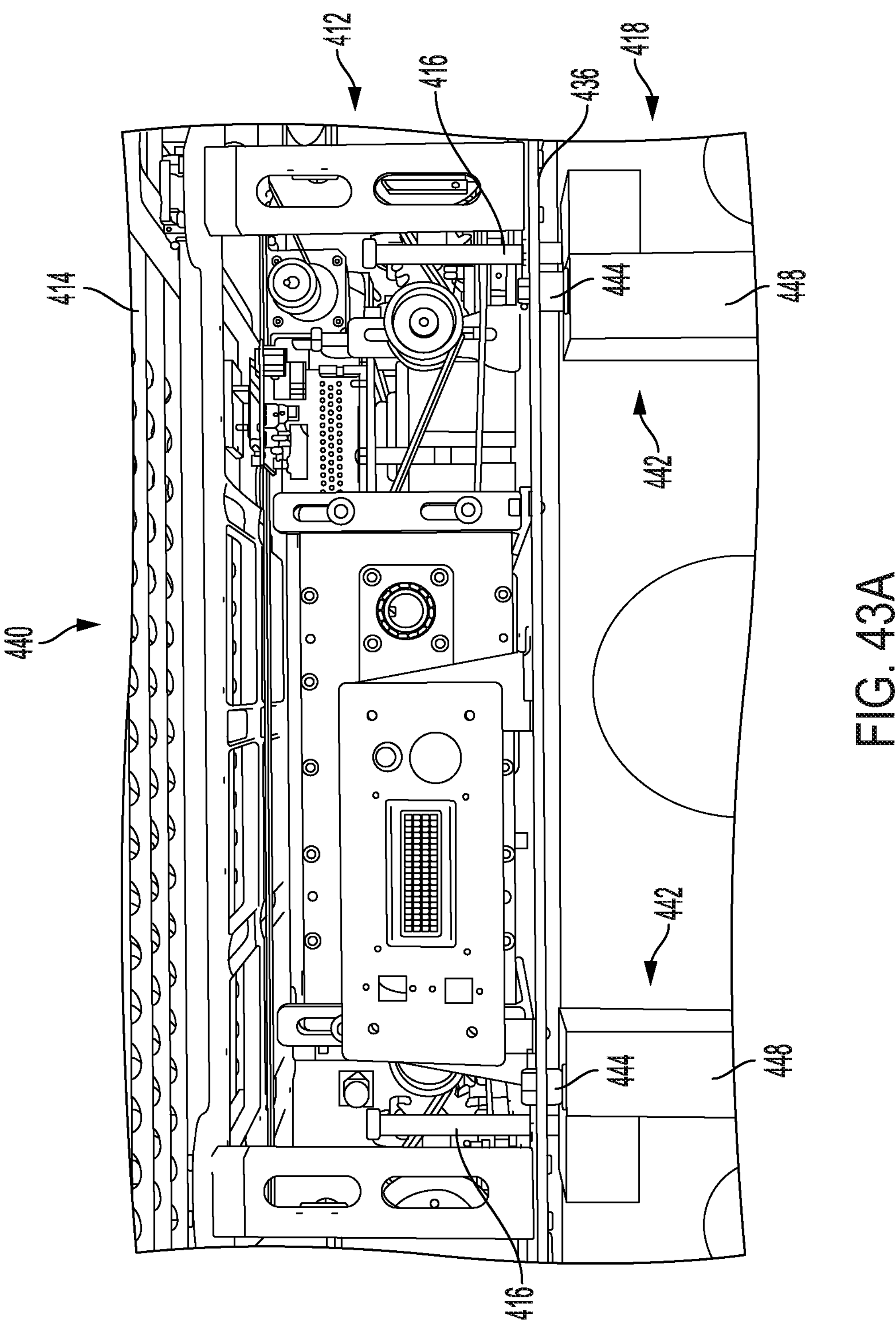
FIGS. 43A and 43B show illustrative diagrammatic side views of the automated mobile carrier in accordance with another aspect of the present invention with a linear drive lifting system showing the payload receiving portion not raised (FIG. 43A) and showing the payload receiving portion raised (FIG. 43B)
Figure 43B:
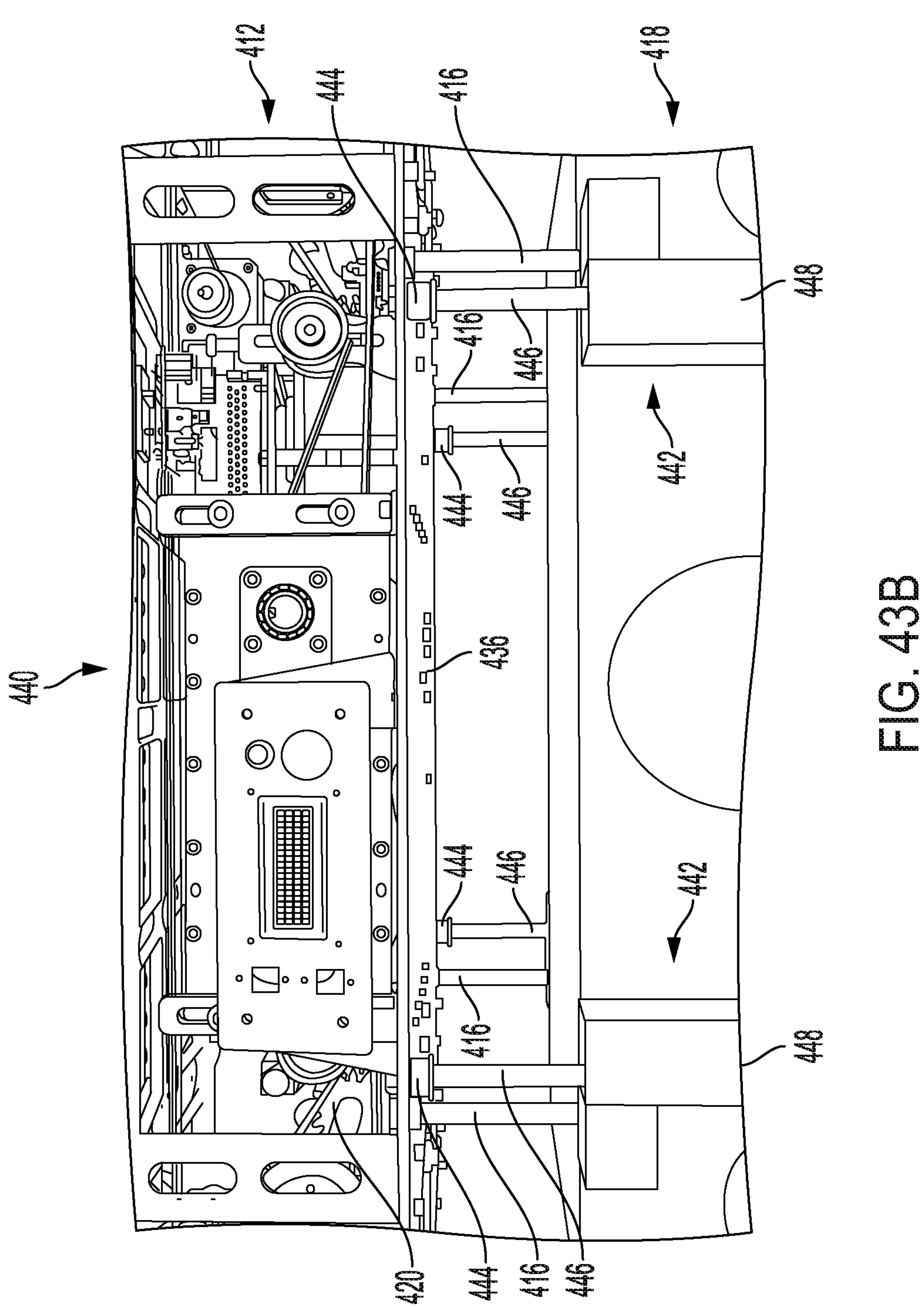

FIGS. 43A and 43B show an automated mobile carrier 440 in accordance with another aspect of the present invention that similarly includes a support structure 412 with a payload receiving portion 414 that may be raised and lowered with respect to a carrier base 418 as optionally guided (at least in part) by capped slide rods 416. Once raised, lift pinion gears 420 engage lift gear racks 340 of a vertical structure, and move along the vertical structure as guided by slide guides 352 and roller guides 354 as discussed above. The carrier 440 also includes linear drive systems 442 (e.g., four linear drive systems) that can be mounted on the carrier base 418 as shown, or optionally on the support structure floor 436. Each linear drive system 442 includes a linear drive rod 446 (shown in FIG. 43B), the distal end of which 444 is shown fixed to the support structure floor 436 and the proximal end is within a linear drive power control system 448. When the linear drive power system drives the rod 446 upward, the ends 444 urge the support structure floor 436 (and entire support structure 412) upward. Reversing the power of the drive power system 448 returns the support structure to the lower position with respect to the carrier base 418. FIG. 43A shows the support structure 412 in the lowered position with respect to the carrier base 418, and FIG. 43B shows the support structure 412 in the raised position with respect to the carrier base 418. When the support structure 412 is raised, the lift pinion gears 420 engage lift rack gears of a vertical structure and move along the vertical structure as guided by slide guides 352 and roller guides 354 as discussed above. Further, the raising (and lowering) of the support structure relative the carrier base using the linear drive systems 442 is also used to move objects between the carrier and a floor shelf as discussed above with reference to FIGS. 39-41D.

Figure 44A:
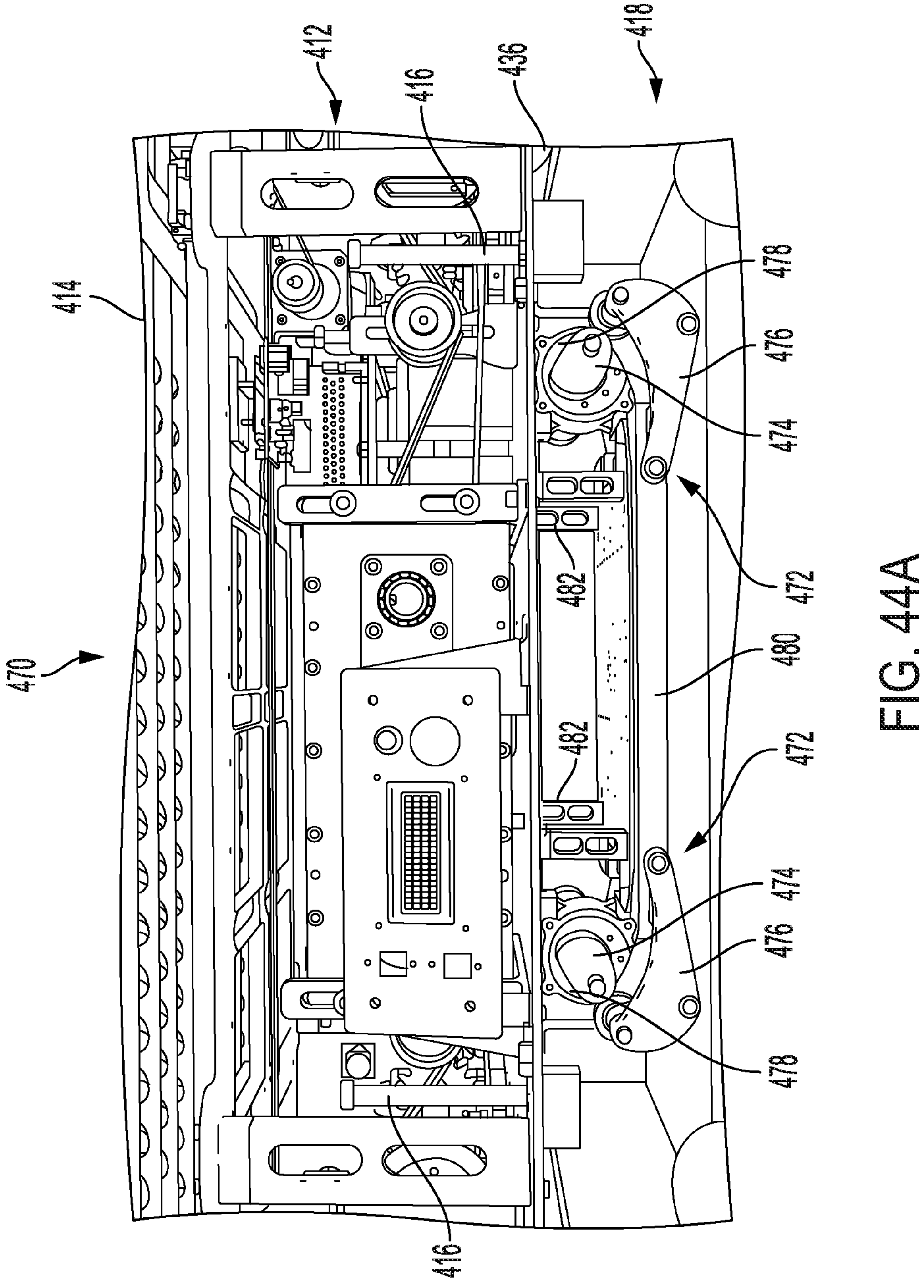
FIGS. 44A and 44B show illustrative diagrammatic side views of the automated mobile carrier in accordance with another aspect of the present invention with a cam drive lifting system showing the payload receiving portion not raised (FIG. 44A) and showing the payload receiving portion raised (FIG. 44B)
Figure 44B:
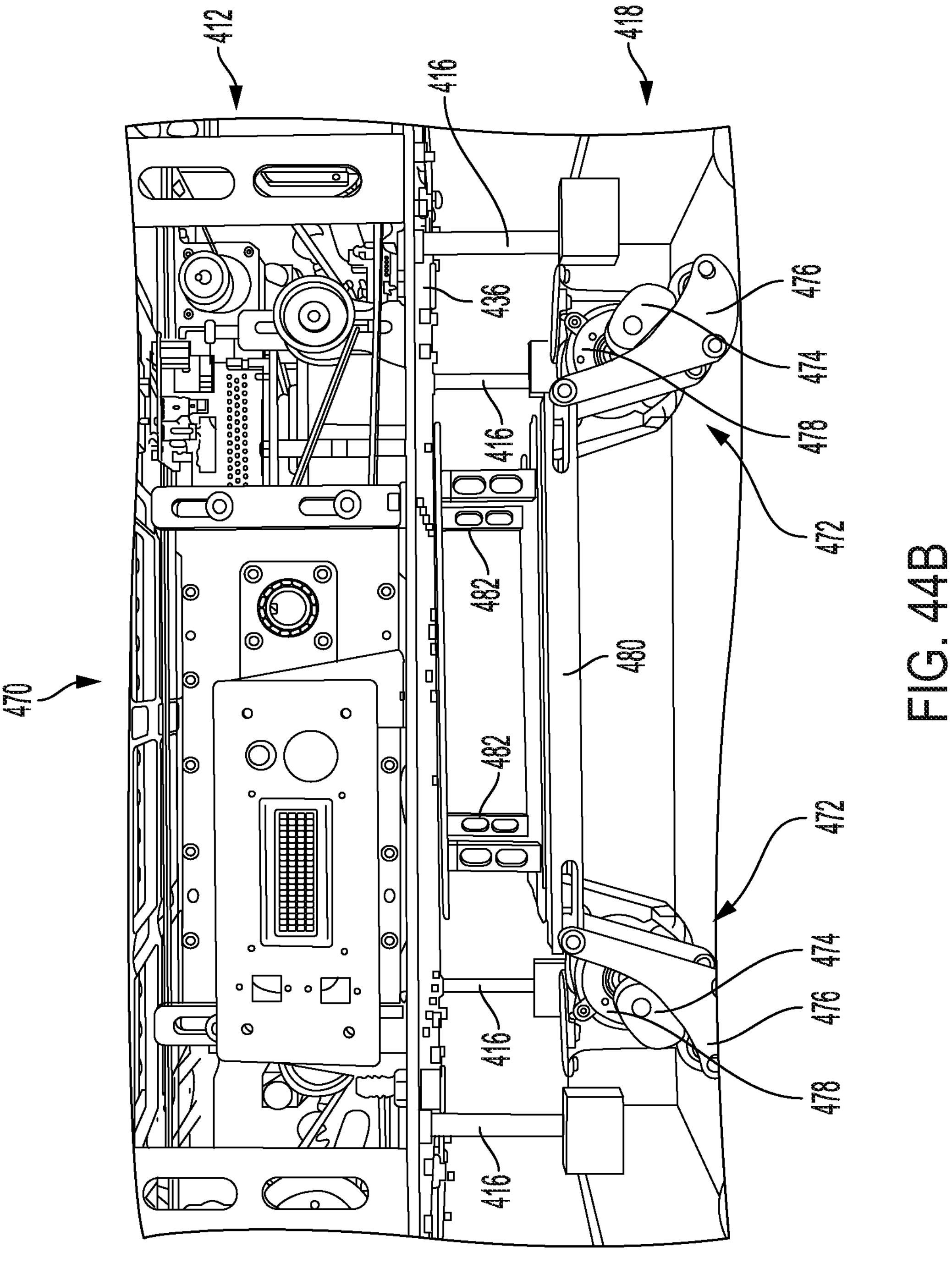

FIGS. 44A and 44B show an automated mobile carrier 470 in accordance with another aspect of the present invention that similarly includes a support structure 412 with a payload receiving portion 414 that may be raised and lowered with respect to a carrier base 418 as optionally guided (at least in part) by capped slide rods 416. A side wall portion of the carrier base is removed to show the lifting system within discussed below. Once raised, lift pinion gears 420 engage lift rack gears of a vertical structure, and move along the vertical structure as guided by slide guides 352 and roller guides 354 as discussed above. The carrier 470 also includes cams 474 that are urged against followers attached to rockers 476. The cams 474 are rotated by drive systems 478. The ends of the rockers 476 are attached to cross beams 480 that support a sub-support structure 482 that in turn supports the support structure 412. FIG. 44A shows the cams 474 rotated such that the rockers are positioned to permit the cross beams 480, sub-support structure 482 and support structure 412 to remain in a lowered position. FIG. 44B shows the cams 474 rotated such that the rockers urge the cross beams 480 upward, which lifts the sub-support structure 482 and the support structure 412. Using the motor 478, the cams are used to lift and lower the support structure 412 with respect to the carrier base 418. Again, when the support structure 412 is raised, the lift pinion gears 420 engage lift gear racks 340 of a vertical structure and move along the vertical structure as guided by slide guides 352 and roller guides 354 as discussed above. Further, the raising (and lowering) of the support structure relative the carrier base using the linear drive systems 442 is also used to move objects between the carrier and a floor shelf as discussed above with reference to FIGS. 39-41D.

Figure 45:
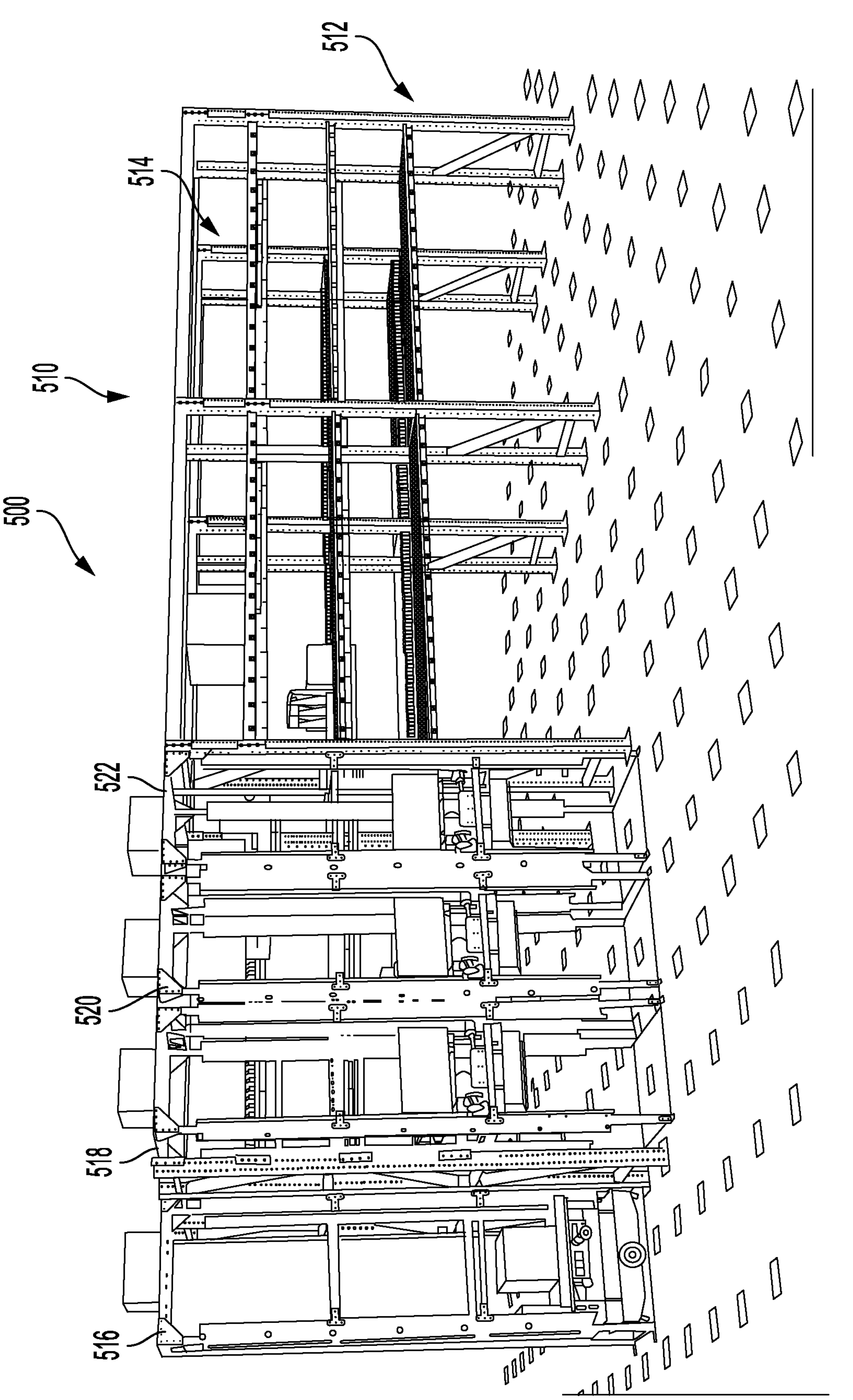
FIG. 45 shows an illustrative diagrammatic view of an object processing system in accordance with another aspect of the present invention that includes a plurality of vertical lift structures.
Figure 46:
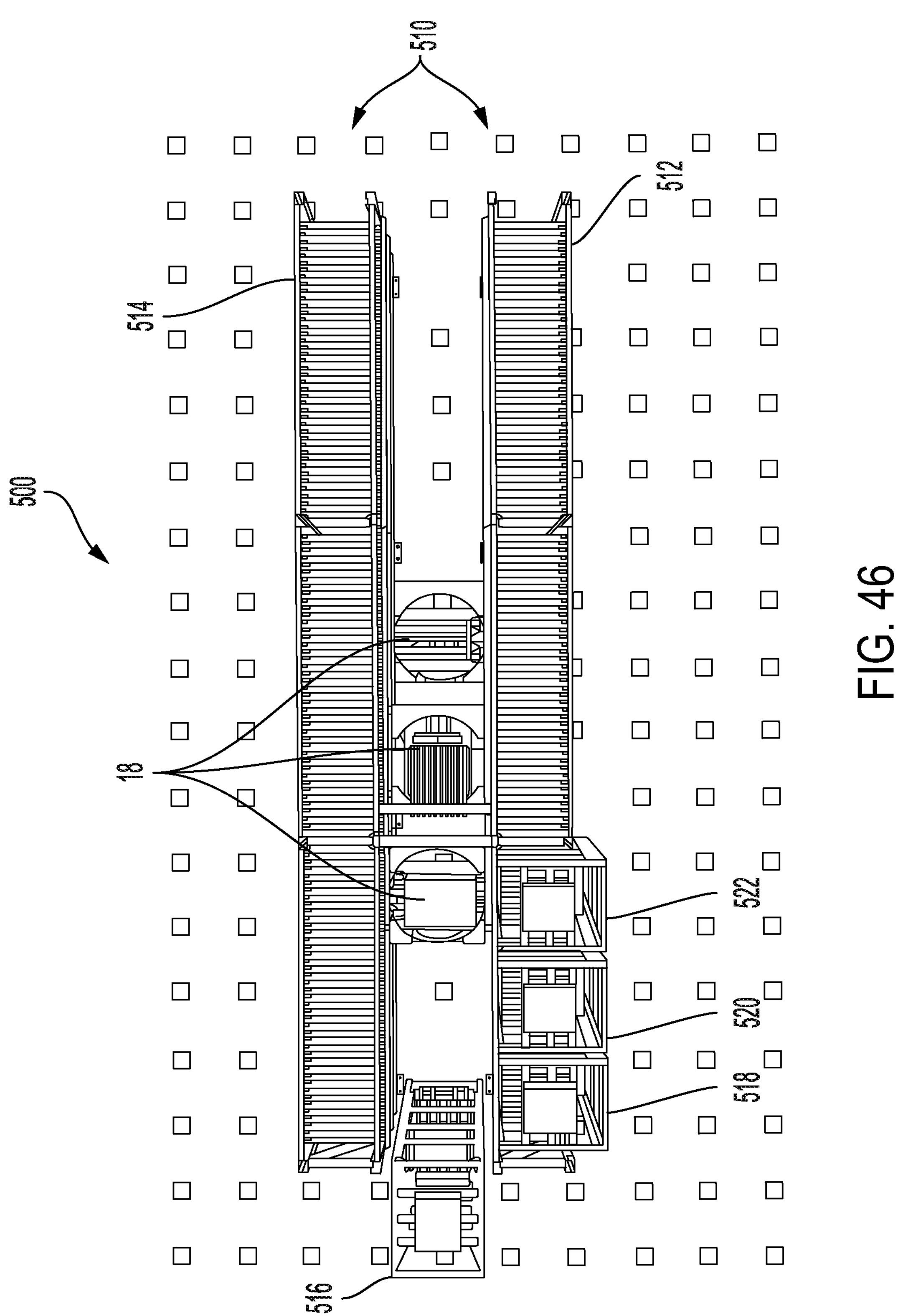
FIG. 46 shows an illustrative diagrammatic top view of the object processing system of FIG. 45.
Figure 47:
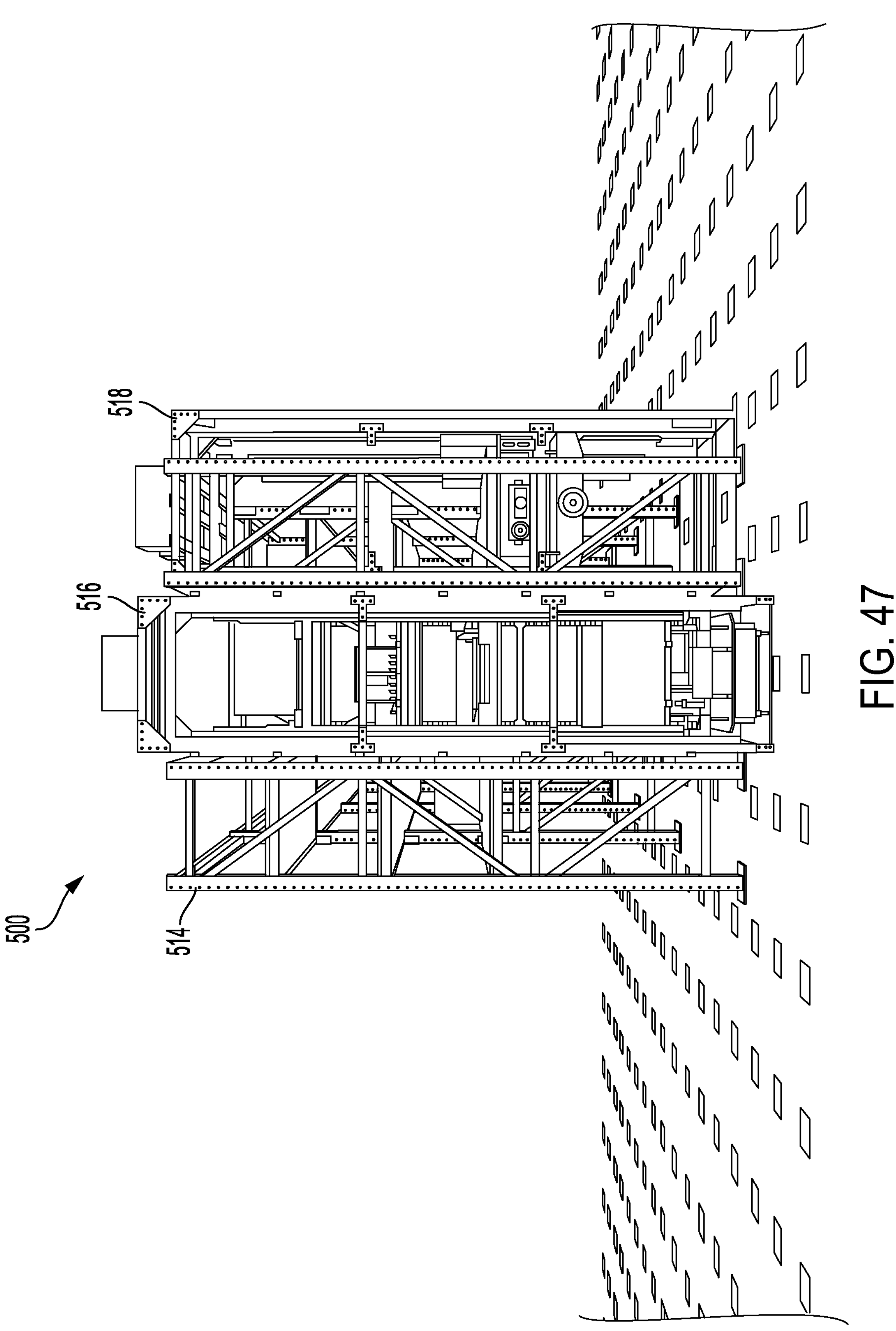
FIG. 47 shows an illustrative diagrammatic end view of the object processing system of FIG. 45.
Figure 48:
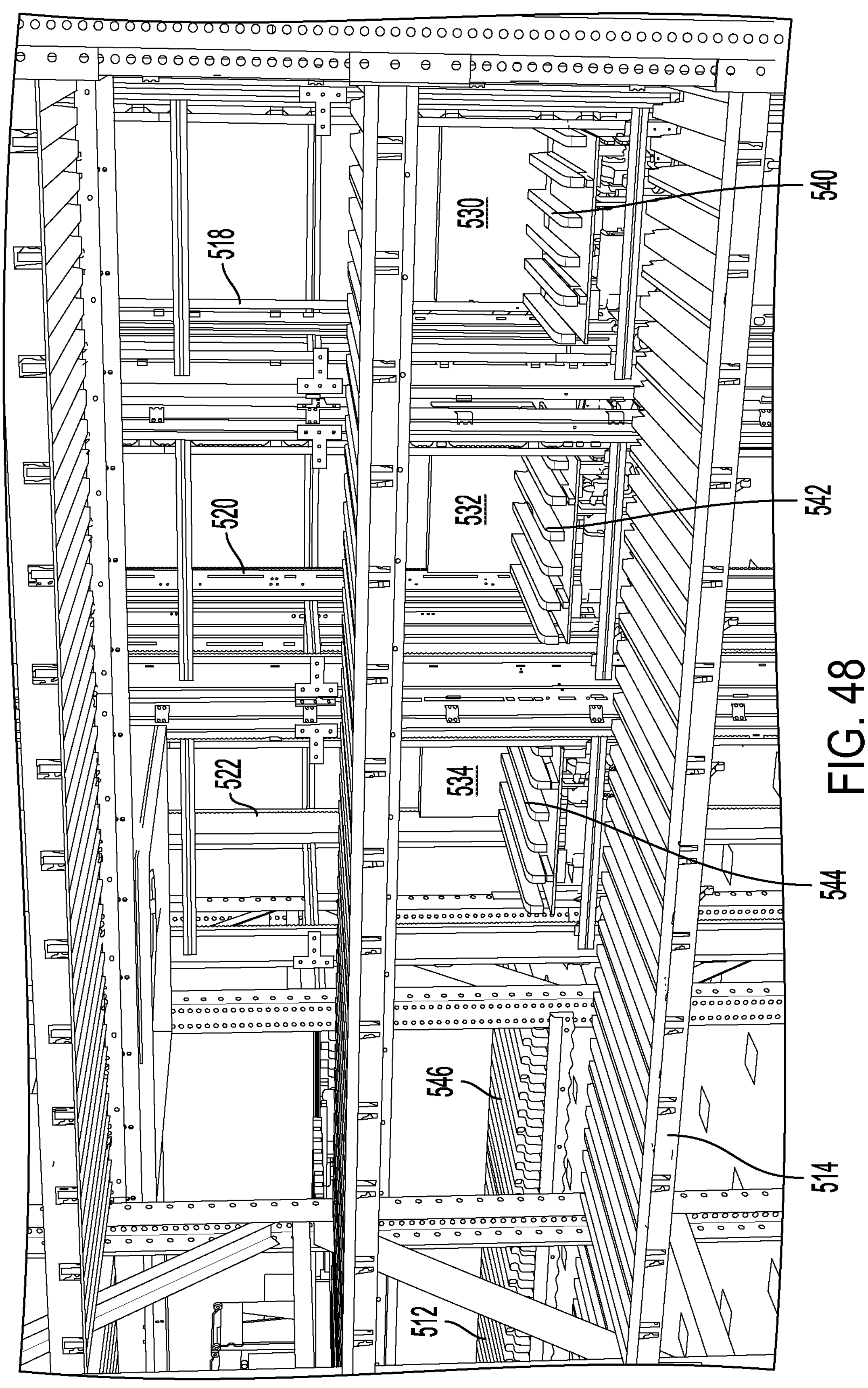
FIG. 48 shows an illustrative diagrammatic enlarged view of a portion of the object processing system of FIG. 45.

As discussed above, the vertical lift structure (e.g., vertical lift structure 14 of FIG. 1, vertical lift structure 314 of FIG. 27) may be provided at the end of a set of mutually facing shelving (as shown in FIGS. 1 and 27). In accordance with further aspects, the sets of shelving may include vertical lift structures in other arrangements with shelves or sets of shelves. For example, FIG. 45 shows an object processing system 500 that includes a set 510 of mutually facing shelving 512, 514. The system 500 includes a first vertical lift structure 516 as discussed above, as well as additional vertical lift structures 518, 520, 522. Each of the vertical lift structures 516, 518, 520, 522 is able to receive an automated mobile carrier as discussed above with reference to the vertical lift structure 14, 314. FIG. 46 shows a top view of the system 500, and FIG. 47 shows an end view of the system 500. The use of multiple vertical lift structures may increase throughput of objects to and from the shelving 512, 514. Additionally, and as shown in FIG. 48, when an automated mobile carrier is positioned within a vertical lift structure, the carrier itself may function as a shelf (e.g., when not needed for moving objects). FIG. 48 shows carriers 530, 532, 534 within vertical lift structures 518, 520, 522 respectively, and the carriers 530, 532, 534 are positioned such that their payload receiving portions 540, 542, 544 are level with a shelf level 546 of shelving 512. The payload receiving portions 540, 542, 544 may function as shelves (exchanging objects with automated shuttle carriers 18 (shown in FIG. 46)) in this way until needed for transport.

Figure 49:
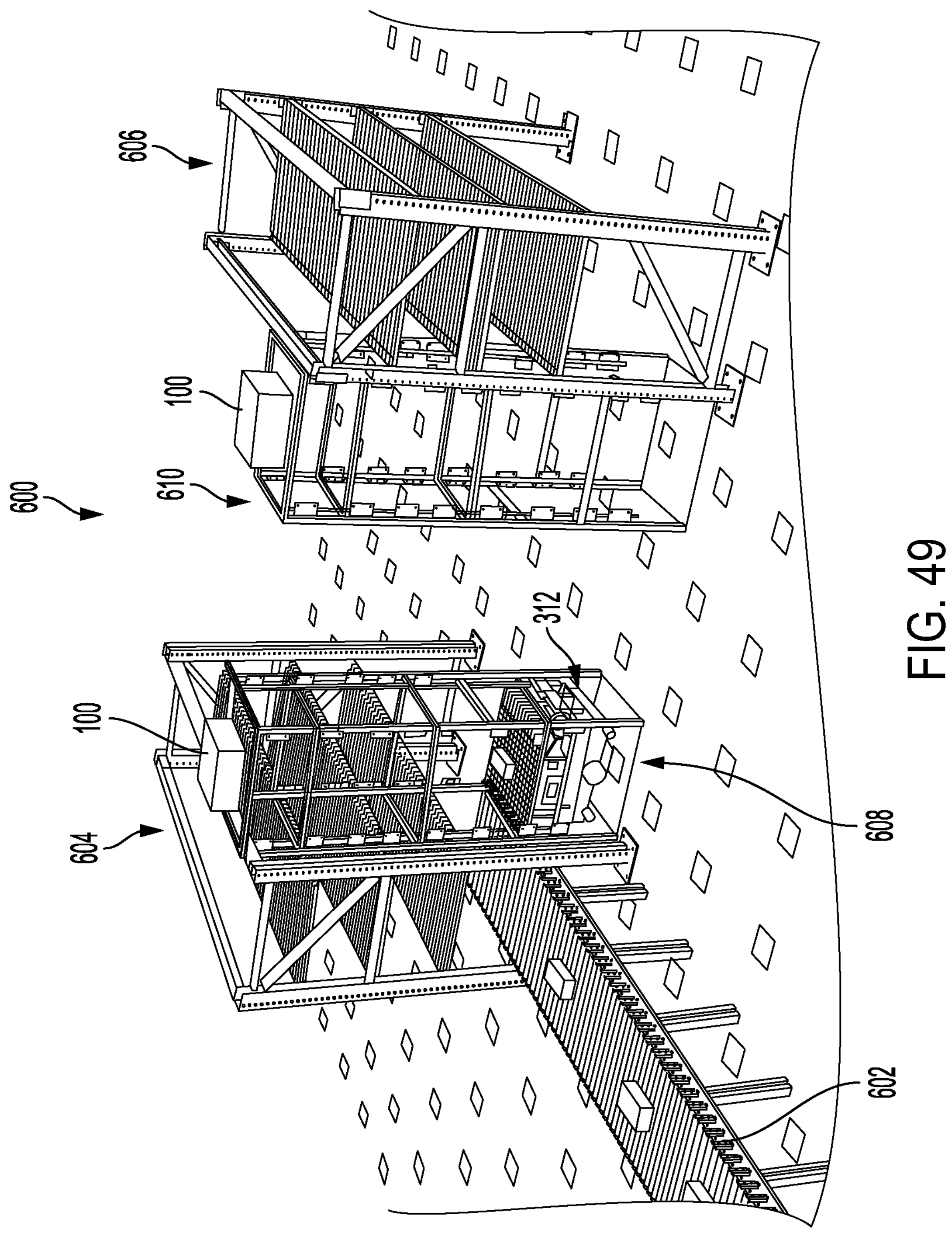
FIG. 49 shows an illustrative diagrammatic view of an object processing system in accordance with another aspect of the present invention that includes plural vertical lift structures associated with plural shelving units.
Figure 50:
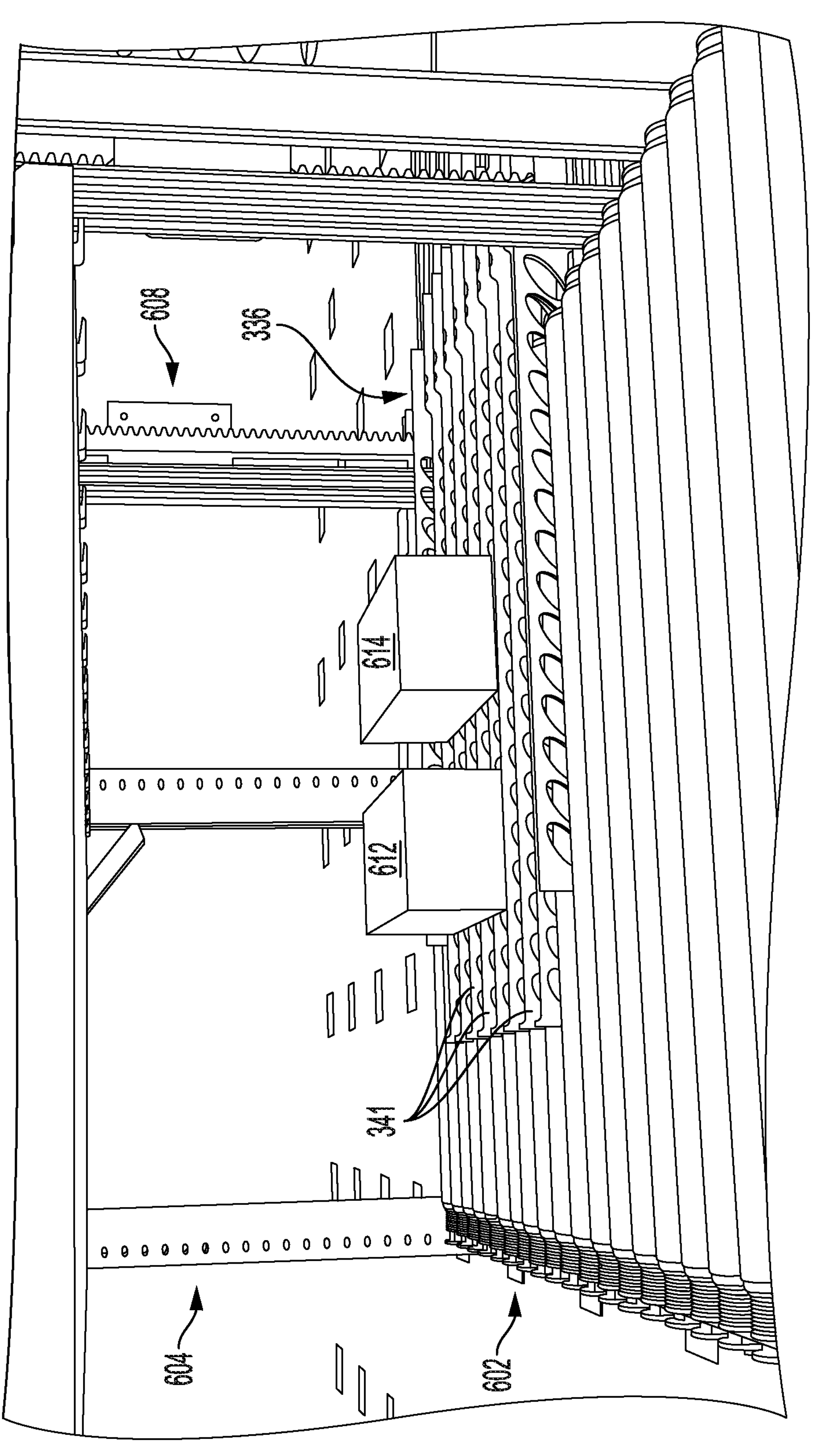
FIG. 50 shows an illustrative diagrammatic view of the object processing system of FIG. 49 showing plural objects being processed on a single payload support structure of an automated mobile carrier.

In accordance with further aspects, systems of the invention may combine receiving objects from a conveyor (as discussed above with reference to FIGS. 37 and 38) with storing objects on shelves. FIG. 49, for example shows a system 600 that includes a roller conveyor 602, and shelving units 604, 606. The system also includes vertical structures 608, 610 along which automated mobile carriers 12, 312 may move vertically to access vertically stacked shelves of each shelving unit. The vertical structure 608 also permits an automated mobile carrier 12, 312 to access objects on the roller conveyor 602. FIG. 50 for example shows a pair of objects 612, 614 on the roller conveyor 602, and shows a payload receiving portion 336 of the mobile carrier 312 at a lifted position within a vertical structure 608. Note that the vertical structure 608 accesses both the roller conveyor 602 and the shelving unit 604.

To pick up one or more objects from the conveyor the mobile carrier 312 stops rising when the tops of the support ribs 341 of the payload receiving portion 336 are just below the highest points of the rollers of the roller conveyor 602. The payload receiving portion 336 extends out between the rollers. The mobile carrier 312 is then raised a small amount shifting the weight of the objects 612, 614 from the rollers to the support ribs 341 as shown in FIG. 50. The process may be used in reverse (extending above the rollers and then lowering the mobile carrier) to transfer an object from the mobile carrier 312 to the roller conveyor 602. By modulating the extension of the support ribs 341, the system may retrieve or deposit one or more (e.g., one, two or three) objects from or to any of the roller conveyor of the shelves of the shelving units. FIG. 50 shows picking up two units at one time from the roller conveyor by extending the support ribs 341 below both objects. Multiple objects may therefore be lifted and moved together.

Figure 51:
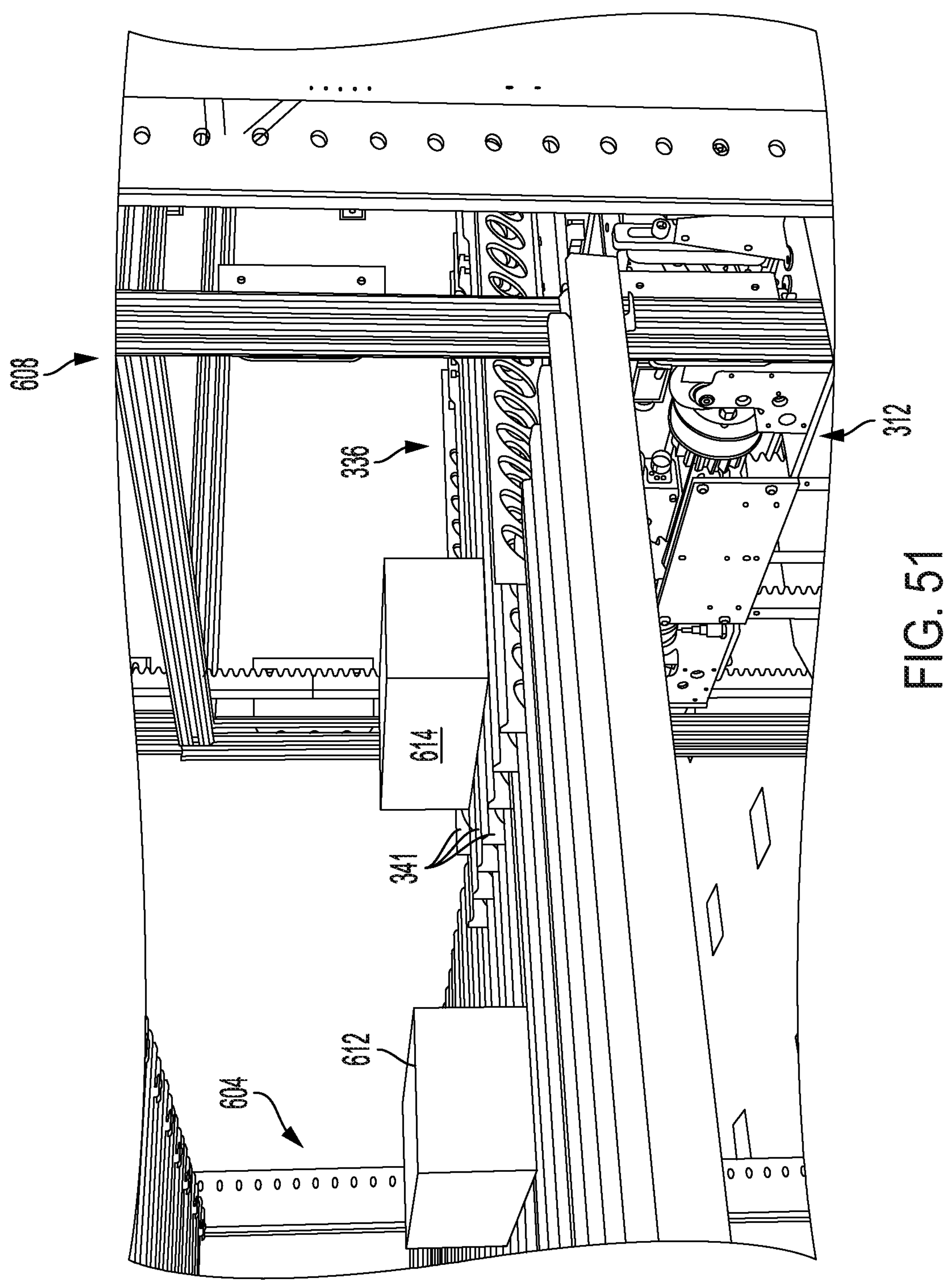
FIG. 51 shows an illustrative diagrammatic view of a subset of plural objects on a shelf being processed by a payload support structure of an automated mobile carrier.

The lifting system including the lift gear racks 340 and the lift pinion gears 350 may be used in cooperation with the linear extension drive system to transfer plural objects or individual objects between mobile carriers and any of shelving or roller conveyors or any station that includes slot openings to accommodate the support ribs 341. Extending the support ribs 341 only under the first object 614 for example in FIG. 51 would result in only the first object being lifted. For example, if both objects 612, 614 had been first moved to the shelf shown in FIG. 51 of shelving unit 604, then the system may extend the support ribs to be under the object 614 only so that only the object 614 is lifted as shown. It may be generally desired to keep any single object being moved closer to the free ends of the support ribs 341. By controlling the extension of the support ribs with the object retrieval and depositing, many combinations of single, double and triple packing densities may be achieved, and further the system may provide singulated or batch discharge of items. In accordance with various aspects, the roller conveyor 602 (or another similar roller conveyor in communication with shelving unit 606) may be used to discharge objects form the system 600.

Figure 52:
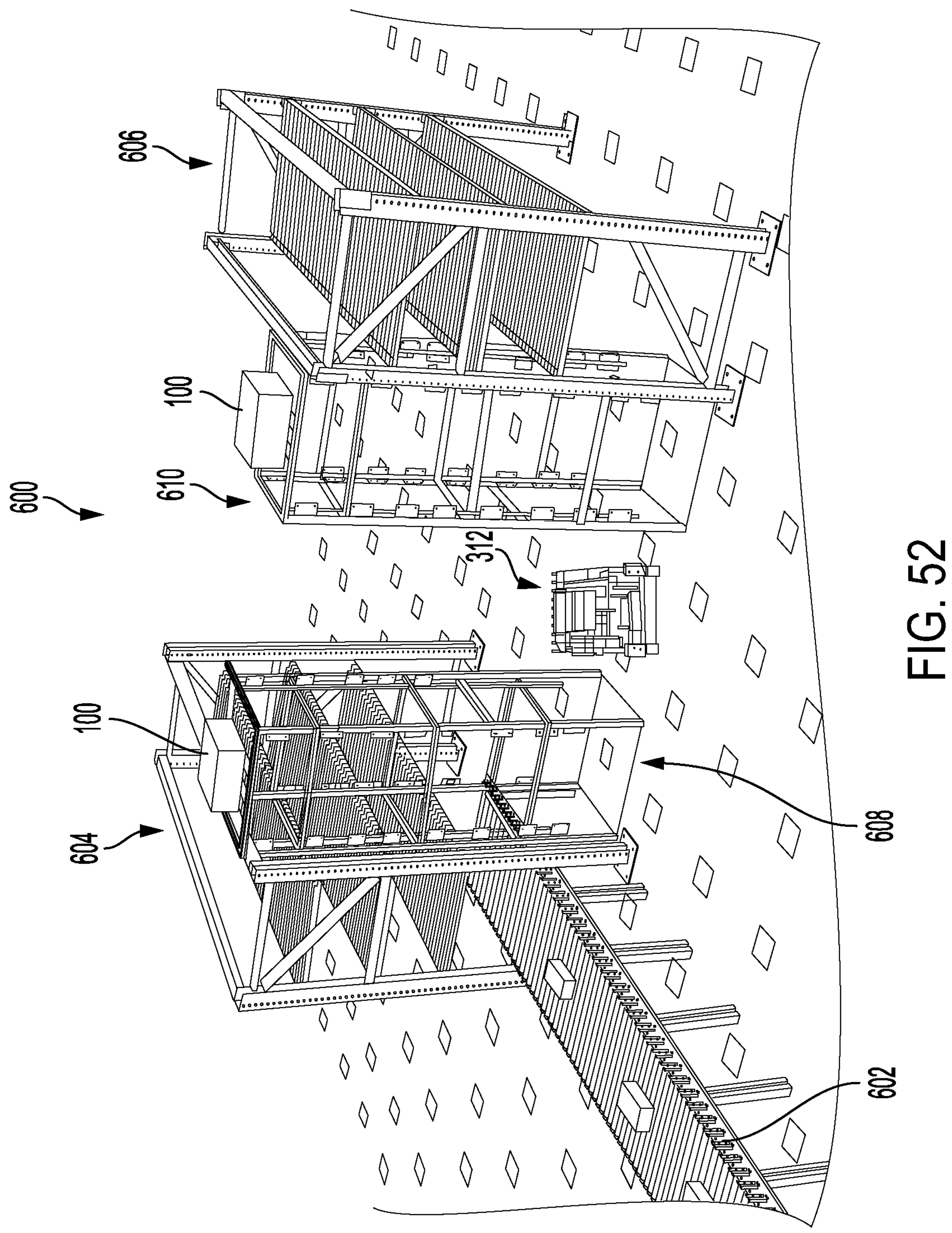
FIG. 52 shows an illustrative diagrammatic view of the object processing system of FIG. 49 showing the automated mobile carrier moving from one vertical lift structure to another vertical lift structure.

The automated mobile carrier 312 (or each where there are plural automated mobile carriers), may leave the vertical structure 608 and access any of a many further vertical structures (e.g., 610) to access multiple shelving units (e.g., 606) of system 600 as shown in FIG. 52. Each shelving unit (e.g., 604, 606) may also include multiple vertical structures (one each is shown for clarity) such that all areas of each shelving unit may be accessed by the automated mobile carriers. The system may perform the functionality described herein under the control of one or more computer processing systems 100.

Those skilled in the art will appreciate that numerous modifications and variations may be made to the above disclosed embodiments without departing from the spirit and scope of the present invention.

What is claimed is:

1. An object processing system including a vertical structure extending in a vertical direction and at least one automated mobile carrier adapted for movement with respect to the vertical structure, said at least one automated mobile carrier comprising:

a carrier base portion including at least two wheels for moving the automated mobile carrier in at least one direction that is generally orthogonal with respect to the vertical direction;

a carrier upper portion for receiving at least one object thereon to be moved by the automated mobile carrier; and an elevation system for lifting the carrier upper portion of the automated mobile carrier with respect to the carrier base portion of the automated mobile carrier such that an engagement system of the carrier upper portion engages the vertical structure.

2. The object processing system of claim 1, wherein the carrier upper portion includes a payload receiving portion with a plurality of mutually spaced apart ribs for supporting the at least one object thereon.

3. The object processing system of claim 1, wherein the elevation system includes at least two base gear racks that extend upward from the carrier base portion.

4. The object processing system of claim 3, wherein the elevation system further includes at least two base pinion gears that engage the at least two base gear racks of the carrier base portion to lift the carrier upper portion relative the carrier base portion.

5. The object processing system of claim 4, wherein at least two base pinion gears of the engagement system are provided among two sets of base pinion gears that engage four base gear racks of the carrier base portion, the at least two base gear racks of the carrier base portion being provided among the four base gear racks of the carrier base portion.

6. The object processing system of claim 1, wherein the elevation system includes at least two screw drives for moving the carrier upper portion away from the carrier base portion.

7. The object processing system of claim 1, wherein the elevation system includes at least two ball screw drives for moving the carrier upper portion away from the carrier base portion.

8. The object processing system of claim 1, wherein the elevation system includes at least two cam drives for moving the carrier upper portion away from the carrier base portion.

9. The object processing system of claim 1, wherein the vertical structure includes at least two lift gear racks, and wherein the engagement system of the carrier upper portion includes at least two lift pinion gears for engaging the at least two lift gear racks of the vertical structure.

10. The object processing system of claim 1, wherein the vertical structure includes four lift gear racks, and wherein the engagement system of the carrier upper portion includes four lift pinion gears for engaging the four lift gear racks of the vertical structure.

11. The object processing system of claim 10, where the engagement system further includes four slide guides, each of which is associated with a lift pinion gear, for guiding the pinion gear along an associated lift gear rack by sliding along the respective lift gear rack.

12. The object processing system of claim 11, where the engagement system further includes four roller guides, each of which is associated with a lift pinion gear, for guiding the pinion gear along an associated lift gear rack by rolling along the respective lift gear rack.

13. The object processing system of claim 1, wherein the elevation system and the engagement system are both driven by a common drive system.

14. The object processing system of claim 1, wherein the object processing system further includes a plurality of levels of destination bins, each level of destination bins being accessible by the automated mobile carrier via movement up and down the vertical structure, and each level including a plurality of destination bins as well as a shuttle carrier for carrying objects to and from the plurality of destination bins.

15. The object processing system of claim 14, wherein the shuttle carrier of each of the plurality of levels is adapted to retrieve objects from the payload receiving portion of the automated mobile carrier when the automated mobile carrier is adjacent the respective shuttle carrier.

16. The object processing system of claim 14, wherein the shuttle carrier of each of the plurality of levels is adapted to place objects onto the payload receiving portion of the automated mobile carrier when the automated mobile carrier is adjacent the respective shuttle carrier.

17. An object processing system including at least one automated mobile carrier comprising:

a carrier base portion including at least two wheels for moving the automated mobile carrier in at least one horizontal direction;

a carrier upper portion that includes a payload receiving surface for receiving at least one object thereon to be moved by the automated mobile carrier, and an engagement system for engaging a vertical structure; and an elevation system being adapted for lifting the carrier upper portion including the payload receiving surface with respect to the carrier base portion such that the engagement system may engage the vertical structure.

18. The object processing system of claim 17, wherein the carrier upper portion includes a payload receiving portion with a plurality of mutually spaced apart ribs for supporting the at least one object thereon.

19. The object processing system of claim 17, wherein the elevation system includes at least two base gear racks that extend upward from the carrier base portion.

20. The object processing system of claim 19, wherein the elevation system further includes at least two base pinion gears that engage the at least two base gear racks of the carrier base portion to lift the carrier upper portion relative the carrier base portion.

21. The object processing system of claim 20, wherein at least two base pinion gears of the engagement system are provided among two sets of base pinion gears that engage four base gear racks of the carrier base portion, the at least two base gear racks of the carrier base portion being provided among the four base gear racks of the carrier base portion.

22. The object processing system of claim 17, wherein the elevation system includes at least two screw drives for moving the carrier upper portion away from the carrier base portion.

23. The object processing system of claim 17, wherein the elevation system includes at least two ball screw drives for moving the carrier upper portion away from the carrier base portion.

24. The object processing system of claim 17, wherein the elevation system includes at least two cam drives for moving the carrier upper portion away from the carrier base portion.

25. The object processing system of claim 17, wherein the vertical structure includes at least two lift gear racks, and wherein the engagement system of the carrier upper portion includes at least two lift pinion gears for engaging the at least two lift gear racks of the vertical structure.

26. The object processing system of claim 17, wherein the vertical structure includes four lift gear racks, and wherein the engagement system of the carrier upper portion includes four lift pinion gears for engaging the four lift gear racks of the vertical structure.

27. The object processing system of claim 26, where the engagement system further includes four slide guides, each of which is associated with a lift pinion gear, for guiding the pinion gear along an associated lift gear rack by sliding along the respective lift gear rack.

28. The object processing system of claim 27, where the engagement system further includes four roller guides, each of which is associated with a lift pinion gear, for guiding the pinion gear along an associated lift gear rack by rolling along the respective lift gear rack.

29. The object processing system of claim 17, wherein the elevation system and the engagement system are both driven by a common drive system.

30. The object processing system of claim 17, wherein the object processing system further includes a plurality of levels of destination bins, each level of destination bins being accessible by the automated mobile carrier via movement up and down the vertical structure, and each level including a plurality of destination bins as well as a shuttle carrier for carrying objects to and from the plurality of destination bins.

31. The object processing system of claim 30, wherein the shuttle carrier of each of the plurality of levels is adapted to retrieve objects from the payload receiving portion of the automated mobile carrier when the automated mobile carrier is adjacent the respective shuttle carrier.

32. The object processing system of claim 30, wherein the shuttle carrier of each of the plurality of levels is adapted to place objects onto the payload receiving portion of the automated mobile carrier when the automated mobile carrier is adjacent the respective shuttle carrier.

33. A method of processing objects using an automated mobile carrier, said method comprising:

moving the automated mobile carrier in a horizontal direction, said automated mobile carrier including a carrier base portion including at least two wheels for moving the automated mobile carrier in the horizontal direction, and a carrier upper portion including a payload receiving portion for receiving at least one object thereon to be moved by the automated mobile carrier;

receiving the automated mobile carrier under at least two vertically extending lift structures such that the automated mobile carrier may move freely in the horizontal direction unobstructed by the vertically extending lift structures;

elevating the carrier upper portion relative the carrier base portion such that an engagement system of the carrier upper portion engages the vertically extending lift structures; and lifting the automated mobile carrier along the vertically extending lift structures to any of a plurality of levels, each of which includes a plurality of destination locations.

34. The method of claim 33, wherein the elevating the carrier upper portion relative the carrier base portion includes engaging two base gear racks with base pinion gears.

35. The method of claim 33, wherein the elevating the carrier upper portion relative the carrier base portion includes engaging at least two screw drives for moving the support structure away from the carrier base portion.

36. The method of claim 33, wherein the elevating the carrier upper portion relative the carrier base portion includes engaging at least two ball screw drives for moving the support structure away from the carrier base portion.

37. The method of claim 33, wherein the elevating the carrier upper portion relative the carrier base portion includes engaging at least two cam drives for moving the support structure away from the carrier base portion.

38. The method of claim 33, wherein the lifting the automated mobile carrier includes engaging at least two lift gear racks with at least two driven lift pinion gears.

39. The method of claim 33, wherein the lifting the automated mobile carrier includes engaging four lift gear racks with four driven lift pinion gears.

40. The method of claim 33, wherein the elevating the carrier upper portion and lifting the automated mobile carrier both involve operating a common rotary motor system.

41. The method of claim 33, wherein the method further includes transferring objects between the automated mobile carrier and any of a plurality of shuttle carriers that are each provided on a different vertically stacked level of a plurality of levels.

42. The method of claim 41, wherein the method further includes transferring objects between a respective shuttle carrier of the plurality of shuttle carriers and a destination shelf that is provided as one of a pair of destination shelves between which the shuttle carrier is reciprocally movable.

* * * * *